United States Patent

Kurata et al.

[11] Patent Number: 6,041,424
[45] Date of Patent: Mar. 21, 2000

[54] METHOD OF ANALYZING SEMICONDUCTOR DEVICE OPERATION, METHOD OF ANALYZING SPECIFIC PHYSICAL PHENOMENA, AND APPARATUS FOR PERFORMING THESE METHODS

[75] Inventors: Mamoru Kurata; Shin Nakamura, both of Tokyo, Japan

[73] Assignee: Kabushiki Kaisha Toshiba, Kawasaki, Japan

[21] Appl. No.: 07/983,288

[22] Filed: Nov. 30, 1992

Related U.S. Application Data

[63] Continuation of application No. 07/588,328, Sep. 26, 1990, abandoned.

[30] Foreign Application Priority Data

| Sep. 29, 1989 | [JP] | Japan | 1-252189 |
| Dec. 22, 1989 | [JP] | Japan | 1-331109 |
| Mar. 2, 1990 | [JP] | Japan | 2-49484 |
| Jul. 16, 1990 | [JP] | Japan | 2-187752 |

[51] Int. Cl.$^7$ .................................................. G06F 17/50
[52] U.S. Cl. ................................................................ 714/33
[58] Field of Search .................................. 364/488–491, 364/578, 553; 714/30, 31, 32, 33, 37, 48

[56] References Cited

U.S. PATENT DOCUMENTS

| 4,734,879 | 3/1988 | Lin et al. ................................. 364/810 |
| 4,791,593 | 12/1988 | Hennion .................................. 364/578 |
| 4,918,643 | 4/1990 | Wong .................................. 364/578 X |
| 4,939,681 | 7/1990 | Yokomizo et al. ................. 364/488 X |

OTHER PUBLICATIONS

IEEE Transactions on Computer Aided Design of Integrated Circuits and Systems, vol. 8, No. 5, May 1989, pp. 528–537, Ke–Chih Wu, et al., "New Approaches in a 3–D One–Carrier Device Solver".

(List continued on next page.)

*Primary Examiner*—Moustafa M. Meky
*Attorney, Agent, or Firm*—Oblon, Spivak, McClelland, Maier & Neustadt, P.C.

[57] ABSTRACT

A method of analyzing the operation of a semiconductor device by solving simultaneous equations consisting of electron- and hole-transport equations and Poisson's equation, by means of a computer, thereby to accomplish the modeling of the semiconductor device. The method comprises the steps of: rewriting simultaneous equations to the following equations (a), (b), (c) containing artificial time differential terms $dp/dt$, $dn/dt$, $d\psi/dt$ and sensitivity coefficients $\lambda_p$, $\lambda_n$, and $\lambda_\psi$:

$$dp/dt = -\lambda_p f_p \quad (a)$$

$$dn/dt = \lambda_n f_n \quad (b)$$

$$d\psi/dt = \lambda_\psi f_\psi \quad (c)$$

determining meshpoints (M,N) of the semiconductor device, and imparting spatial position dependency, which is appropriate for the physical properties of the semiconductor device, to the sensitivity coefficients $\lambda_p$, $\lambda_n$, and $\lambda_\psi$, thereby transforming equations (a), (b) and (c) to the following equations (d), (e) and (f):

$$dp(M,N)/dt = -\lambda_p(M,N) f_p(M,N) \quad (d)$$

$$dn(M,N)/dt = \lambda_n(M,N) f_n(M,N) \quad (e)$$

$$d\psi(M,N)/dt = \lambda_\psi(M,N) f_\psi(M,N) \quad (f)$$

time-integrating equations (d), (e) and (f), thereby obtaining the solutions of simultaneous equations.

18 Claims, 31 Drawing Sheets

OTHER PUBLICATIONS

The 2nd Symposium on the Frontiers of Massively Parallel Computation, Oct. 10–12, 1988, pp. 289–294, J.P. Darling, et al., "Parallel Algorithm for the Solution of Nonlinear Poisson Equation of Semiconductor Device Theory and its Implementation on the MPP".

Philips Journal of Research, vol. 42, No. 5–6, Dec. 1987, pp. 533–565, S.C. Hu, et al., "Computer–Aided Design of Semiconductor Processes and Devices".

Device Electronics for integrated Circuits, by Muller and Kamins, John Wiley and Sons 1977, pp. 152–181.

M. Kurata, "Numerical Analysis for Semiconductor Devices", D.C. Heath and Company, 1982, Chapter 7, Appendix G & Appendix H.

G.A. Bekey and W.J. Karplus, "Hybrid Computation", John Wiley & Sons, Inc., 1968. Section 9.4 Optimization by continous steepest descent.

W. Jeffrey and R. Rosner, "Optimization Algorithms: Simulated Annealing and Neural Network Processing," The Astrophysical Journal, 310, pp. 473–481, 1986, Nov. 1.

J. Hopfield, "Artificial Neural Networks", IEEE Circuits and Devices Magazine, pp. 3–10, Sep., 1988.

"Further improved algorithm for the solution of the nonlinear Poisson equation in semiconductor devices." —G.J.L. Ouwerling; J. Appl. Phys. 66 (12), Dec. 15, 1989; pp. 6144–6149.

"Fast algorithm for iteratively solving the nonlinear static Poisson equation in semiconductors."–W.W. Keller; J.Appl. Phys. 61 (11), Jun. 1, 1987; pp. 5189–5190.

"Solution of the nonlinear Poisson equation of semiconductor device theory." —I.D. Mayergoyz; J. Appl. Phys. 59 (1), Jan. 1, 1986; pp. 195–199.

Device Electronics For Integrated Circuits, Richard S. Muller, Theodore I. Kamins, Wiley 1997, pp. 105–123.

Practical Numerical Analysis, G.A. Evans, Wiley 1995, pp. 320–330.

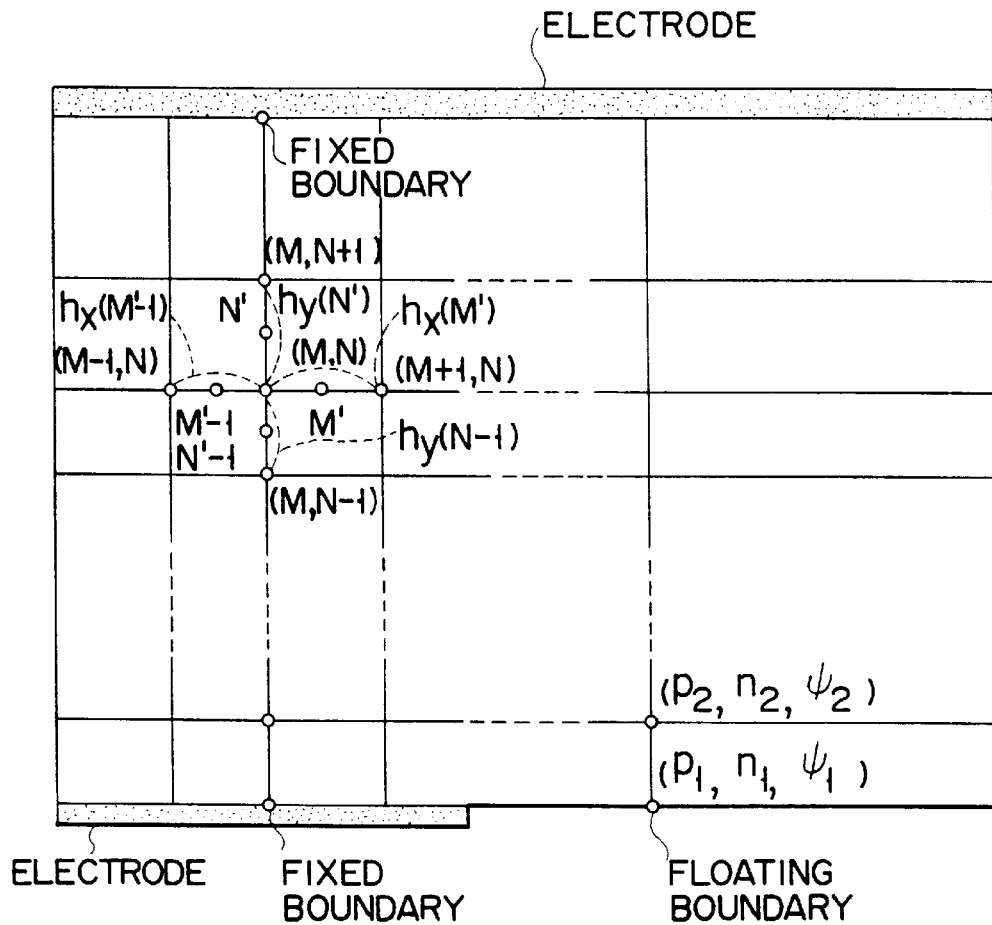
F I G. 1

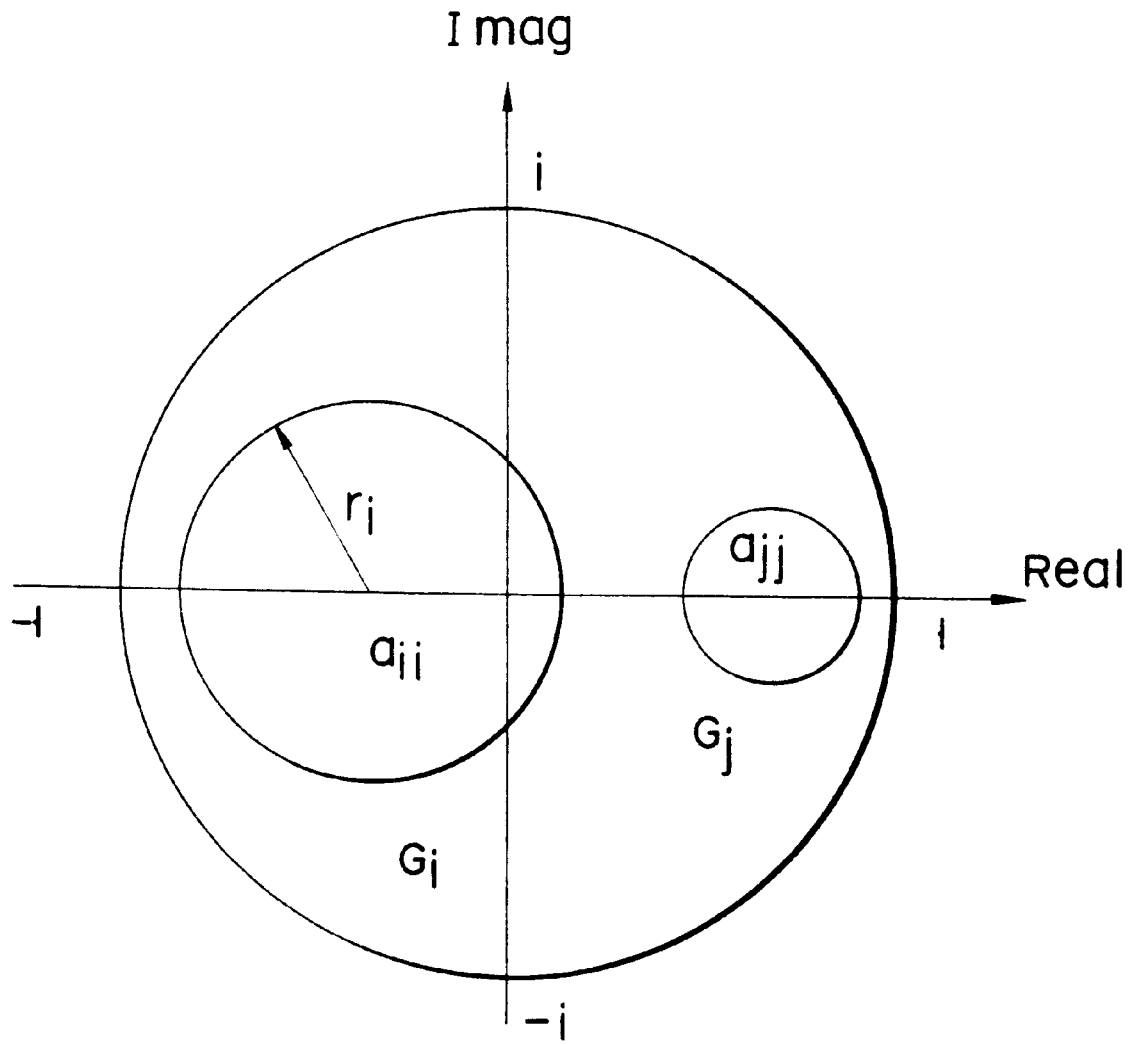
EXISTENCE REGION
OF EIGENVALUES
F I G. 3

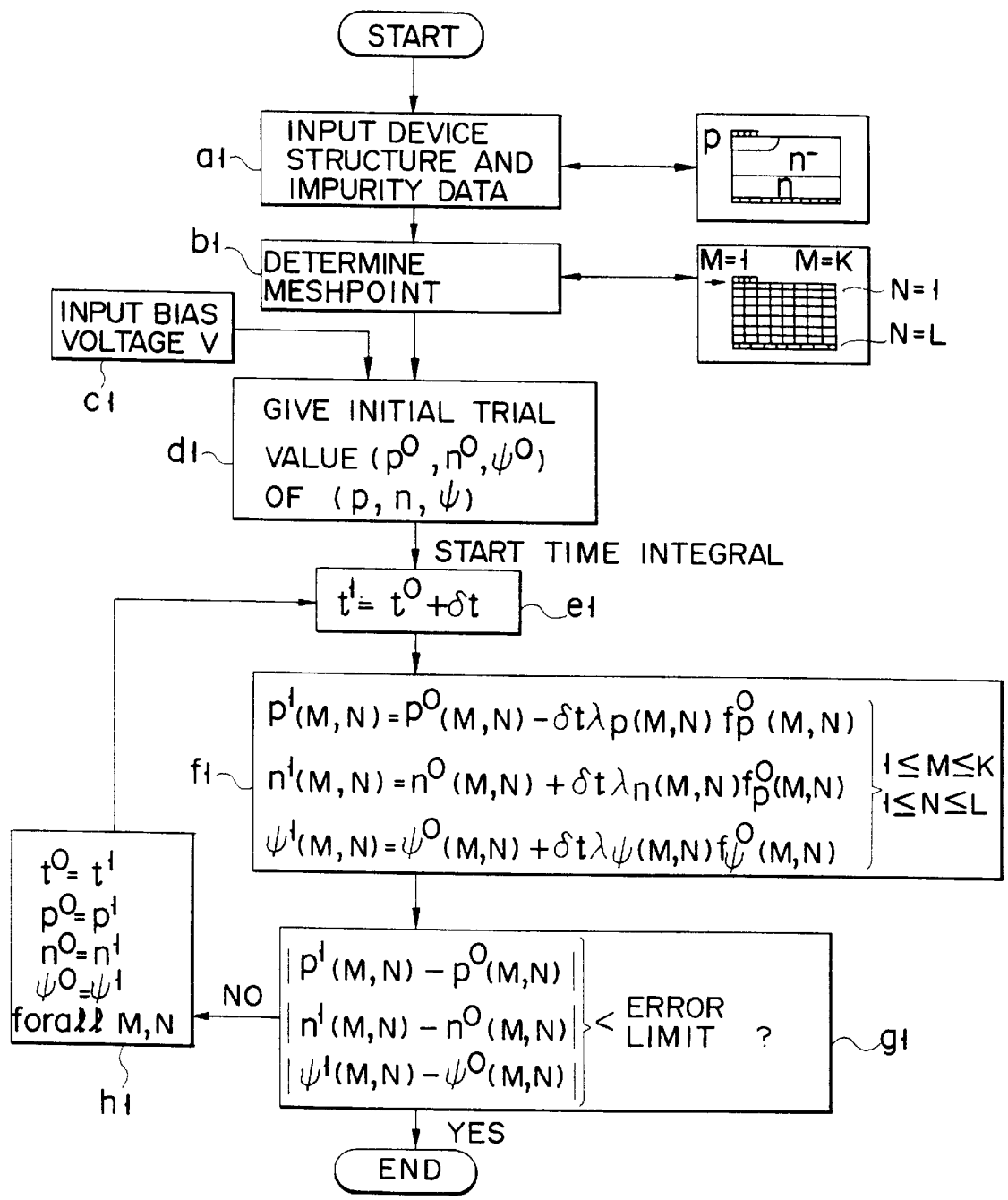
F I G. 4

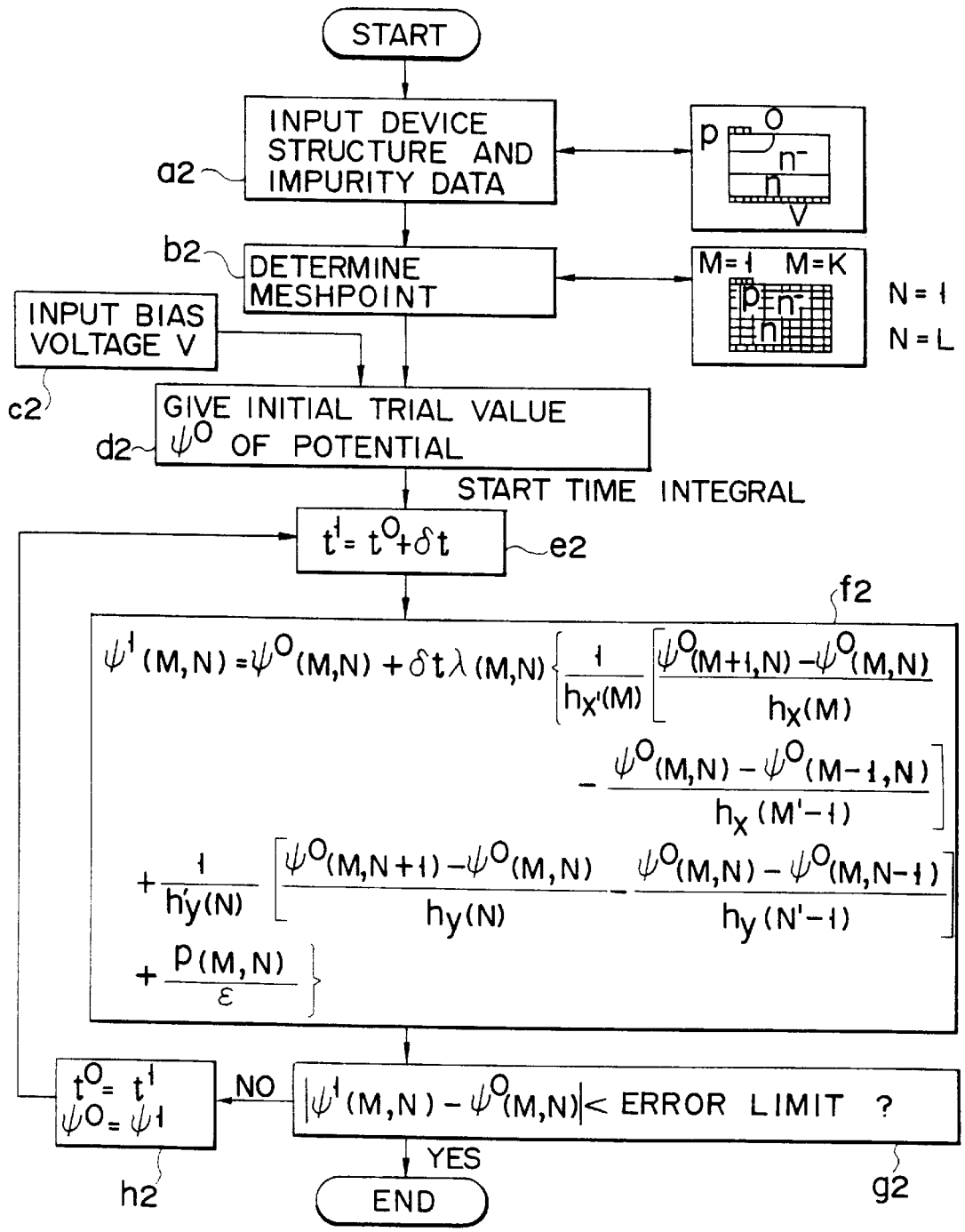
F I G. 5

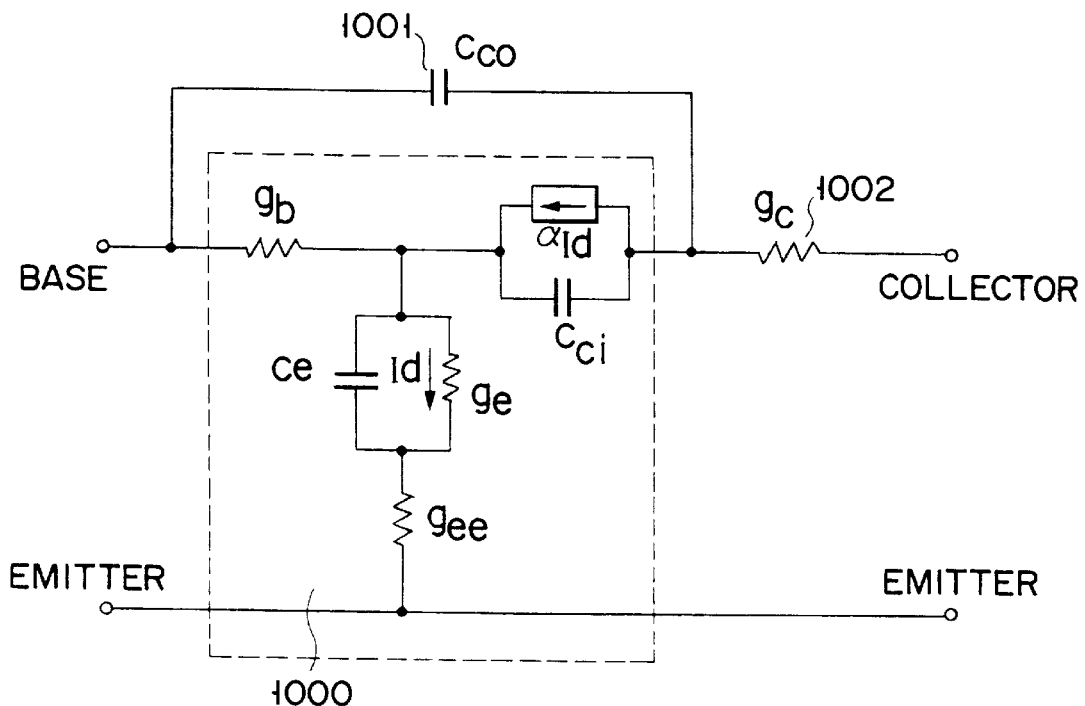
F I G. 7A
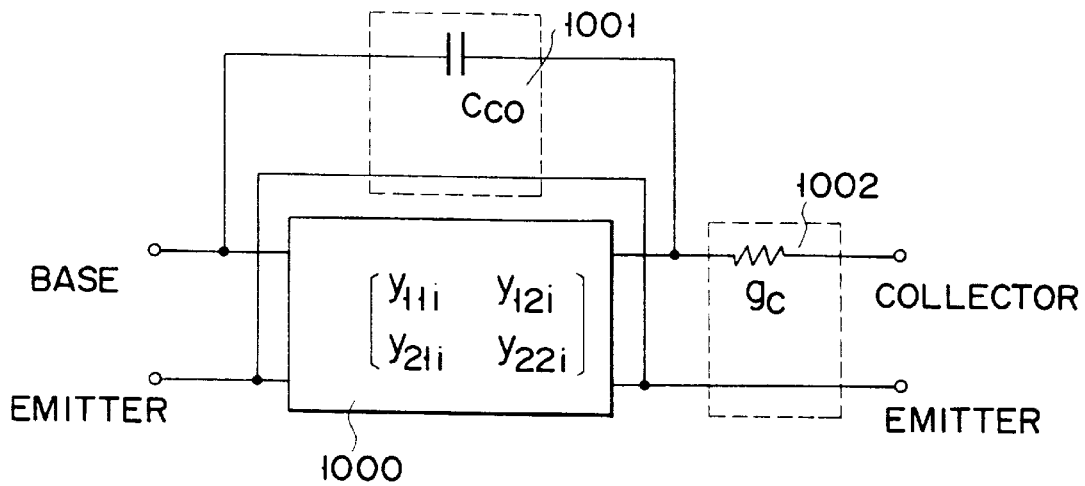
F I G. 7B

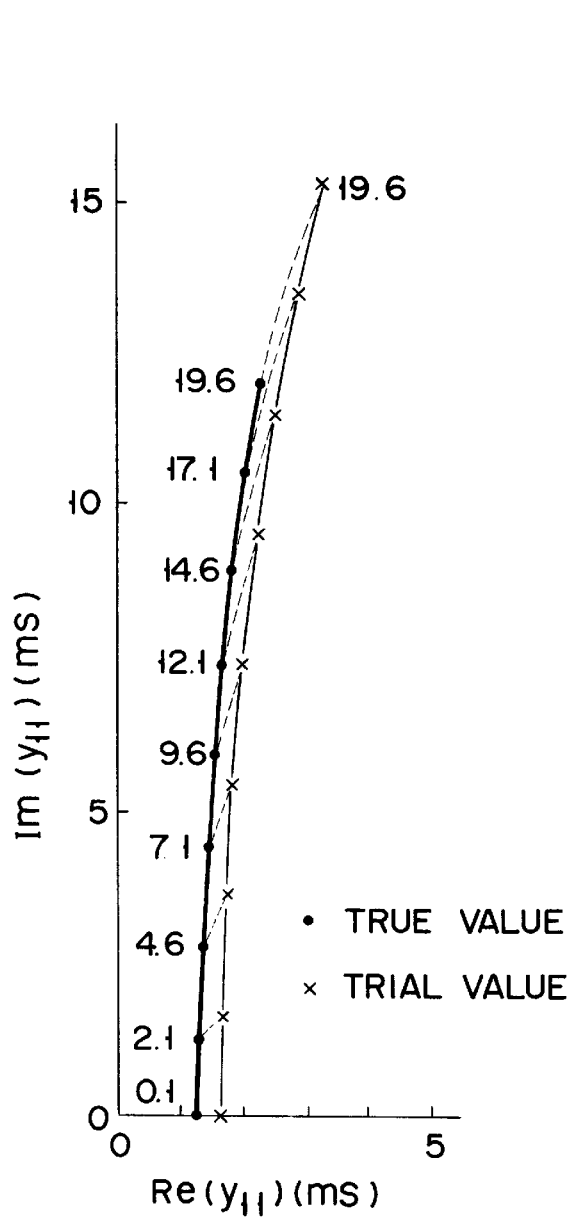
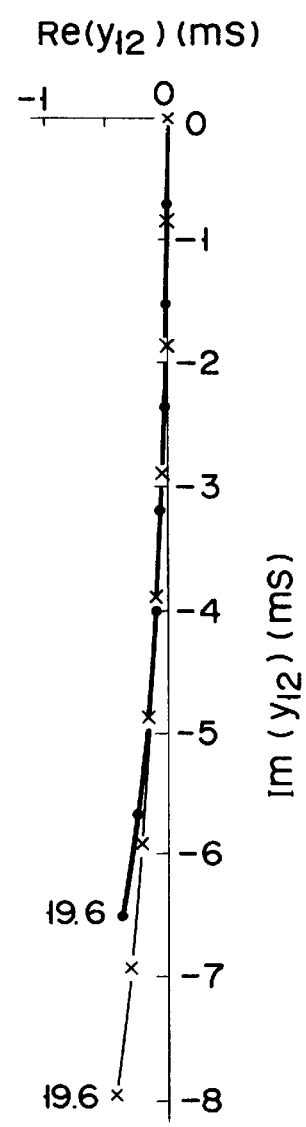
F I G. 9A
F I G. 9B

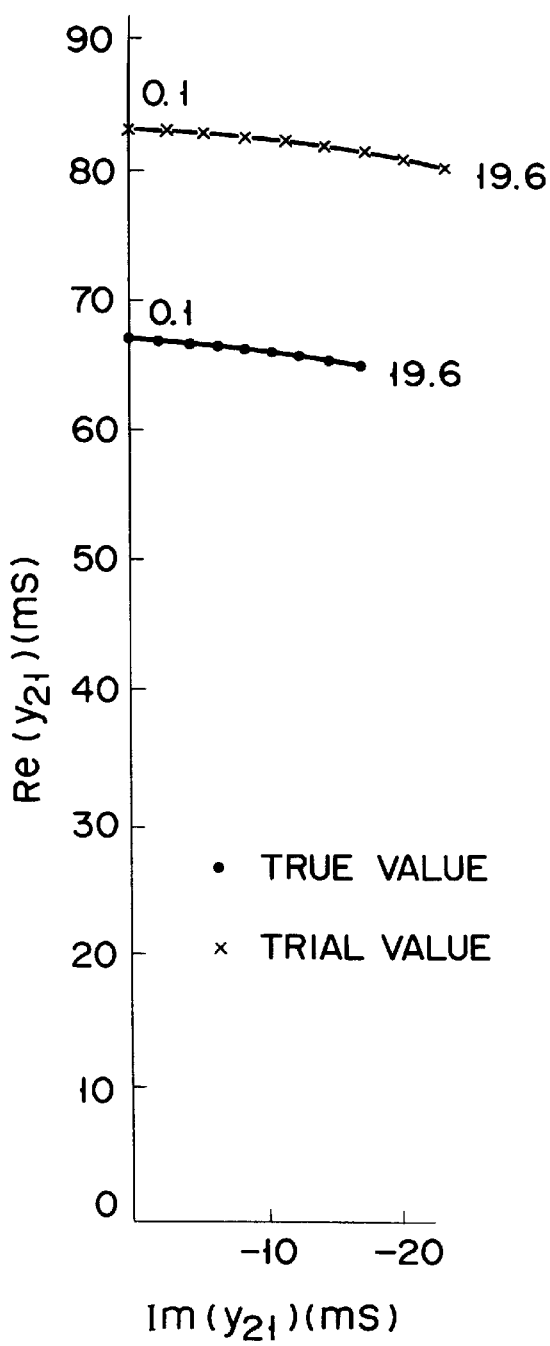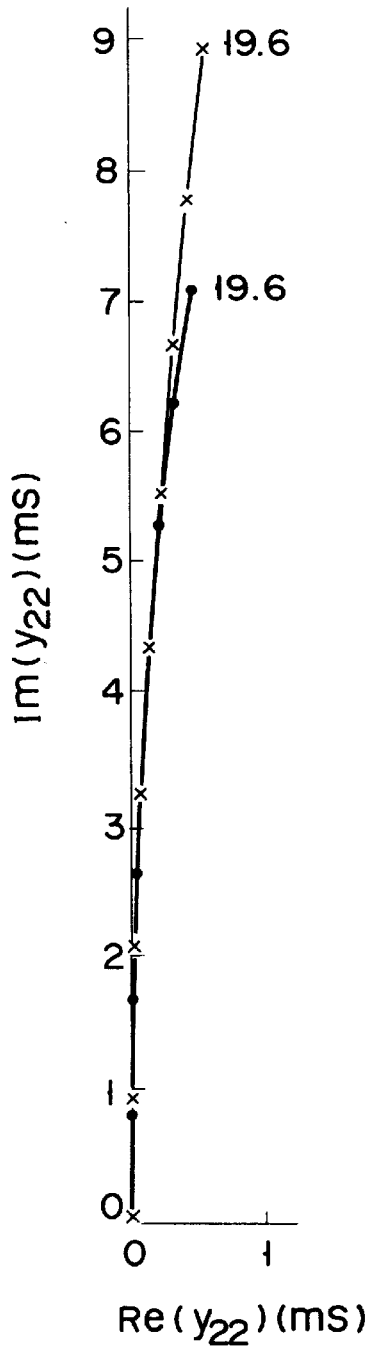
F I G. 9C  F I G. 9D

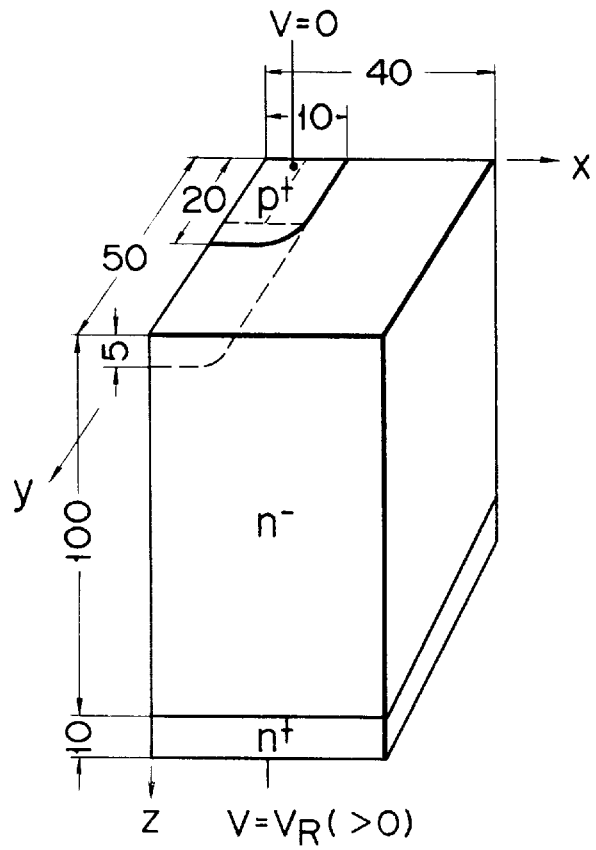
DEVICE STRUCTURE
F I G. 12A
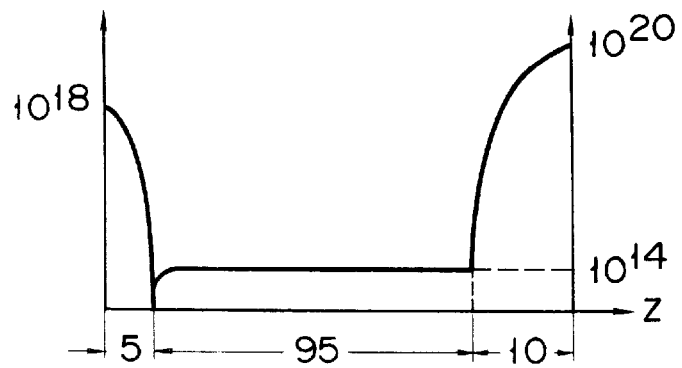
IMPURITY DISTRIBUTION IN Z DIRECTION
F I G. 12B

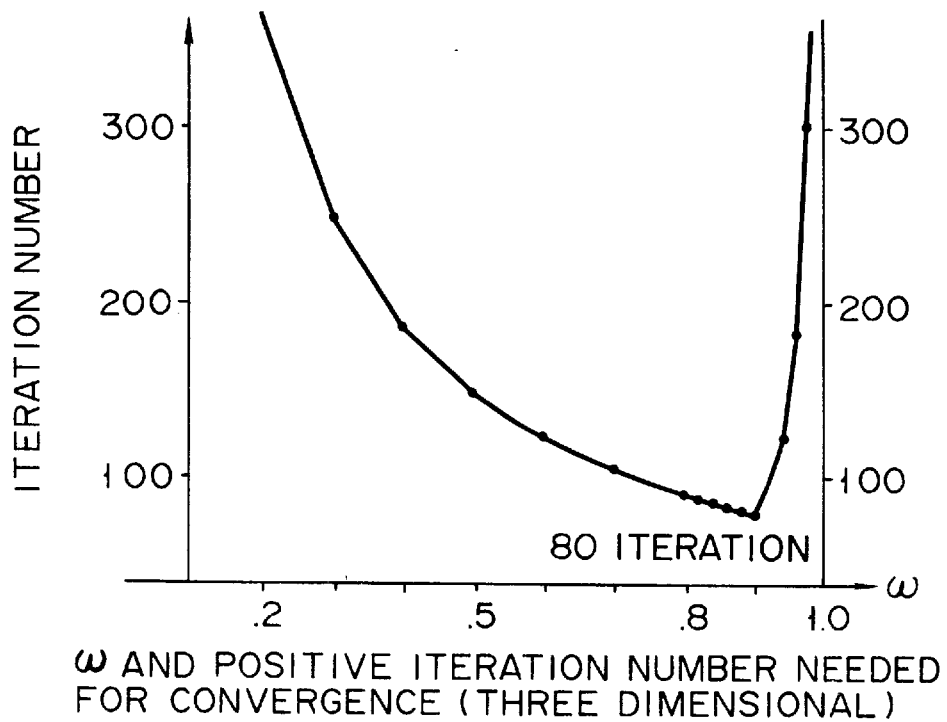
ω AND POSITIVE ITERATION NUMBER NEEDED
FOR CONVERGENCE (THREE DIMENSIONAL)
F I G. 13A
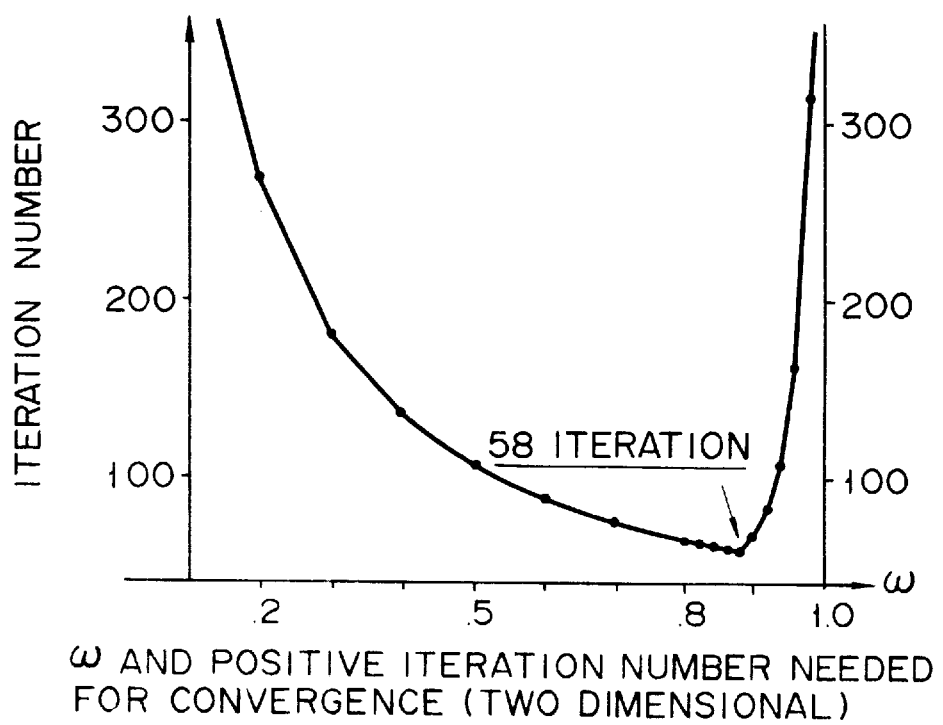
ω AND POSITIVE ITERATION NUMBER NEEDED
FOR CONVERGENCE (TWO DIMENSIONAL)
F I G. 13F

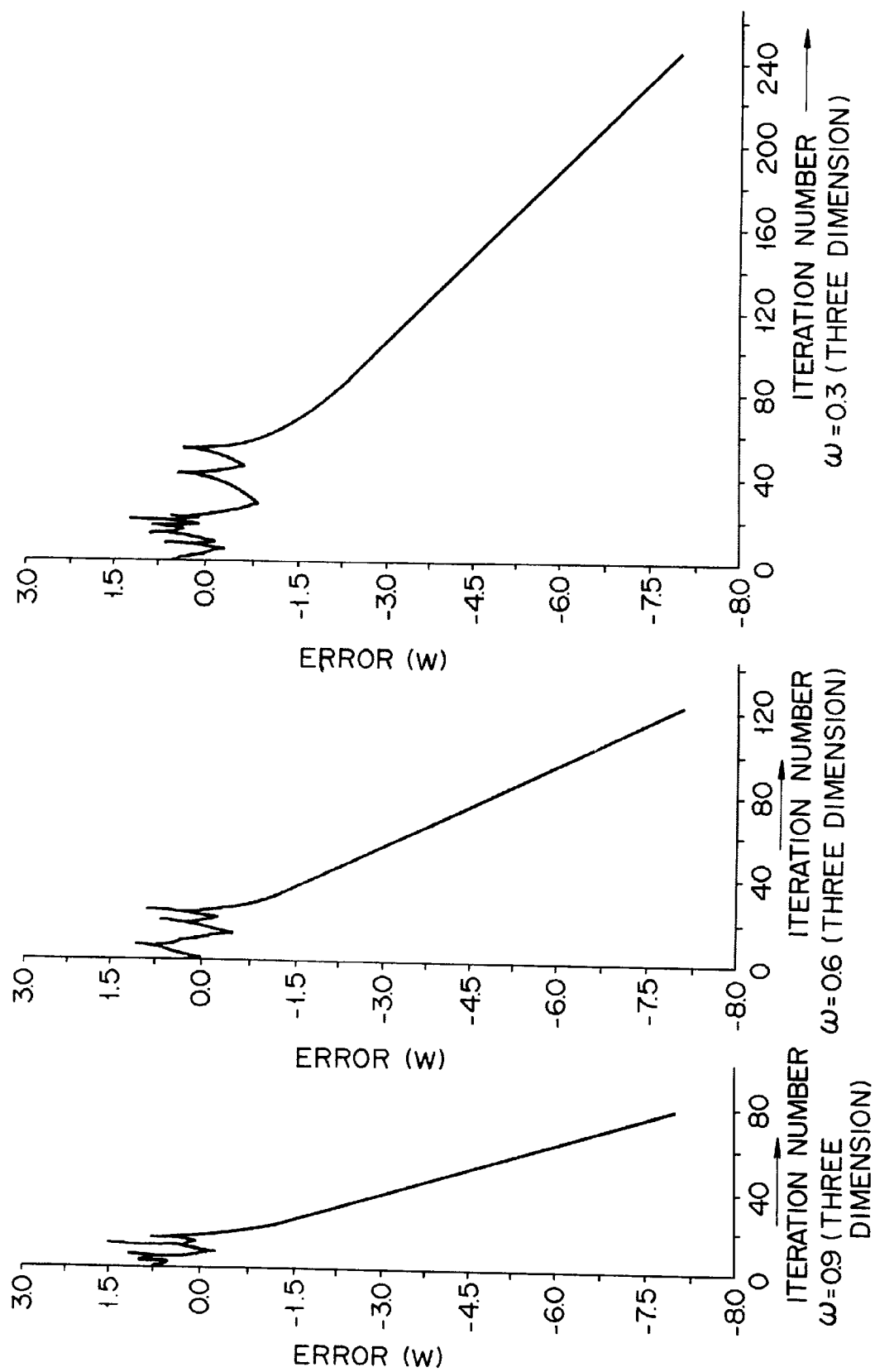

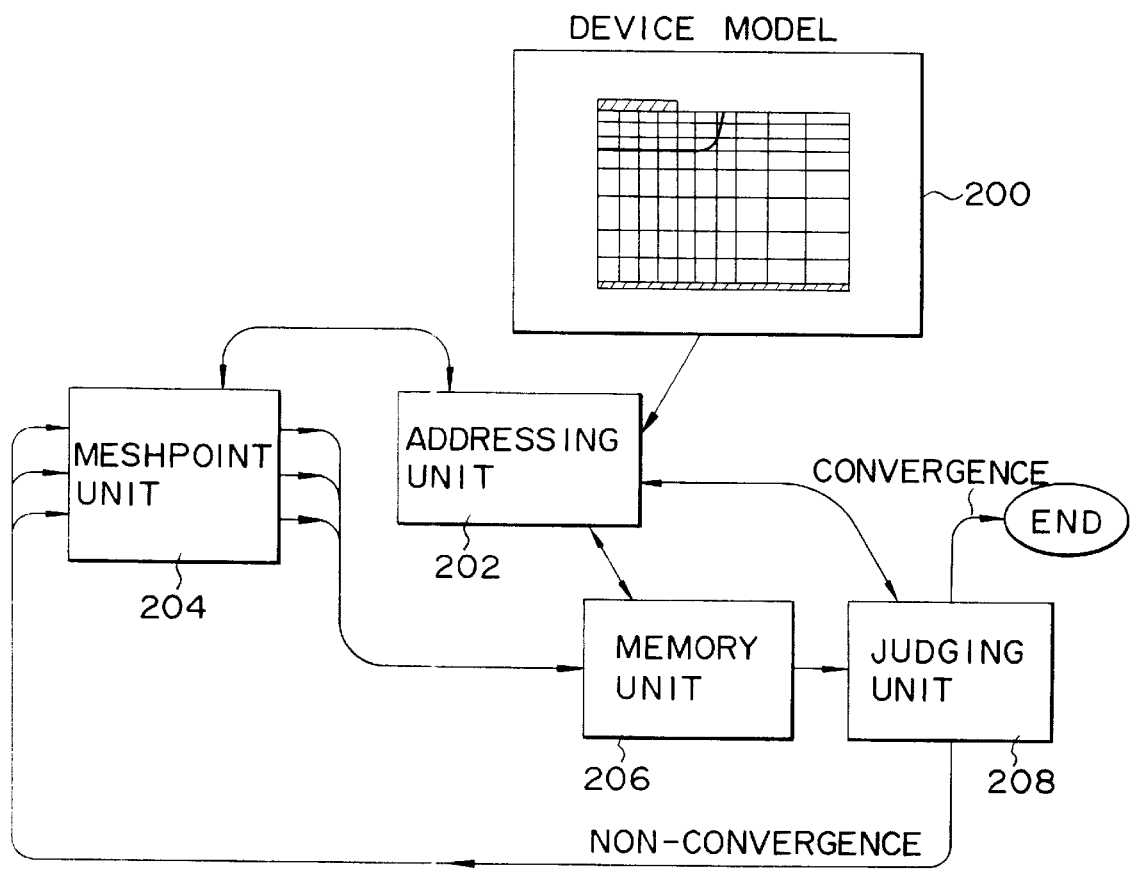
F I G. 17

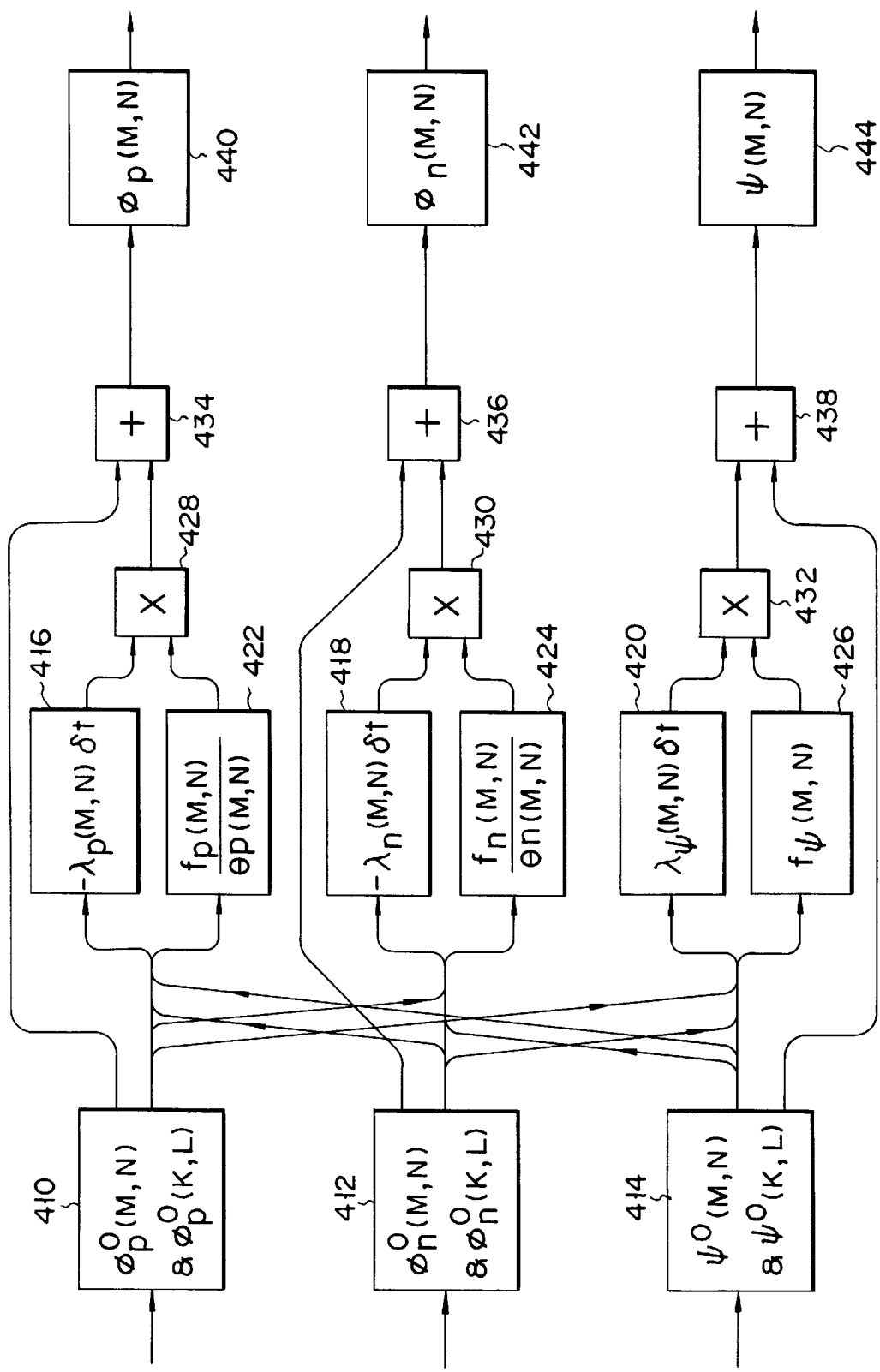
F I G. 22

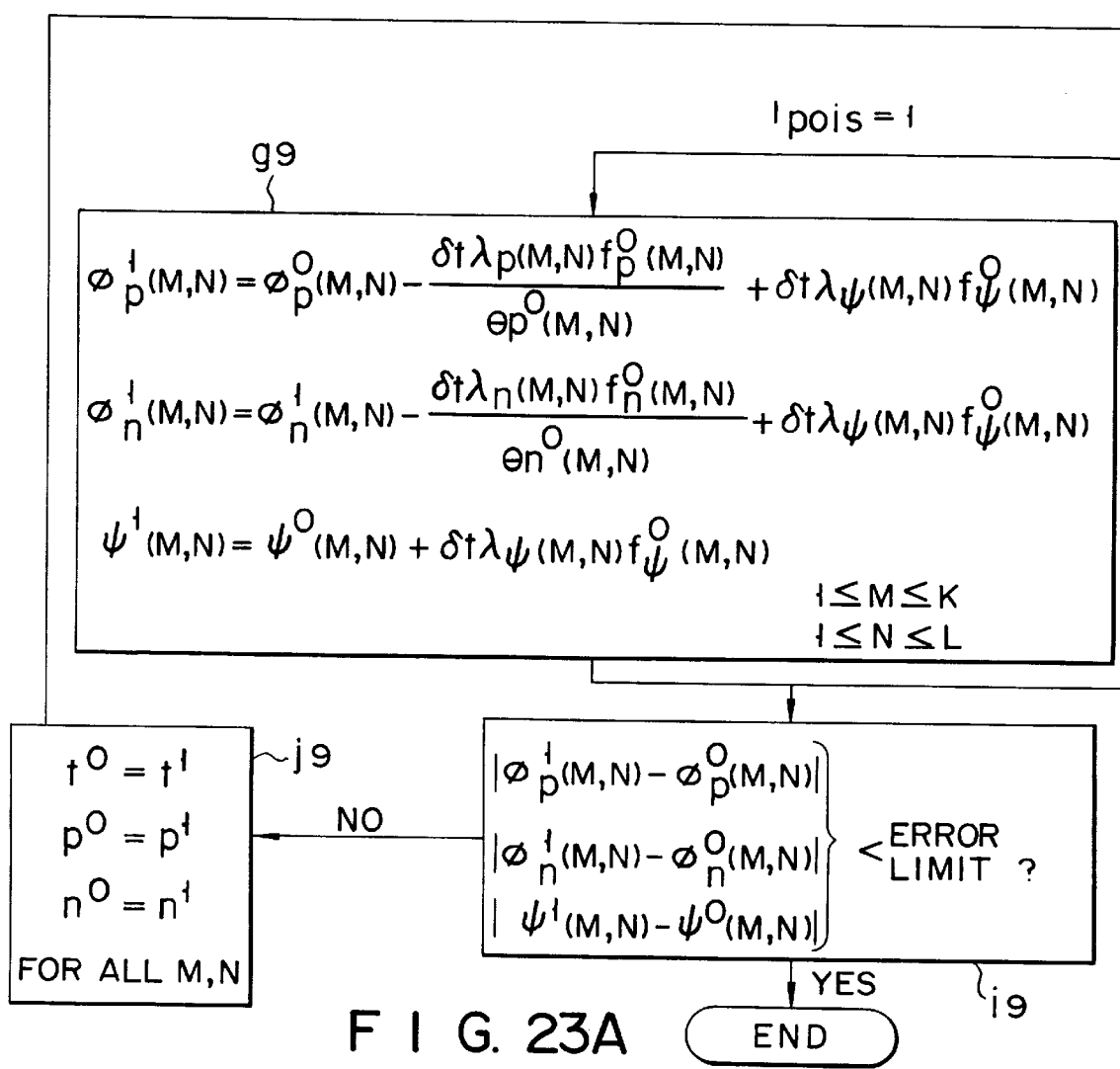
F I G. 23A

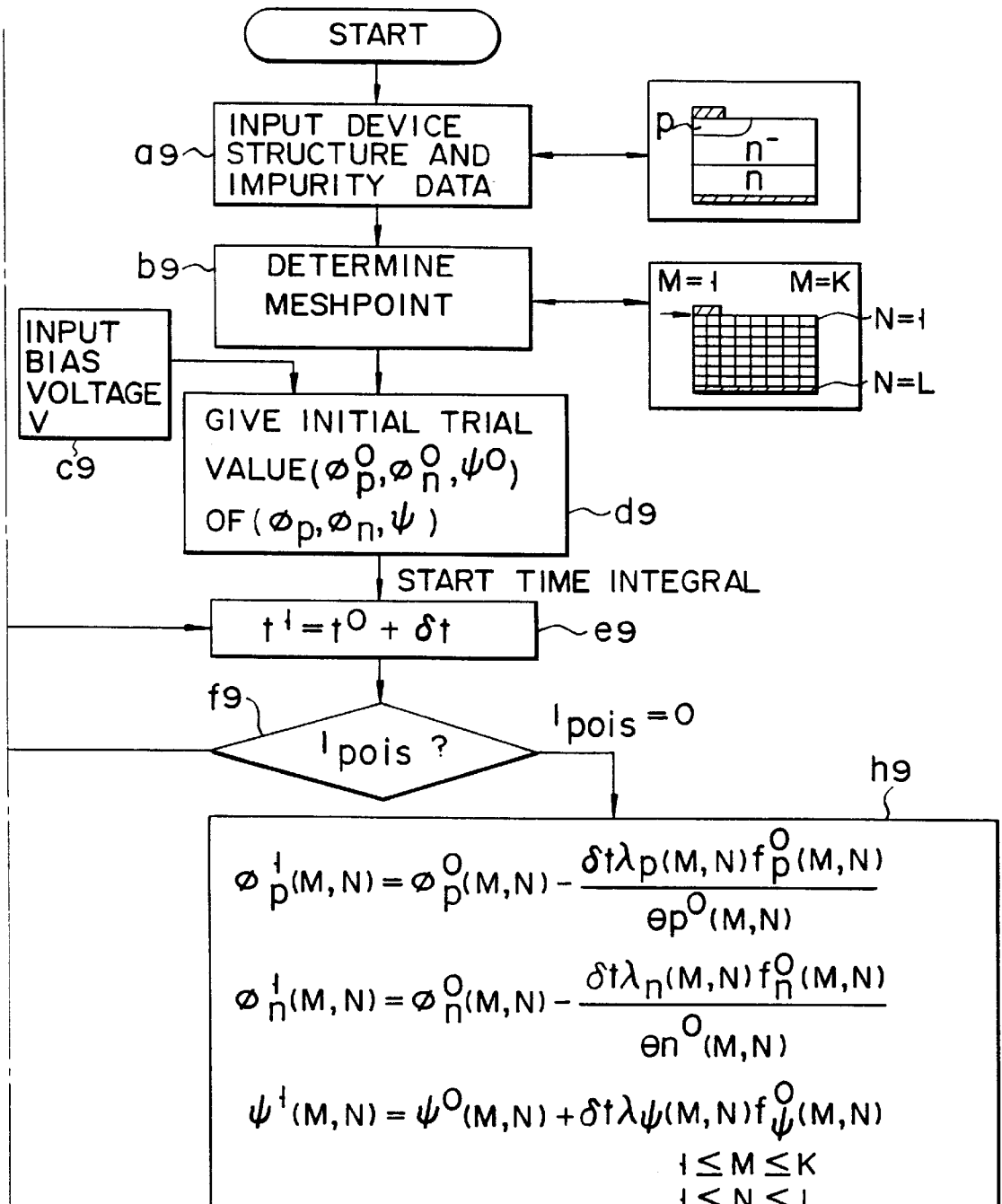
F I G. 23B

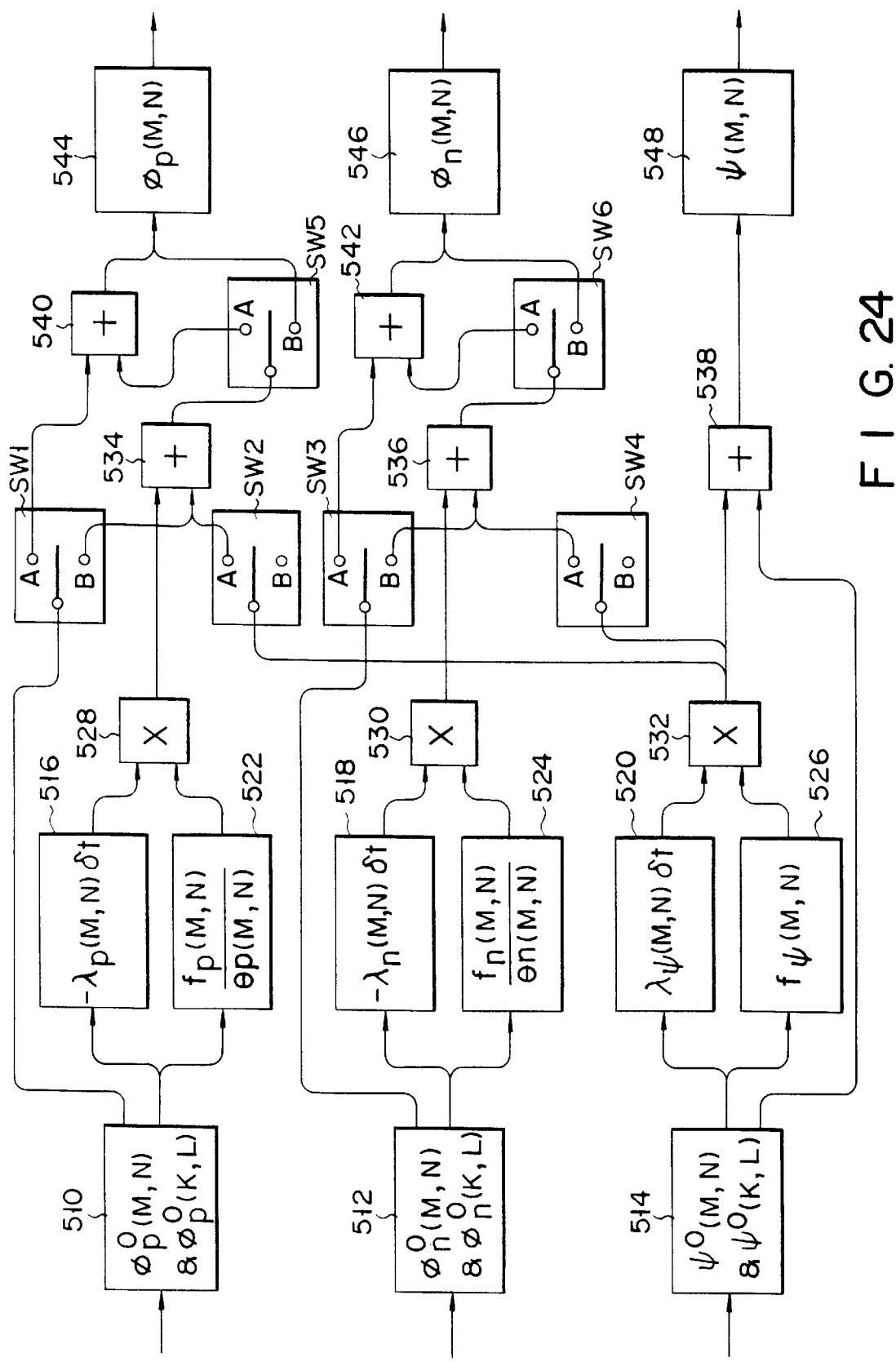
F I G. 24

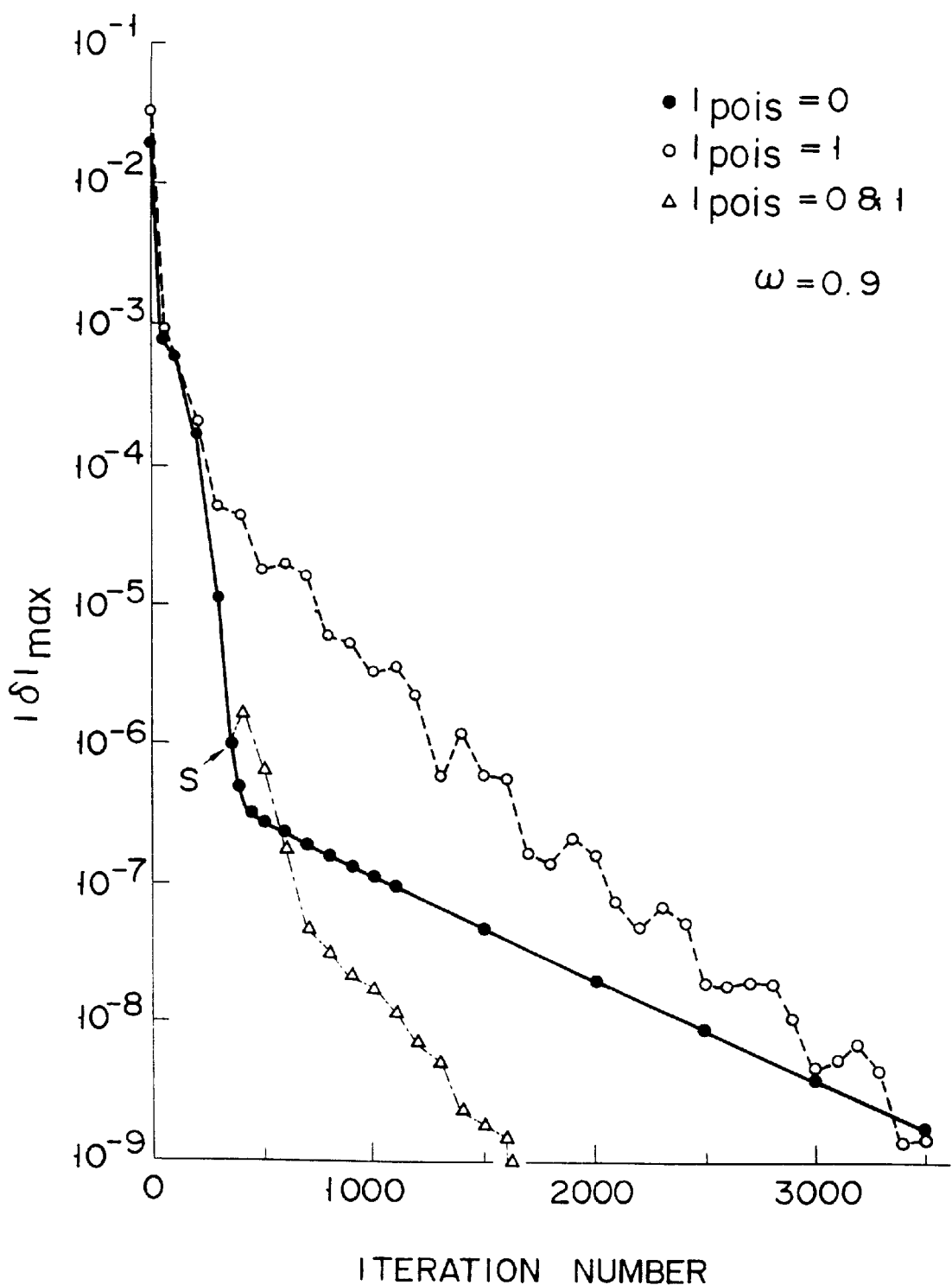
F I G. 26

METHOD OF ANALYZING SEMICONDUCTOR DEVICE OPERATION, METHOD OF ANALYZING SPECIFIC PHYSICAL PHENOMENA, AND APPARATUS FOR PERFORMING THESE METHODS

This application is a continuation of application Ser. No. 07/588,328, filed on Sep. 26, 1990, now abandoned.

BACKGROUND OF THE INVENTION

1. Field of the Invention

The present invention relates to modeling of semiconductor devices and specific physical phenomena.

2. Description of the Related Art

The basic equations applied to modeling of semiconductor devices are represented generally in the following form:

$$\partial p/\partial \tau = (-1/q)(\text{div} J_p) + G - U \quad (1)$$

$$\partial n/\partial \tau = (1/q)(\text{div} J_n) + G - U \quad (2)$$

$$J_p = -qD_p(\text{grad} p) - q\mu_p p(\text{grad} \psi) \quad (3)$$

$$J_n = qD_n(\text{grad} n) - q\mu_n n(\text{grad} \psi) \quad (4)$$

$$\text{div}(\text{grad} \psi) = (-q/\varepsilon)(N_d - N_a + p - n) \quad (5)$$

These five equations are applied commonly to the conventional modeling method and the modeling method according to this invention. Equations (1) and (2) are a continuity equation for holes and a continuity equation for electrons, respectively. In these equations, $\tau$ is physical time, and G and U denote the generation and recombination of carriers. Equations (3) and (4) explicitly describe a hole current density and a electron current density, respectively. As can be understood from equation (3), the hole current density $J_p$ is an algebraic sum of a diffusion current component (the first term) proportional to the carrier density gradient grad$p$ and a drift component (the second term) proportional to the potential gradient grad $\psi$ and the carrier density. Also, as can be seen from equation (4), the electron current density $J_n$ is an algebraic sum of a diffusion current component (the first term) proportional to the carrier density gradient grad$n$ and a drift component (the second term) proportional to the potential gradient grad $\psi$ and the carrier density. Equation (5) is a Poisson's equation representing the relationship between the potential $\psi$ and the space charge density.

The conventional method of modeling semiconductor devices will be first explained. In the first step of obtaining the numerical solutions of equations (1) to (5), these equations are rewritten from continuous system (i.e., differential equations) to discrete system (i.e., difference equations). To rewrite equations (1) to (5) so, it is necessary to divide the device space, which is to be analyzed, into a rectangular meshpoint array. Mesh division for a two-dimensional space model can be schematically illustrated in FIG. 1. Let us define the meshpoint spacing hx in the x-direction and the meshpoint spacing hy in the y-direction as is illustrated in FIG. 1, and also let us define the midpoint spacing $h_x'$ in the x-direction and the midpoint spacing $h_y'$ in the y-direction as follows:

$$h_x'(M) = (1/2)[h_x(M'-1) + h_x(M')] \quad (6\text{-}1)$$

$$h_y'(N) = (1/2)[h_y(N'-1) + h_y(N')] \quad (6\text{-}2)$$

From equations (3), (6-1), and (6-2), the hole current divergence div $J_p$ can be represented by the following approximation in the discrete system:

$$\text{div} J_p = \partial J_{px}/\partial x + \partial J_{py}/\partial y \quad (7)$$

$$\simeq [J_{px}(M') - J_{px}(M'-1)]/h_x'(M) +$$

$$[J_{py}(N') - J_{py}(N'-1)]/h_y'(N)$$

As for the electron current, the divergence div $J_n$ can be rewritten in the same way. Therefore, equations (1) and (2) are rewritten to:

$$(1/q)\{[J_{px}(M') - J_{px}(M'-1)]/h_x'(M) + \quad (8\text{-}1)$$
$$[J_{py}(N') - J_{py}(N'-1)]/h_y'(N)\} = -U(M, N)$$

$$(1/q)\{[J_{nx}(M') - J_{nx}(M'-1)]/h_x'(M) + \quad (8\text{-}2)$$
$$[J_{ny}(N') - J_{ny}(N'-1)]/h_y'(N)\} = U(M, N)$$

In equations (8-1) and (8-2), the carrier-generation term G is omitted for simplicity's sake, since this term is not required in analyzing semiconductor devices under ordinary operating conditions. Also for simplicity's sake, the physical time differential terms $\partial p/\partial \tau$ and $\partial n/\partial \tau$ are set at zero, on the assumption that calculations are performed to find a DC steady-state solution. It should be noted, however, that calculations can be performed essentially in the same way to obtain a non-steady-state solution, where the physical time differential terms are not zero.

Likewise, Poisson's equation (5) can be expressed as follows:

$$[1/h_x'(M)] \quad (9)$$
$$\{[\psi(M+1, N) - \psi(M, N)]/h_x(M') - [\psi(M, N) - \psi(M-1, N)]/$$
$$h_x(M'-1)\} + [1/h_y'(N)]\{[\psi(M, N+1) - \psi(M, N)]/$$
$$h_y(N') - [\psi(M, N) - \psi(M, N-1)]/h_y(N'-1)\} =$$
$$-(q/\varepsilon)[\Gamma(M, N) + p(M, N) - n(M, N)]$$

where, for the sake of simplicity, doping function, i.e., the difference $\Gamma$ between the donor concentration and the acceptor concentration, is set as $\Gamma = N_d - N_a$.

Here, the carrier recombination term U(M,N) is expressed in the Shockley-Read-Hall form for the ensuing development. Namely:

$$U(M, N) = [p(M, N)n(M, N) - n_i^2(M, N)]/ \quad (10)$$
$$\{\tau_n[p(M, N) + n_i(M, N)] +$$
$$\tau_p[n(M, N) + n_i(M, N)]\}$$

Next, equations (3) and (4) for currents are discretized, by applying the Scharfetter-Gummel approximation in order to, as is known in the art, ensure the stability in numerical analysis. As a result of this, the x-component and y-component of the hole current density, and those of the electron current density are given as follows:

$$J_{px}(M')=[q/h_x(M')][\lambda_{px1}(M')p(M,N)+\lambda_{px2}(M')p(M+1,N)] \quad (11\text{-}1)$$

$$J_{py}(N')=[q/h_y(N')][\lambda_{py1}(N')p(M,N)+\lambda_{py2}(N')p(M,N+1)] \quad (11\text{-}2)$$

$$J_{nx}(M')=[q/h_x(M')][\lambda_{nx1}(M')n(M,N)+\lambda_{nx2}(M')n(M+1,N)] \quad (11\text{-}3)$$

$$J_{ny}(N')=[q/h_y(N')][\lambda_{ny1}(N')n(M,N)+\lambda_{ny2}(N')n(M,N+1)] \quad (11\text{-}4)$$

The $\lambda$-items in equations (11-1) to (11-4) are defined by the following equations:

$$\lambda_{px1}(M')=[\mu_p(M')/\theta(M')][\beta(M')/(1-e^{-\beta(M')})]$$

$$\lambda_{px2}(M')=[\mu_p(M')/\theta(M')][\beta(M')/(1-e^{\beta(M')})]$$

$$\lambda_{py1}(N')=[\mu_p(N')/\theta(N')][\beta(N')/(1-e^{-\beta(N')})]$$

$$\lambda_{py2}(N')=[\mu_p(N')/\theta(N')][\beta(N')/(1-e^{\beta(N')})]$$

$$\lambda_{nx1}(M')=[\mu_n(M')/\mu_p(M')]\lambda_{px2}(M')$$

$$\lambda_{nx2}(M')=[\mu_n(M')/\mu_p(M')]\lambda_{px1}(M')$$

$$\lambda_{ny1}(N')=[\mu_n(N')/\mu_p(N')]\lambda_{py2}(N')$$

$$\lambda_{ny2}(N')=[\mu_n(N')/\mu_p(N')]\lambda_{py1}(N') \quad (12)$$

Thus, basic equations (1) to (5) for modeling semiconductor devices have been rewritten to discrete ones. The equations which we are to solve are: equation (9); equation (8-1) with equations (11-1) to (11-4), auxiliary relations (12) and recombination equation (10) substituted therein; and equation (8-2) with equations (11-1) to (11-4), auxiliary relations (12) and recombination equation (10) substituted therein. These three equations contain three unknown quantities p, n, and $\psi$. However, it is difficult to solve equations (8-1) and (8-2) unless these equations are transformed, since these equations each contain nonlinear relations for the three unknown quantities. Hence, equations (8-1) and (8-2) are expanded in Taylor series for the unknown quantities, neglecting quadratic terms and higher-order terms, thereby to derive linear equations for the changes $\delta p$, $\delta n$, and $\delta\psi$ of the unknown quantities p, n, and $\psi$.

More specifically, we first assume that the unknown quantities are each the sum of a trial value (assigned with superscript 0) and a change. That is:

$$p(M,N)=p^0(M,N)+\delta p(M,N)$$

$$n(M,N)=n^0(M,N)+\delta n(M,N)$$

$$\psi(M,N)=\psi^0(M,N)+\delta\psi(M,N) \quad (13)$$

Then, current equations (11-1) to (11-4) are expanded in Taylor series, neglecting the quadratic terms and the higher-order terms, thus yielding the following results:

$$J_{px}(M') \approx J_{px}^0(M') + [\partial J_{px}^0(M')/\partial p(M,N)]\delta p(M,N) + \quad (14\text{-}1)$$
$$[\partial J_{px}^0(M')/\partial p(M+1,N)]\delta p(M+1,N) +$$
$$[\partial J_{px}^0(M')/\partial \psi(M,N)]\delta\psi(M,N) +$$
$$[\partial J_{px}^0(M')/\partial \psi(M+1,N)]\delta\psi(M+1,N)$$

$$J_{py}(N') \approx J_{py}^0(N') + [\partial J_{py}^0(N')/\partial p(M,N)]\delta p(M,N) + \quad (14\text{-}2)$$
$$[\partial J_{py}^0(N')/\partial p(M,N+1)]\delta p(M,N+1) +$$
$$[\partial J_{py}^0(N')/\partial \psi(M,N)]\delta\psi(M,N) +$$
$$[\partial J_{py}^0(N')/\partial \psi(M,N+1)]\delta\psi(M,N+1)$$

$$J_{nx}(M') \approx J_{nx}^0(M') + [\partial J_{nx}^0(M')/\partial n(M,N)]\delta n(M,N) + \quad (14\text{-}3)$$
$$[\partial J_{nx}^0(M')/\partial n(M+1,N)]\delta n(M+1,N) +$$
$$[\partial J_{nx}^0(M')/\partial \psi(M,N)]\delta\psi(M,N) +$$
$$[\partial J_{nx}^0(M')/\partial \psi(M+1,N)]\delta\psi(M+1,N)$$

$$J_{ny}(N') \approx J_{ny}^0(N') + [\partial J_{ny}^0(N')/\partial n(M,N)]\delta n(M,N) + \quad (14\text{-}4)$$
$$[\partial J_{ny}^0(N')/\partial n(M,N+1)]\delta n(M,N+1) +$$
$$[\partial J_{ny}^0(N')/\partial \psi(M,N)]\delta\psi(M,N) +$$
$$[\partial J_{ny}^0(N')/\partial \psi(M,N+1)]\delta\psi(M,N+1)$$

where superscript 0 is assigned to quantities which correspond to $p^0$, $n^0$, and $\psi^0$.

In addition to the current equations, recombination term U(M,N) is also nonlinear. Recombination term U(M,N) is therefore expanded in Taylor series. That is:

$$U(M,N)=U^0(M,N)+U_p^0(M,N)\delta p(M,N)+U_n^0(M,N)\delta n(M,N)$$

where $$U_p(M,N) = \partial U(M,N)/\partial p(M,N) \quad (15)$$
$$= [n(M,N)-\tau_n U(M,N)]/\{\tau_n[p(M,N)+$$
$$n_i(M,N)]+\tau_p[n(M,N)+n_i(M,N)]\}$$

$$U_n(M,N) = \partial U(M,N)/\partial n(M,N)$$
$$= [p(M,N)-\tau_p U(M,N)]/\{\tau_n[p(M,N)+$$
$$n_i(M,N)]+\tau_p[n(M,N)+n_i(M,N)]\}$$

Equations (13), (14-1), (14-2), (14-3), (14-4), and (15) are substituted in equations (8-1), (8-2) and (9), yielding the following matrix-vector equation for the two-dimensional problem:

$$A_T(M,N)\Theta_T(M,N-1)+B_T(M,N)\Theta_T(M,N)+ \quad (16)$$
$$C_T(M,N)\Theta_T(M,N+1)+D_T(M,N)\Theta_T(M-1,N)+$$
$$E_T(M,N)\Theta_T(M+1,N)=F_T(M,N)$$

where, by definition of matrixes and vectors:

$$A_T(M,N) = \begin{pmatrix} a_{11} & a_{12} & a_{13} \\ a_{21} & a_{22} & a_{23} \\ a_{31} & a_{32} & a_{33} \end{pmatrix} \quad (17)$$

$$B_T(M,N) = \begin{pmatrix} b_{11} & b_{12} & b_{13} \\ b_{21} & b_{22} & b_{23} \\ b_{31} & b_{32} & b_{33} \end{pmatrix}$$

$$C_T(M,N) = \begin{pmatrix} c_{11} & c_{12} & c_{13} \\ c_{21} & c_{22} & c_{23} \\ c_{31} & c_{32} & c_{33} \end{pmatrix}$$

$$D_T(M,N) = \begin{pmatrix} d_{11} & d_{12} & d_{13} \\ d_{21} & d_{22} & d_{23} \\ d_{31} & d_{32} & d_{33} \end{pmatrix}$$

$$E_T(M,N) = \begin{pmatrix} e_{11} & e_{12} & e_{13} \\ e_{21} & e_{22} & e_{23} \\ e_{31} & e_{32} & e_{33} \end{pmatrix}$$

-continued $$E_T(M, N) = \begin{pmatrix} f_1 \\ f_2 \\ f_3 \end{pmatrix}$$

$$\Theta_T(M, N) = \begin{pmatrix} p(M, N) \\ n(M, N) \\ \psi(M, N) \end{pmatrix}$$

The matrix elements and the vector elements can be more explicitly represented as follows:

$a_{11} = -[1/qh'_y(N)][\partial J^0_{py}(N-1)/\partial p(M, N-1)]$ $a_{12} = 0$ $a_{13} = -[1/qh'_y(N)][\partial J^0_{py}(N-1)/\partial \psi(M, N-1)]$ $a_{21} = 0$ $a_{22} = -[1/qh'_y(N)][\partial J^0_{ny}(N-1)/\partial n(M, N-1)]$ $a_{23} = -[1/qh'_y(N)][\partial J^0_{ny}(N-1)/\partial \psi(M, N-1)]$ $a_{31} = 0$ $a_{32} = 0$ $a_{33} = \gamma_1(M, N)$ $\quad = 1/[h'_y(N)h_y(N-1)]$ $b_{11} = [1/h'_x(M)][\partial J^0_{px}(M)/\partial p(M, N)] -$ $\quad [\partial J^0_{px}(M-1)/\partial p(M, N)] + [1/h'_y(N)][\partial J^0_{py}(N)/$ $\quad \partial p(M, N) - \partial J^0_{py}(N-1)/\partial p(M, N)] +$ $\quad \partial U^0(M, N)/\partial p(M, N)$ $b_{12} = \partial U^0(M, N)/\partial n(M, N)$ $b_{13} = [1/qh'_x(M)][\partial J^0_{px}(M)/\partial \psi(M, N) -$ $\quad \partial J^0_{px}(M-1)/\partial \psi(M, N)] + [1/qh'_y(M)][\partial J^0_{py}(N)/$ $\quad \partial \psi(M, N) - \partial J^0_{py}(N-1)/\partial \psi(M, N)]$ $b_{21} = -\partial U^0(M, N)/\partial p(M, N)$ $b_{22} = [1/qh'_x(M)][\partial J^0_{nx}(M)/\partial n(M, N) -$ $\quad \partial J^0_{nx}(M-1)/\partial n(M, N)] + [1/qh'_y(N)][\partial J^0_{ny}(M)/$ $\quad \partial n(M, N) - \partial J^0_{ny}(N-1)/\partial n(M, N)] -$ $\quad \partial U^0(M, N)/\partial n(M, N)$ $b_{23} = [1/qh'_x(M)][\partial J^0_{ny}(N)/\partial \psi(M, N) -$ $\quad \partial J^0_{nx}(M-1)/\partial \psi(M, N)] + [1/qh'_y(N)][\partial J^0_{ny}(N)/$ $\quad \partial \psi(M, N) - \partial J^0_{ny}(N-1)/\partial \psi(M, N)]$ $b_{31} = q/\varepsilon, \quad b_{32} = -q/\varepsilon$ $b_{33} = -[1/h'_x(M)][1/h_x(M) + 1/h_x(M-1)] -$ $\quad [1/h'_y(N) + 1/h_y(N-1)]$ $c_{11} = [1/qh'_y(N)][\partial J^0_{py}(N)/\partial p(M, N+1)]$ $c_{12} = 0$ $c_{13} = [1/qh'_y(N)][\partial J^0_{py}(N)/\partial \psi(M, N+1)]$ $c_{21} = 0$ $c_{22} = [1/qh'_y(N)][\partial J^0_{ny}(N)/\partial n(M, N+1)]$ $c_{23} = [1/qh'_y(N)][\partial J^0_{ny}(N)/\partial \psi(M, N+1)]$ $c_{31} = 0, \quad c_{32} = 0$ $c_{33} = 1/h'_y(N)h_y(N)$ $d_{11} = -[1/qh'_x(M)][\partial J^0_{px}(M-1)/\partial p(M-1, N)]$ $d_{12} = 0$ $d_{13} = -[1/qh'_x(M)][\partial J^0_{px}(M-1)/\partial \psi(M-1, N)]$ $d_{21} = 0$ $d_{22} = -[1/qh'_x(M)][\partial J^0_{nx}(M-1)/\partial n(M-1, N)]$ $d_{23} = -[1/qh'_x(M)][\partial J^0_{nx}(M-1)/\partial \psi(M-1, N)]$ $d_{31} = 0, \quad d_{32} = 0$ $d_{33} = 1/h'_x(M)h_x(M-1)$ $e_{11} = [1/qh'_x(M)][\partial J^0_{px}(M)/\partial p(M+1, N)]$ $e_{12} = 0$ $e_{13} = [1/qh'_x(M)][\partial J^0_{px}(M)/\partial \psi(M+1, N)]$ $e_{21} = 0$ $e_{22} = [1/qh'_x(M)][\partial J^0_{nx}(M)/\partial n(M+1, N)]$ $e_{23} = [1/qh'_x(M)][\partial J^0_{nx}(M)/\partial \psi(M+1, N)]$ $e_{31} = 0, \quad e_{32} = 0$ $e_{33} = 1/h'_x(M)h_x(M)$ $f_1 = -U^0(M, N) + U^0_p(M, N)p^0(M, N) + U^0_n(M, N)n^0(M, N) -$ $\quad [1/qh'_x(M)][\partial J^0_p(M-1)/\partial \psi(M-1, N)] \times$ $\quad [\psi^0(M-1, N) - \psi^0(M, N)] + [1/qh'_x(M)][\partial J^0_p(M)/$ $\quad \partial \psi(M, N)] \times [\psi^0(M, N) - \psi^0(M+1, N)] -$ $\quad [1/qh'_y(N)][\partial J^0_p(N-1)/\partial \psi(M, N-1)] \times$ $\quad [\psi^0(M, N-1) - \psi^0(M, N)] + [1/qh'_y(N)][\partial J^0_p(N)/$ $\quad \partial \psi(M, N)] \times [\psi^0(M, N) - \psi^0(M, N+1)]$ $f_2 = U^0(M, N) - U^0_p(M, N)p^0(M, N) - U^0_n(M, N)n^0(M, N) -$ $\quad [1/qh'_x(M)][\partial J^0_n(M-1)/\partial \psi(M-1, N)] \times$ $\quad [\psi^0(M-1, N) - \psi^0(M, N)] + [1/qh'_x(M)][\partial J^0_n(M)/$ $\quad \partial \psi(M, N)] \times [\psi^0(M, N) - \psi^0(M+1, N)] -$ $\quad [1/qh'_y(N)][\partial J^0_n(N-1)/\partial \psi(M, N-1)] \times$ $\quad [\psi^0(M, N-1) - \psi^0(M, N)] + [1/qh'_y(N)][\partial J^0_n(N)/$ $\quad \partial \psi(M, N)] \times [\psi^0(M, N) - \psi^0(M, N+1)]$ $f_3 = -(q/\varepsilon)\Gamma(M, N)$ As can be understood from the above, matrix-vector equation (16) can be derived by linearizing discrete equations (8-1), (8-2) and (9).

Equation (16) corresponds to one of many meshpoints arranged in the x-direction and the y-direction. Hence, in order to obtain a solution for the whole device plane, equations (16) for the number of meshpoints must be solved simultaneously. In the case where the numbers of meshpoints forming the whole device plane are in the ranges of, for example, $1 \leq M \leq K$ and $1 \leq N \leq L$, the whole equations (16) will be represented as FIG. 2. For simplicity's sake, $A_T(M,N)$, $\Theta_T(M,N)$, and $F_T(M,N)$ have been rewritten to $A_{MN}$, $\Theta_{MN}$, and $F_{MN}$, respectively.

In FIG. 2, each matrix, for example $B_{11}$, has 3×3 dimensions. Therefore, the matrix system defining the whole device plane has (3KL)×(3KL) dimensions. In the case of a standard device model, L=30 and M=40. Hence, the matrix system for the standard device model has the dimensions of $3,600 \times 3,600 = 12,960,000 = 1.296 \times 10^7$.

Various methods are available which can be used to solve the matrix-vector equation schematically represented in FIG. 2. The most commonly employed method is Gaussian elimination. Gaussian elimination method involving a matrix system of the size specified above can be performed by means of a high-speed, large-memory computer now commercially available. Other alternative methods that can be employed to solve the matrix-vector equation of FIG. 2 are iteration methods which are effective particularly for the numerical analysis of very large matrix systems.

A matrix-solving method is employed not only in device modeling, but also in solving physical and engineering problems. Since the method is a calculation process well known in the art, it is assumed here that equation (16) has been solved for all space of the device. Obviously this means that the solutions of the linearized equation (16), which originates from the nonlinear equations (8-1), (8-2) and (9), have been obtained. If these solutions are substituted in the nonlinear equations (8-1), (8-2) and (9), both sides of the equation will not be equal in most cases, due to nonlinear effect. Let us therefore substitute the solution [p(M,N), n(M,N), ψ(M,N), 1≦M≦K, 1≦N≦L] as a set of trial values [p⁰(M,N), n⁰(M,N), ψ⁰(M,N), 1≦M≦K, 1≦N≦L], and then execute the same calculation process as mentioned above. Further, let us repeat this calculation process, a necessary number of times, then we will obtain solutions which completely satisfy equations (8-1), (8-2) and (9).

The matrix-solving method described above can be achieved to solve very large problems by means of the computer now available which has a great memory storage and can perform operations at high speed. However, the higher the performance of the computer, the larger a problem people wish to solve by means of computer. In view of this, it is still one of the greatest difficulties to solve matrix problems at a sufficiently high speed in order to accomplish successful modeling of semiconductor devices.

To solve these equations at high speed, methods and apparatus have been proposed which can solve particular equations, without applying matrix-solving methods, thereby to analyze the operations of semiconductor devices and specific physical phenomena. The present invention relates to an improved method of determining the sensitivity coefficients or the amplification gains, which helps to enhance the efficiency of the analysis of the semiconductor device operations and the specific physical phenomena.

SUMMARY OF THE INVENTION

An object of the present invention is to provide a method and apparatus for solving particular equations, without applying matrix-solving schemes, thereby to analyze the operations of semiconductor devices and specific physical phenomena.

According to the present invention, there are provided various methods of analyzing the operations of semiconductor devices or specific physical phenomena, and also various apparatuses for analyzing the operations of semiconductor devices or specific physical phenomena.

The first method, which is designed to determine a sensitivity coefficient in order to analyze the operation of a semiconductor device and in which simultaneous equations consisting of electron- and hole-transport equations and Poisson's equation are solved by means of a computer to accomplish the modeling of the semiconductor device, comprises the steps of:

rewriting simultaneous equations $f_p=0$, $f_n=0$, and $f_\psi=0$ to the following equations (19-1), (19-2), (19-3) containing artificial time differential terms dp/dt, dn/dt, dψ/dt and sensitivity coefficients $\lambda_p$, $\lambda_n$, and $\lambda_\psi$:

$$dp/dt = -\lambda_p f_p \quad (19\text{-}1)$$

$$dp/dt = \lambda_n f_n \quad (19\text{-}2)$$

$$d\psi/dt = \lambda_\psi f_\psi \quad (19\text{-}3)$$

determining meshpoints (M,N) of the semiconductor device, thereby transforming equations (19-1), (19-2) and (19-3) to the following:

$$dp(M,N)/dt = -\lambda_p(M,N) f_p(M,N) \quad (20\text{-}1)$$

$$dn(M,N)/dt = \lambda_n(M,N) f_n(M,N) \quad (20\text{-}2)$$

$$d\psi(M,N)/dt = \lambda_\psi(M,N) f_\psi(M,N) \quad (20\text{-}3)$$

where $f_p$, $f_n$, and $f_\psi$ are defined as follows:

$$f_p(M,N) = (1/q)\{[J_{px}(M) - J_{px}(M-1)]/h'_x(M)\} + \quad (21\text{-}1)$$
$$(1/q)\{[J_{py}(N) - J_{py}(N-1)]/h'_y(M)\} +$$
$$U(M,N)$$

$$f_n(M,N) = (1/q)\{[J_{nx}(M) - J_{nx}(M-1)]/h'_x(M)\} + \quad (21\text{-}2)$$
$$(1/q)\{[J_{ny}(N) - J_{ny}(N-1)]/h'_y(M)\} -$$
$$U(M,N)$$

$$f_\psi(M,N) = [1/h'_x(M)]\{[\psi(M+1,N) - \psi(M,N)]/ \quad (21\text{-}3)$$
$$h_x(M) - [\psi(M,N) - \psi(M-1,N)]/$$
$$h_x(M-1)\} + [1/h'_y(N)]\{[\psi(M,N+1) -$$
$$\psi(M,N)]/h_y(N) - [\psi(M,N) -$$
$$\psi(M,N-1)]/h_y(N-1)\} +$$
$$(q/\varepsilon)[\Gamma(M,N) + p(M,N) - n(M,N)]$$

time-integrating equations (20-1), (20-2) and (20-3), thereby obtaining the solutions of simultaneous equations, wherein the sensitivity coefficients $\lambda_p$, $\lambda_n$, and $\lambda_\psi$ are in such a manner that the eigen values of the error propagation matrices are not more than 1.

In the above description of the first method according to the invention, the problem to be solved by this method is assumed, for simplicity's sake, to be a DC steady-state problem which involves original functions $f_p$ and $f_n$ not containing differential values for physical time τ. To solve any other problem involving original functions which contains differential values for time τ, it suffices to rewrite the terms ∂p/∂τ and ∂n/∂τ contained in equations (8-1) and (8-1) to the following difference equations:

$$[p(M,N) - p_0(M,N)]/\partial\tau$$

$$[n(M,N) - n_0(M,N)]/\partial\tau$$

If the terms ∂p/∂τ and ∂n/∂τ are so rewritten, it will be possible to solve the simultaneous equations, without necessity of altering the essentials of the first method according to the invention.

The second method, which is designed to analyze the operation of a semiconductor device and in which simultaneous equations consisting of electron- and hole-transport equations and Poisson's equation are solved by means of a computer to accomplish the modeling of the semiconductor device, comprises the steps of:

rewriting the simultaneous equations to the following equations (19-1), (19-2), (19-3) containing artificial time differential terms dp/dt, dn/dt, dψ/dt and sensitivity coefficients $\lambda_p$, $\lambda_n$, and $\lambda_\psi$:

$$dp/dt = -\lambda_p f_p \quad (19\text{-}1)$$

$$dn/dt = \lambda_n f_n \quad (19\text{-}2)$$

$$d\psi/dt = \lambda_\psi f_\psi \quad (19\text{-}3)$$

where $$f_p = (1/q)\mathrm{div} J_p - (G-U) \quad (30\text{-}1)$$

$$f_n = (1/q)\mathrm{div} J_n + (G-U) \quad (30\text{-}2)$$

$$f_\psi = \mathrm{div\,grad}\,\psi + (q/\epsilon)(\Gamma + p - n) \quad (30\text{-}3)$$

$$n = n_i \exp[\theta(\psi - \phi_n)] \quad (30\text{-}4)$$

$$p = n_i \exp[\theta(\phi_p - \psi)] \quad (30\text{-}5)$$

$$\theta = q/(kT) \quad (30\text{-}6)$$

applying equations (30-4) and (30-5), thus eliminating p and n in the left sides of equations (19-1) and (19-2) and rewriting equations (19-1) and (19-2) to the following equations (33-1) and (33-2):

$$d\phi_p/dt = -\lambda_p f_p/(\theta p) + \lambda_\psi f_\psi \quad (33\text{-}1)$$

$$d\phi_n/dt = -\lambda_n f_n/(\theta n) + \lambda_\psi f_\psi \quad (33\text{-}2)$$

determining meshpoints (M,N) of the semiconductor device, and determining the sensitivity coefficients $\lambda_p$, $\lambda_n$, and $\lambda_\psi$ in such a manner that the eigen values of the error propagation matrix is not more than 1, thereby solving the simultaneous equations.

The third method, which is designed to analyze the operation of a semiconductor device and in which simultaneous equations consisting of electron- and hole-transport equations and Poisson's equation are solved by means of a computer to accomplish the modeling of the semiconductor device, comprises the steps of:

rewriting the simultaneous equations to the following equations (19-1), (19-2), (19-3) containing artificial time differential terms dp/dt, dn/dt, dψ/dt and sensitivity coefficients $\lambda_p$, $\lambda_n$, and $\lambda_\psi$:

$$dp/dt = -\lambda_p f_p \quad (19\text{-}1)$$

$$dn/dt = \lambda_n f_n \quad (19\text{-}2)$$

$$d\psi/dt = \lambda_\psi f_\psi \quad (19\text{-}3)$$

where $$f_p = (1/q)\mathrm{div} J_p - (G-U) \quad (30\text{-}1)$$

$$f_n = (1/q)\mathrm{div} J_n + (G-U) \quad (30\text{-}2)$$

$$f_\psi = \mathrm{div\,grad}\,\psi + (q/\epsilon)(\Gamma + p - n) \quad (30\text{-}3)$$

$$n = n_i \exp[\theta(\psi - \phi_n)] \quad (30\text{-}4)$$

$$p = n_i \exp[\theta(\phi_p - \psi)] \quad (30\text{-}5)$$

$$\theta = q/(kT) \quad (30\text{-}6)$$

applying equations (30-4) and (30-5), thus eliminating p and n in the left sides of equations (19-1) and (19-2) and rewriting equations (19-1) and (19-2) to the following equations (33-1) and (33-2):

$$d\phi_p/dt = -\lambda_p f_p/(\theta p) + \lambda_\psi f_\psi \quad (33\text{-}1)$$

$$d\phi_n/dt = -\lambda_n f_n/(\theta n) + \lambda_\psi f_\psi \quad (33\text{-}2)$$

eliminating the second term of equation (33-1) and also the second term of equation (33-2), thereby transforming equations (33-1) and (33-2) to the following equations (34-1) and (34-2):

$$d\phi_p/dt = -\lambda_p f_p/(\theta p) \quad (34\text{-}1)$$

$$d\phi_n/dt = -\lambda_n f_n/(\theta n) \quad (34\text{-}2)$$

determining meshpoints (M,N) of the semiconductor device, and determining the sensitivity coefficients $\lambda_p$, $\lambda_n$, and $\lambda_\psi$ in such a manner that the eigen values of the error propagation matrix is not more than 1, thereby solving the simultaneous equations.

The fourth method, which is designed to analyze the operation of a semiconductor device, is characterized in that one of the second and third methods is used during a first period, and the other of the second and third methods is used during a second period, thereby to peform time integration for solving the simultaneous equatiions.

The fifth method, which is designed to analyze the operation of a semiconductor device and in which simultaneous equations consisting of electron- and hole-transport equations and Poisson's equation are solved by means of a computer to accomplish the modeling of the semiconductor device, comprises the steps of:

rewriting simultaneous equations $f_p=0$, $f_n=0$, and $f_\psi=0$ to the following equations (19-1), (19-2), (19-3) containing artificial time differential terms dp/dt, dn/dt, dψ/dt and sensitivity coefficients $\lambda_p$, $\lambda_n$, and $\lambda_\psi$:

$$dp/dt = -\lambda_p f_p \quad (19\text{-}1)$$

$$dn/dt = \lambda_n f_n \quad (19\text{-}2)$$

$$d\psi/dt = \lambda_\psi f_\psi \quad (19\text{-}3)$$

where $$f_p = (1/q)\mathrm{div} J_p - (G-U) \quad (30\text{-}1)$$

$$f_n = (1/q)\mathrm{div} J_n + (G-U) \quad (30\text{-}2)$$

$$f_\psi = \mathrm{div\,grad}\,\psi + (q/\epsilon)(\Gamma + p - n) \quad (30\text{-}3)$$

$$n = n_i \exp[\theta(\psi - \phi_n)] \quad (30\text{-}4)$$

$$p = n_i \exp[\theta(\phi_p - \psi)] \quad (30\text{-}5)$$

$$\theta = q/(kT) \quad (30\text{-}6)$$

determining meshpoints (M,N) of the semiconductor device, and imparting spatial position dependency, which is appropriate for the physical properties of the semiconductor device, to the sensitivity coefficients $\lambda_p$, $\lambda_n$, and $\lambda_\psi$, thereby transforming equations (19-1), (19-2) and (19-3) to the following:

$$dp(M,N)/dt = -\lambda_p(M,N)f_p(M,N) \quad (20\text{-}1)$$

$$dn(M,N)/dt = \lambda_n(M,N)f_n(M,N) \quad (20\text{-}2)$$

$$d\psi(M,N)/dt = \lambda_\psi(M,N)f_\psi(M,N) \quad (20\text{-}3)$$

where $f_p$, $f_n$, and $f_\psi$ are defined as follows:

$$\lambda_p(M,N)/\delta t = \quad (32\text{-}1)$$
$$2\omega_p \Big/ \left\{ \left( \sum_{K,L} \partial f_p(M,N)/\partial p(K,L) \right) + \partial f_p(M,N)/\partial p(M,N) \right\}$$

$$\lambda_n(M,N)/\delta t = \quad (32\text{-}2)$$
$$2\omega_n \Big/ \left\{ \left( \sum_{K,L} \partial f_n(M,N)/\partial n(K,L) \right) - \partial f_n(M,N)/\partial n(M,N) \right\}$$

$$\lambda_\psi(M,N)/\delta t = \quad (32\text{-}3)$$
$$2\omega_\psi \Big/ \left\{ \left( \sum_{K,L} \partial f_\psi(M,N)/\partial \psi(K,L) \right) - \partial f_\psi(M,N)/\partial \psi(M,N) \right\}$$

where $\delta t$ is the discrete time intervals on the time axis, (M,N) is the number of any discrete space mesh-point, and (K,L) is the number of any neighboring point existing around the space meshpoint (M,N), time-integrating equations (20-1), (20-2) and (20-3) until these equations attain a steady state, thereby obtaining the solutions of the simultaneous equations, the terms $f_p(M,N)$, $f_n(M,N)$ and $f_\phi(M,N)$ in the right sides of equations (20-1), (20-2) and (20-3) being defined as follows:

$$f_p(M,N) = (1/q)\{[J_{px}(M) - J_{px}(M-1)]/h'_x(M)\} + \quad (26\text{-}1)$$
$$(1/q)\{[J_{py}(N) - J_{py}(N-1)]/h'_y(M)\} +$$
$$U(M,N)$$

$$f_n(M,N) = (1/q)\{[J_{nx}(M) - J_{nx}(M-1)]/h'_x(M)\} + \quad (26\text{-}2)$$
$$(1/q)\{[J_{ny}(N) - J_{ny}(N-1)]/h'_y(M)\} -$$
$$U(M,N)$$

$$f_{\psi(M,N)} = [1/h'_x(M)]\{[\psi(M+1,N) - \psi(M,N)]/ \quad (26\text{-}3)$$
$$h_x(M) - [\psi(M,N) - \psi(M-1,N)]/$$
$$h_x(M-1)\} + [1/h'_y(N)]\{[\psi(M,N+1) -$$
$$\psi(M,N)]/h_y(N) - [\psi(M,N) -$$
$$\psi(M,N-1)]/h_y(N-1)\} +$$
$$(q/\varepsilon)[\Gamma(M,N) + p(M,N) - n(M,N)]$$

In the above description of the fifth method according to the invention, the problem to be solved by this method is assumed, for simplicity's sake, to be a DC steady-state problem which involves original functions $f_p$ and $f_n$ not containing differential values for physical time $\tau$. To solve any other problem involving original functions which contains differential values for time $\tau$, it suffices to rewrite the terms $\partial p/\partial \tau$ and $\partial n/\partial \tau$ contained in equations (8-1) and (8-1) to the following difference equations:

$$[p(M,N) - p_0(M,N)]/\delta \tau$$

$$[n(M,N) - n_0(M,N)]/\delta \tau$$

If the terms $\partial p/\partial \tau$ and $\partial n/\partial \tau$ are so rewritten, it will be possible to solve the simultaneous equations, without necessity of altering the essentials of the first method according to the invention.

The sixth method, which is designed to analyze the operation of a semiconductor device, is identical to the second, third, and fourth methods, except that the sensitivity coefficients $\lambda_p$, $\lambda_n$, and $\lambda_\psi$ are obtained from the following equations:

$$\lambda_p(M,N)/\delta t = \quad (35\text{-}1)$$
$$2\omega_p \theta \Big/ \left\{ \left[ \sum_{K,L} |\partial/\partial \phi_p(K,L)(f_p(M,N)/p(M,N))| \right] + \right.$$
$$\left. \partial/\partial \phi_p(M,N)(f_p(M,N)/p(M,N)) \right\}$$

$$\lambda_n(M,N)/\delta t = \quad (35\text{-}2)$$
$$2\omega_n \theta \Big/ \left\{ \left[ \sum_{K,L} |\partial/\partial \phi_n(K,L)(f_n(M,N)/n(M,N))| \right] + \right.$$
$$\left. \partial/\partial \phi_n(M,N)(f_n(M,N)/n(M,N)) \right\}$$

$$\lambda_\psi(M,N)/\delta t = 2\omega_\psi \Big/ \quad (35\text{-}3)$$
$$\left\{ \left( \sum_{K,L} |\partial f_\psi(M,N)/\partial \psi(K,L)| \right) - \partial f_\psi(M,N)/\partial \psi(M,N) \right\}$$

The first apparatus, which is designed to analyze the operation of a semiconductor device and in which simultaneous equations consisting of electron- and hole-transport equations and Poisson's equation are rewritten to differential equations $dp/dt = -\lambda_p f_p$, $dn/dt = \lambda_n f_n$, and $d\psi/dt = \lambda_\psi f_\psi$, which contain time differential terms and sensitivity coefficients, and the differential equations are solved to accomplish the modeling of the semiconductor device, comprises:

one logic cell or m logic cells;

m amplifiers having an adjustable amplification gain $\lambda_i$ or a multiplier equivalent to the m amplifiers, connected to the logic cells; and detector network means connected to the logic cells, for detecting that said logic cells attain a transient stability, wherein the amplification gain $\lambda_i$ is automatically determined.

The second apparatus, which is designed to analyze the operation of a semiconductor device by the second method wherein simultaneous equations consisting of electron- and hole-transport equations and Poisson's equation are rewritten to differential equations $d\phi_p/dt = -\lambda_p f_p/(\theta p) + \lambda_\psi f_\psi$, $d\phi_n/dt = -\lambda_n f_n/(\theta n) + \lambda_\psi f_\psi$, $d\psi/dt = \lambda_\psi f_\psi$, containing time differential terms and sensitivity coefficients, comprises:

first means for designating the addresses of meshpoints of the semiconductor device;

second means for performing integration in accordance with $\phi_p$, $\phi_n$, $\psi$, $\lambda_p$, $\lambda_n$, and $\lambda_\psi$ corresponding to any meshpoint whose address has been designated by the first means, thereby deriving $\phi_p$, $\phi_n$, and $\psi$ at the meshpoint;

third means for storing $\phi_p$, $\phi_n$, and $\psi$, thus derived; and fourth means for determining whether or not $\phi_p$, $\phi_n$ and $\psi$, derived by the second means fall within allowable error limits, for feeding $\phi_p$, $\phi_n$ and $\psi$ back to said second means so that said second means performs integration again, when $\phi_p$, $\phi_n$ and $\psi$ fall outside the allowable error limits, and for outputting $\phi_p$, $\phi_n$ and $\psi$ when $\phi_p$, $\phi_n$ and $\psi$ fall within the allowable error limits.

The third apparatus, which is designed to analyze the operation of a semiconductor device by the third method wherein simultaneous equations consisting of electron- and hole-transport equations and Poisson's equation are rewritten to differential equations $d\phi_p/dt=-\lambda_p f_p/(\theta p)$, $d\phi_n/dt=-\lambda_n f_n/(\theta n)$, $d\psi/dt=\lambda_\psi f_\psi$ containing time differential terms and sensitivity coefficients, comprises:

first means for designating the addresses of meshpoints of the semiconductor device;

second means for performing integration in accordance with $\phi_p$, $\phi_n$, $\psi$, $\lambda_p$, $\lambda_n$, and $\lambda_\psi$, corresponding to any meshpoint whose address has been designated by the first means, thereby deriving $\phi_p$, $\phi_n$ and $\psi$ at the meshpoint;

third means for storing $\phi_p$, $\phi_n$ and $\psi$, thus derived; and fourth means for determining whether or not $\phi_p$, $\phi_n$ and $\psi$, derived by the second means fall within allowable error limits, for feeding $\phi_p$, $\phi_n$ and $\psi$ back to said second means so that said second means performs integration again, when $\phi_p$, $\phi_n$ and $\psi$ fall outside the allowable error limits, and for outputting $\phi_p$, $\phi_n$ and $\psi$ when $\phi_p$, $\phi_n$ and $\psi$ fall within the allowable error limits.

The fourth apparatus, which is designed to analyze the operation of a semiconductor device by the fourth method wherein simultaneous equations consisting of electron- and hole-transport equations and Poisson's equation are rewritten to either differential equations $d\phi_p/dt=-\lambda_p f_p/(\theta p)+\lambda_\psi f_\psi$, $d\phi_n/dt=-\lambda_n f_n/(\theta n)+\lambda_\psi f_\psi$, $d\psi/dt=\lambda_\psi f_\psi$ containing time differential terms and sensitivity coefficients, or differential equations $d\phi_p/dt=-\lambda_p f_p/(\theta p)$, $d\phi_n/dt=-\lambda_n f_n/(\theta n)$, $d\psi/dt=\lambda_\psi f_\psi$ containing time differential terms sensitivity coefficient, comprises:

first means for designating the addresses of meshpoints of the semiconductor device;

second means for performing integration in accordance with $\phi_p$, $\phi_n$, $\psi$, $\lambda_p$, $\lambda_n$, and $\lambda_\psi$, corresponding to any meshpoint whose address has been designated by the first means, by using one of the ninth and tenth methods during a first period, and by using the other of the ninth and tenth methods during a second period, thereby deriving $\phi_p$, $\phi_n$ and $\psi$ at the meshpoint;

third means for storing $\phi_p$, $\phi_n$ and $\psi$, thus derived; and fourth means for determining whether or not $\phi_p$, $\phi_n$ and $\psi$, derived by the second means fall within allowable error limits, for feeding $\phi_p$, $\phi_n$ and $\psi$ back to said second means so that said second means performs integration again, when $\phi_p$, $\phi_n$ and $\psi$ fall outside the allowable error limits, and for outputting $\phi_p$, $\phi_n$ and $\psi$ when $\phi_p$, $\phi_n$ and $\psi$ fall within the allowable error limits.

The fifth apparatus, which is designed to analyze the operation of a semiconductor device by the fifth method wherein simultaneous equations consisting of electron- and hole-transport equations and Poisson's equation are rewritten to differential equations $dp/dt=-\lambda_p f_p$, $dn/dt=\lambda_n f_n$, $d\psi/dt=\lambda_\psi f_\psi$, containing time differential terms and sensitivity coefficients, comprises:

first means for designating the addresses of meshpoints of the semiconductor device;

second means for performing integration in accordance with p, n, $\psi$, $\lambda_p$, $\lambda_n$, and $\lambda_\psi$ corresponding to any meshpoint whose address has been designated by the first means, thereby deriving p, n and $\psi$ at the mesh-point; and third means for determining whether or not p, n and $\psi$ derived by the second means fall within allowable error limits, for feeding p, n and $\psi$ back to said second means so that said second means performs integration again, when p, n and $\psi$ fall outside the allowable error limits, and for outputting p, n and $\psi$ when p, n and $\psi$ fall within the allowable error limits.

The sixth apparatus, which is designed to analyze the operation of a semiconductor device by the sixth method wherein simultaneous equations consisting of electron- and hole-transport equations and Poisson's equation are rewritten to either differential equations $d\phi_p/dt=-\lambda_p f_p/(\theta p)+\lambda_\psi f_\psi$, $d\phi_n/dt=-\lambda_n f_n/(\theta n)+\lambda_\psi f_\psi$, $d\psi/dt=\lambda_\psi f_\psi$ containing time differential terms and sensitivity coefficients, or differential equations $d\phi_p/dt=-\lambda_p f_p/(\theta p)$, $d\phi_n/dt=-\lambda_n f_n/(\theta n)$, $d\psi/dt=\lambda_\psi f_\psi$ containing time differential terms sensitivity coefficient, or to both sets of simultaneous equations, comprises:

first means for designating the addresses of meshpoints of the semiconductor device;

second means for performing integration in accordance with $\phi_p$, $\phi_n$, $\psi$, $\lambda_p$, $\lambda_n$, and $\lambda_\psi$, corresponding to any meshpoint whose address has been designated by the first means, thereby deriving $\phi_p$, $\phi_n$ and $\psi$ at the meshpoint;

third means for storing $\phi_p$, $\phi_n$ and $\psi$, thus derived; and fourth means for determining whether or not $\phi_p$, $\phi_n$ and $\psi$, derived by the second means fall within allowable error limits, for feeding $\phi_p$, $\phi_n$ and $\psi$ back to said second means so that said second means performs integration again, when $\phi_p$, $\phi_n$ and $\psi$ fall outside the allowable error limits, and for outputting $\phi_p$, $\phi_n$ and $\psi$ when $\phi_p$, $\phi_n$ and $\psi$ fall within the allowable error limits.

As has been described, in the first to sixth methods according to the invention, the simultaneous equations consisting of electron- and hole-transport equations and Poisson's equation are rewritten to differential equations which contain differential terms and sensitivity coefficients $\lambda$, and the sensitivity coefficients $\lambda$ are set according to equations (32-1), (32-2) and (32-3) or (35-1), (35-2) and (35-3). Hence, these methods can solve the matrix problems at high speed without external control, even if the equations involved in the problems are massive.

The first to sixth apparatuses according to the invention construct circuit networks in accordance with the first to sixth analysis methods. The circuit networks, thus constructed, are operated until the simultaneous equations attain steady states, thereby obtaining the solutions of the equations. Since the sensitivity coefficients $\lambda$ can be determined according to specific equations, respectively, the first to sixth apparatuses can obtain the solutions of the simultaneous equations at high speed.

The seventh method, which is designed to determine a sensitivity coefficient in order to analyze the operation of a semiconductor device and in which a Poisson's equation representing the relationship between electrical potential and space charge is solved by means of a computer to accomplish the modeling of the semiconductor device, comprises the steps of:

rewriting the Poisson's equation to the following equation (22) containing time differential terms $\partial\psi/\partial t$ and a sensitivity coefficient $\lambda$, $$\partial\psi/\partial t=\lambda f_\psi \tag{22}$$

determining meshpoints (M,N) of the semiconductor device, thereby transforming equation (22) to the following equation (23):

$$\partial\psi(M,N)/\partial t = \lambda(M,N) f_\psi(M,N) \tag{23}$$

time-integrating equation (23) to solve the Poisson's equation, wherein the sensitivity coefficient λ is determined such that the eigen values of the error propagation matrix is not more than 1.

The eighth method of analyzing a Poisson's equation representing the relationship between electrical potential and space charge, by means of a computer, thereby to accomplish the modeling of a semiconductor device, comprises the steps of:

rewriting the Poisson's equation to the following equation (22) containing time differential terms ∂ψ/∂t and a sensitivity coefficient λ, $$\partial\psi/\partial t = \lambda_\psi f_\psi \tag{22}$$

determining meshpoints (M,N) of the semiconductor device, and imparting spatial position dependency, which is appropriate for the physical properties of the semiconductor device, thereby transforming equation (22) to the following equation (23):

$$\partial\psi(M,N)/\delta t = \lambda(M,N) f_\psi(M,N) \tag{23}$$

determining the sensitivity coefficients λ (M,N) by the following equation (54-11):

$$\lambda(M,N)\delta t \leq 2/(2H+\alpha) \tag{54-11}$$

where δt is the discrete time intervals on the time axis, (M,N) is the number of any discrete space meshpoint;

time-integrating equations (23) until these equations attain a steady state, thereby obtaining the solutions of the Poisson's equation.

The seventh apparatus, which is designed to analyze the operation of a semiconductor device and in which a Poisson's equation representing the relationship between electrical potential and space charge is rewritten to a differential equation dψ/dt=λf$_\psi$, and the differential equation is solved to accomplish the modeling of the semiconductor device, comprises:

one logic cell or m logic cells;

m amplifiers having an adjustable amplification gain λ$_i$ or a multiplier equivalent to the m amplifiers, connected to the logic cells; and detector network means connected to the logic cells, for detecting that said logic cells attain a is transient stability, wherein the amplification gain λ$_i$ is automatically determined.

The eighth apparatus for analyzing Poisson's equation by the method as defined in eighth method, by rewriting the Poisson's equation to differential equations, ∂ψ/∂t=λ$_\psi$f$_\psi$, containing time differential term and sensitivity coefficient, and then solving the differential equations, thereby to accomplish the modeling of a semiconductor device, comprises:

first means for designating the addresses of meshpoints of the semiconductor device;

second means for performing integration in accordance with ψ and λ$_\psi$, corresponding to any meshpoint whose address has been designated by said first means, thereby deriving ψ at the meshpoint;

third means for storing ψ derived by said second means; and fourth means for determining whether or not ψ derived by said second means fall within allowable error limit, for feeding ψ back to said second means so that said second means performs integration again, when ψ fall outside the allowable error limit, and for outputting ψ when ψ fall within the allowable error limit.

The ninth method, which is designed to determine a sensitivity coefficient in order to analyze a specific physical phenomenon and in which either a single equation or simultaneous equations f(x)=0 are solved by means of a computer, comprises the steps of:

rewriting the equation or the simultaneous equations to the following equation (25) containing a time differential term dx/dt and a sensitivity coefficient λ:

$$dx/dt = \lambda_f(x) \tag{25}$$

time-differentiating equation (25), thereby obtaining the solution of the equation or the simultaneous equations, wherein the sensitivity coefficient λ is determined such that the eigen values of the error propagation matrices are not more than 1.

In the ninth method, the vector function f may contain operators for an unknown quantity x and the function of x such as a differential operator, an integral operator and other operators. Alternatively, the vector function f may contain operators for physical time τ and the function of τ such as a differential operator, an integral operator and other operators.

The ninth apparatus, which is designed to analyze a specific physical phenomenon and in which either a single equation or simultaneous equations f(x)=0 are rewritten to a differential equation dx/dt=λf(x), and the differential equation is solved, comprises:

an analog or digital calculating section for performing an integral process on time axis; and means for adjusting and optimizing the size of a coefficient matrix λ while the calculating section is performing the integral process.

wherein the amplification gain λ$_i$ is automatically determined.

The tenth method, which is designed to analyze the operation of a semiconductor device and in which a problem of determining the equivalent-circuit constants of the semiconductor device is solved by least squares method by means of a computer, comprises the steps of:

rewriting the problem of determining the equivalent-circuit constants to the following equation (24) containing a time differential term dq/dt and a sensitivity coefficient λ:

$$dq/dt = -\lambda(Aq-b) \tag{24}$$

imparting different values, which are appropriate for the physical properties represented by the equivalent-circuit constants of the semiconductor device, to the sensitivity coefficient λ; and time-integrating equation (24), thereby obtaining the solution of the problem.

The tenth apparatus, which is designed to analyze the operation of a semiconductor device and in which a problem of determining the equivalent-circuit constants of the semiconductor device is rewritten to a differential equation dq/dt=−λ(Aq−b), and the differential equation is solved by least squares method, comprises:

one logic cell or m logic cells;

m amplifiers having an adjustable amplification gain $\lambda_i$ or a multiplier equivalent to the m amplifiers, connected to the logic cells; and detector network means connected to the logic cells, for detecting that said logic cells attain a transient stability.

As has been described, in the first to tenth methods according to the invention, the equations which must be solved (i.e., the simultaneous equations consisting of electron- and hole-transport equations and Poisson's equation, the Poisson's equation representing the relationship between electrical potential and space charge, and the problem of determining the equivalent-circuit constants of the semiconductor device, and the problem of analyzing a specific phenomenon) are rewritten to a differential equation which contains differential terms and sensitivity coefficients $\lambda$, and the sensitivity coefficients $\lambda$ are set at values appropriate for the physical properties of the equations to be solved. Hence, these methods can solve the matrix problems at high speed even if the equations involved in the problems are massive.

In the first to tenth apparatuses according to the invention, the independent variable t in equation (25) is regarded as time, and the unknown quantity x is the voltage applied on a certain terminal of an electric circuit network, which satisfies equation (25). The transient phenomenon of the electric circuit network develops with time to become stable. When the phenomenon becomes stable, the apparatus is so constructed, as a whole, as to provide the solution of equation (25). Further, the apparatus to achieve the first to tenth methods may be constructed by digital circuit.

To solve matrix equation Ax=b by carrying out digital computation in the conventional methods, the equation is rewritten to $x=A^{-1}b$ if elimination technique is applied. This computation includes a so-called inverse matrix calculation or a calculation essentially equivalent thereto. A great amount of time must be spent to achieve an inverse matrix calculation or a calculation equivalent thereto.

In the computation process described above, whether or not x can reach a steady value depends upon whether the diagonal coefficient matrix $\lambda$ selected is appropriate or not. Generally, when $\lambda$ is too small, the time differential amount dx/dt is also too small. In this case, the initial trial value, $x=x_0$, changes little, and a great amount of time inevitably lapses before x reaches the steady value. Conversely, when $\lambda$ is too great, the time differential amount dx/dt is also too large. In this case, the behavior of the system (or the circuit network) represented by differential equation (25) is unstable. In an actual example where the numerical analysis was carried out by means of digital simulation, the unknown quantity x changed excessively when $\lambda$ was too great; upon lapse of an infinitesimal period of time, the quantity x began to change in reverse direction toward a steady value.

Obviously, the unknown quantity x changes in the forward and reverse directions repeatedly with passage of time. In other words, the quantity x fluctuates on the time axis, toward and away from the steady value, and cannot settle at the steady value within a short period of time. As is known in the art, the more the quantity x changes, the greater the amplitude of its fluctuation. In some cases, the quantity x may change indefinitely in one direction (either the positive direction or the negative direction); it may diverge indefinitely.

To summarize the above, in order to operate the apparatus of the invention according to the method of the invention, it is important to set the size of the diagonal coefficient matrix $\lambda$ at such a value as causes the unknown quantity x to change moderately.

It should be noted that, since $\lambda$ is a diagonal coefficient matrix, n coefficients ($\lambda_1, \lambda_2, \ldots \lambda_n$) correspond to n elements ($x_1, x_2, \ldots x_n$) which are the components of the vector x. Hence, the method and apparatus according to the present invention has a degree of freedom that n coefficients can be adjusted to values which are appropriate for n unknown quantity elements. Therefore, the method of this invention can impart a steady value to the unknown quantity, and is much more efficient than the conventional method, i.e., the iteration method, wherein so-called "relaxation coefficients" are used, each for one matrix equation in most cases.

It will now be explained how to optimize $\lambda$. As has been pointed out, $\lambda$ is a diagonal matrix having n elements $\lambda_1, \lambda_2, \ldots \lambda_n$. It can be expressed as:

$$\lambda = \text{diag}(\lambda_1, \lambda_2, \ldots \lambda_n) \tag{26}$$

Equation (25) must contain a maximum time differential quantity, whose absolute value is $|dx_i/dt|_{max}$, which enables the apparatus to operate stably for all unknown quantities $x_i$, where $i=1, 2, \ldots n$. Hence, any component of $\lambda_i$ must not exceed the limits determined by the maximum time differential quantity. This condition is represented as follows:

$$|\lambda_i| \leq \left(1 \bigg/ \left|\sum_j a_{ij}x_j - b_i\right|\right) |dx_i/dt|_{max} \quad i = 1, 2, \ldots, n \tag{27}$$

The magnitude of the right side of equation (27) depends on the nature of the problem to solve. According to matrix algebra, the condition applicable to determine the magnitude of the right side is usually related to the eigen value to the subject matrix. The apparatus of this invention has amplifiers for m logic cells. As will be described later in detail, each of the amplifiers has an amplification gain $\lambda_i$ which is great enough to solve actual problems and which can be adjusted by means of a dial or a controller. It is also desirable that m logic cell are connected to a respective multiplier whose input signal is multiplied $\lambda_i$ by the multiplier.

In the methods, the parameter function $\lambda$ is determined from stability conditions. By definition, the stability conditions allow us to neglect the accumulation effect of round-off errors which have been made during a numerical analysis. (See G. D. Smith *Solutions of Partial Differential Equations by Means of Computers,* Science Inc., 1979, p. 63.) To determine the parameter $\lambda$, $x^0+\delta x$ is substituted for the variable x in equation (25), the equation is linearized for $\delta x$, and the term not containing $\delta x$ is eliminated as a constant, whereby equation (25) is transformed to the following equation (26):

$$d(\delta x)/dt = \lambda(\delta f)(\delta x) \tag{26}$$

Discreting equation (26) yields:

$$\delta x_{t+dt} = \lambda dt(\delta f)\delta x_t + \delta x_t \tag{27}$$

The equation representing the transition from $\delta x_t$ to $\delta x_{t+dt}$ can be rewritten into the following matrix equation (28):

$$\delta x_{t+dt} = A \delta x_t \qquad (28)$$

where A is a coefficient matrix known as "error propagation matrix." The function λ appears in the equation in the form of the product λdt (dt: time increment). Hence, the determining of the parameter λ is influenced by the way of determining the time increment dt. To discuss the stability of any system, we need to consider Gerschgorin circle theorem. This mathematical theorem is defined as follows, according to G. D. Smith *Solutions of Partial Differential Equations by Means of Computers*, Science Inc., 1979, p. 68.

Gerschgorin Circle Theorem

Let us assume that any eigen value of an nth-order matrix $A=(a_{ij})$ is an element of the following closed circuit set Gi, provided A=G+F, and $F=(f_{ij})$, G=diag $(a_{11}, a_{22}, \ldots, a_{nn})$:

$$\mu \subset \bigcup_{i=1}^{n} G_i$$

where Gi={z (complex number); $|z-a_{ii}| \leq r_i$}

$$r_i = \Sigma |f_{ij}| \qquad (29)$$

This theorem defines the distribution of the eigen values of a matrix in a complex plane, as is illustrated in FIG. 3. This theorem is applied to the matrix equation (28). The condition for stability, that is, the absolute eigen value should be 1 or less, is satisfied if the circles defined by equation (29) exist within the unit circle in the complex plane. The equation for determining λ is rewritten in a positive form so as to satisfy the stability condition, and a circuit network apparatus is constructed. What is important here is that this circuit network apparatus has the amplification gain which corresponds to λ. If the equation cannot be rewritten in a positive form, λ can be determined through a numerical process. The apparatus may have a multiplier equivalent to an amplifier.

To assemble the apparatus of this invention, m amplifiers are provided for m logic cells. Each of the amplifiers is designed to have an amplification gain $\lambda_i$ which can be adjusted and is so great that the apparatus can solve the actual, individual problems. To adjust the amplification gain $\lambda_i$, the apparatus has a dial or a controller. It is also desirable that m logic cells are connected to a respective multiplier whose input signal is multiplied $\lambda_i$ by the multiplier.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram representing the mesh-division of the space of a semiconductor device;

FIG. 3 is a diagram for explaining the Gerschgorin circle theorem;

FIG. 4 is a flow chart explaining a method of analyzing the operation of a semiconductor device, according to a first embodiment of this invention;

FIG. 5 is a flow chart explaining a method of analyzing the operation of a semiconductor device, according to a second embodiment of this invention;

FIG. 7A is a diagram illustrating a circuit for determining the equivalent-circuit constant of a semiconductor device;

FIG. 7B is an equivalent-circuit diagram of the circuit illustrated in FIG. 7A;

FIGS. 9A to 9D are graphs showing four y-parameter plotted in complex planes, said y-parameters corresponding to true and trial values;

FIGS. 12A to 12C are diagrams representing an object which is analyzed by the method according to the fourth embodiment of the invention;

FIGS. 13A to 13F are diagram illustrating how a numerical convergence takes place while the object shown in FIGS. 12A to 12C is being analyzed by the method according to the fourth embodiment of the present invention;

FIG. 17 is a block diagram showing an apparatus for performing the operation-analyzing method according to the sixth embodiment of the present invention;

FIG. 22 is a block diagram illustrating the meshpoint unit incorporated in the apparatus shown in FIG. 21;

FIGS. 23A and 23B are flow charts explaining a method of analyzing the operation of a semiconductor device, according to a ninth embodiment of the invention;

FIG. 24 is a block diagram of the meshpoint unit incorporated in an apparatus for performing the operation-analyzing method according to the ninth embodiment of this invention;

FIG. 26 is a graph showing the results of the operation analyses carried out by the seventh to ninth methods according to the present invention.

DETAILED DESCRIPTION OF THE PREFERRED EMBODIMENTS

Figure 2:
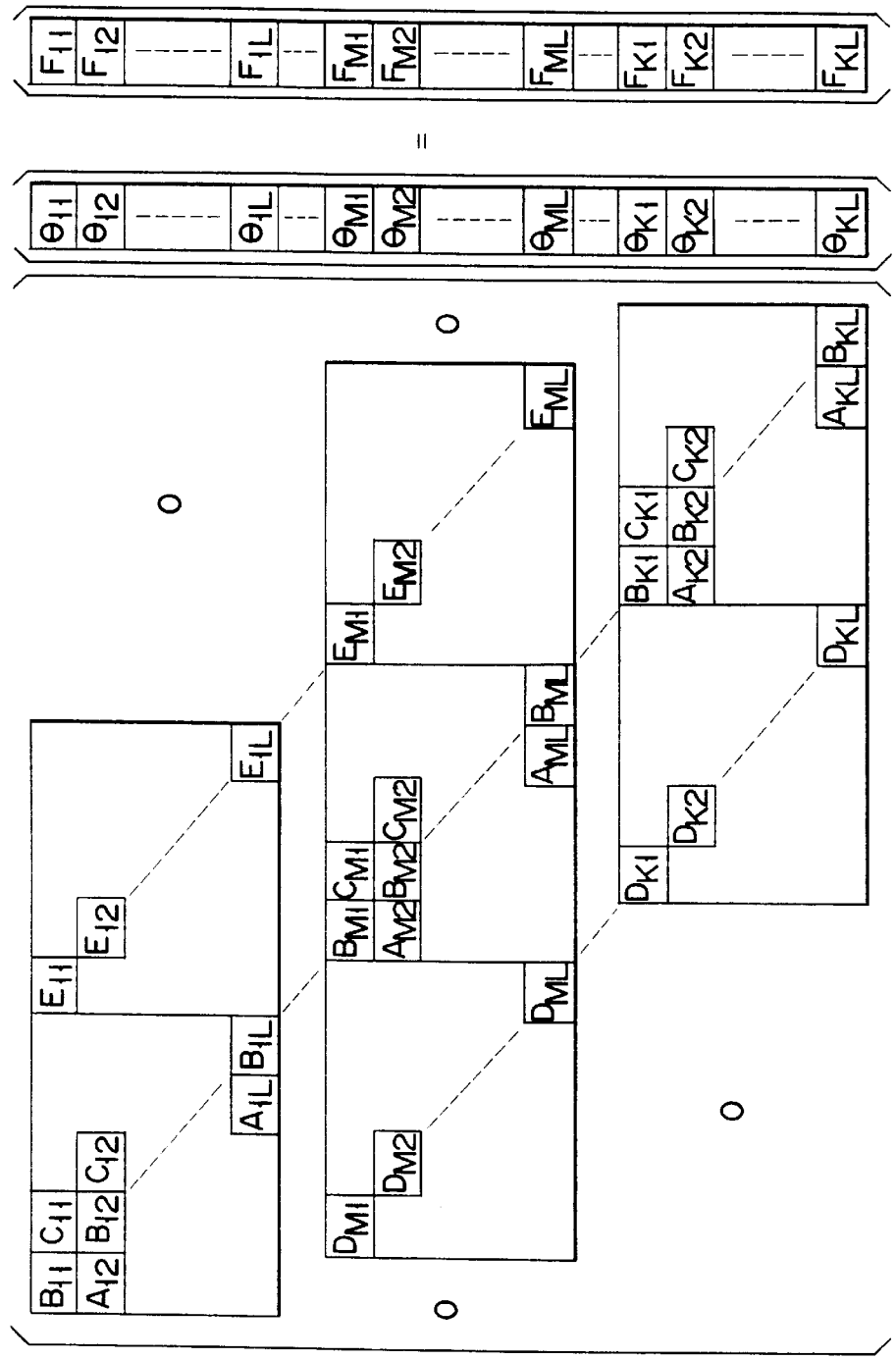
FIG. 2 is a diagram schematically representing a matrix-vector equation consisting of electron- and hole-transport equations and Poisson's equation.

The present invention will now be described in detail, with reference to the accompanying drawings.

FIG. 4 is a flow chart explaining a first method embodiment of analyzing the operation of a semiconductor device, according to the present invention. In the first method embodiment, to solve equations (8-1), (8-2) and (8-3), these equations are substituted by the following equations which contain time differential terms:

$$dp(M,N)/dt = -\lambda_p(M,N)f_p(M,N) \quad (20\text{-}1)$$

$$dn(M,N)/dt = -\lambda_n(M,N)f_n(M,N) \quad (20\text{-}2)$$

$$d\psi(M,N)/dt = \lambda_\psi(M,N)f_\psi(M,N) \quad (20\text{-}3)$$

where $f_p$, $f_n$, and $f_\psi$ are defined as follows:

$$f_p(M, N) = (1/q)\{[J_{px}(M) - J_{px}(M - 1)] / h'_x(M)\} + \\ (1/q)\{[J_{py}(N) - J_{py}(N - 1)] / h'_y(M)\} + \\ U(M, N) \quad (21\text{-}1)$$

$$f_n(M, N) = (1/q)\{[J_{nx}(M) - J_{nx}(M - 1)] / h'_x(M)\} + \\ (1/q)\{[J_{ny}(N) - J_{ny}(N - 1)] / h'_y(M)\} - \\ U(M, N) \quad (21\text{-}2)$$

$$f_{\psi(M,N)} = [1 / h'_x(M)]\{[\psi(M + 1, N) - \psi(M, N)] / \\ h_x(M) - [\psi(M, N) - \psi(M - 1, N)] / \\ h_x(M - 1)\} + [1 / h'_y(N)]\{[\psi(M, N + 1) - \\ \psi(M, N)] / h_y(N) - [\psi(M, N) - \\ \psi(M, N - 1)] / h_y(N - 1)\} + \\ (q / \varepsilon)[\Gamma(M, N) + p(M, N) - n(M, N)] \quad (21\text{-}3)$$

The time-differential terms on the left sides of equations (20-1), (20-2) an (20-3) are difference-approximated, by setting a finite number of meshpoints on the time axis, whereby the following equations are obtained:

$$p^1(M,N) = p^0(M,N) - \delta t \lambda_p(M,N) f_p^0(M,N) \quad (36\text{-}1)$$

$$n^1(M,N) = n^0(M,N) + \delta t \lambda_n(M,N) f_n^0(M,N) \quad (36\text{-}2)$$

$$\psi^1(M,N) = \psi^0(M,N) + \delta t \lambda_\psi(M,N) f_\psi^0(M,N) \quad (36\text{-}3)$$

where $1 \leq M \leq K$, $1 \leq N \leq L$. In equations (36-1), (36-2) and (36-3), the superscript 0 denotes an old time value, and the superscript 1 denotes a new time value.

The first method embodiment of analyzing the operation of a semiconductor device will now be explained, with reference to the flow chart of FIG. 4. First, in step a1, the data items representing the structure and impurity concentrations of the semiconductor device are input to the memory of a computer. Next, in step b1, the positions of meshpoints of the device are determined. In step c1, the data showing a bias voltage V is input to the memory of the computer. The flow goes to step d1, in which initial trial values $p^0(M,N)$, $n^0(M,N)$, $\psi^0(M,N)$ for basic variables quantities $p(M,N)$, $n(M,N)$, and $\psi(M,N)$ are applied. Further, in step e1, an integration-starting time $t^1$ is set.

Next, in step f1, the values of the right sides of equations (36-1), (36-2), and (36-3) are obtained for all meshpoints $1 \leq M \leq K$, $1 \leq N \leq L$. The values thus obtained are considered equal to $p^1(M,N)$, $n^1(M,N)$, $\psi^1(M,N)$; $1 \leq M \leq K$, $1 \leq N \leq L$. Hence, the integration advances one step forward on the time axis.

In the next step, i.e., step g1, the absolute values of the changes in the variable quantities, $|p^1(M,N)-p^0(M,N)|$, $|n^1(M,N)-n^0(M,N)|$, $|\psi^1(M,N)-\psi^0(M,N)|$ are obtained for all meshpoints. Also in step g1, it is determined whether or not the absolute values of these changes for all meshpoints fall within predetermined error limits.

If NO even in one meshpoint in the device space in step g1, the flow goes to step hi, in which the corrected values $p^1(M,N)$, $n^1(M,N)$, $\psi^1(M,N)$ are used as new trial values, and hence are regarded as equal, and $t^1$ is set to $t^0$, and integration is performed on the time axis.

Conversely, if YES in all meshpoint in step g1, it is assumed that steady solutions have been obtained. These solutions are of such type that the time differential terms on the left sides of equations (20-1), (20-2) and (20-3) become zero, that is, $f_p(M,N)=0$, $f_n(M,N)=0$, $f_\psi(M,N)=0$; $1 \leq M \leq K$, $1 \leq N \leq L$. This means that the solutions of equations (8-1), (8-2) and (8-3) have been obtained.

Thus far described is the basic concept of the first method embodiment according to the present invention. In comparison with the conventional method, the first method embodiment is characterized in the following respects:

1. The method includes no processes for linearizing nonlinear equations.

2. No massive matrix-vector equation, such as equation (16) or the equation derived from equation (16) and schematically shown in FIG. 2, need not be solved, and hence, no calculations which are so complex that large memories are required to perform them need not be carried out. It suffices to find the values of the right sides of equations (36-1), (36-2) and (36-3), and to correct the basic variable quantities.

3. Since the coefficients $\lambda_p(M,N)$, $\lambda_n(M,N)$ and $\lambda_\psi(M,N)$ used as adjusting factors (hereinafter called "sensitivity coefficients") can take different values for the meshpoints of the device space, the solutions of the equations can effectively converge by setting the sensitivity coefficients at values which are appropriate for the physical properties of the device.

4. The process of solving equations (20-1) to (20-3) is nothing but a numerical integration on the time axis. The integration can of course be executed by means of a large digital computer, but it can also be solved by an apparatus comprising electronic circuits whose time response (i.e., transient phenomenon) attains a steady state, thus solving specific equations, as will be explained later in conjunction with the description of the apparatuses according to the invention.

As may be understood from the above, the first method embodiment of this invention is novel, quite different from the conventional method consisting in solving matrix-vector problems, and possibly opening a new field in device modeling technology.

The apparatus which performs the first method embodiment will be described. The apparatus comprises $N_T$ logic cells and $N_T$ amplifiers having an amplification factor $\lambda_i$ and connected to the logic cells, respectively, where $N_T$ is the total number of meshpoints defined when the original continuity equation of a continuous system is transformed into a discrete system by means of difference approximation or finite-element approximation, so as to be solved by a computer. The amplifiers are designed to have a gain large enough to cope with actual problems. The amplification gain is determined from the input by means of an adder, a multiplier, and a divider, as can be understood from equation (54-12). The apparatus further comprises a dial or a controller for adjusting the parameter ω contained in equation (54-12) and assigned to the entire circuit network.

Part of equation (54-12) for calculating the amplification gain can be an approximate expression, depending on the value of α or H. Also, the amplification gain can be determined from the input to the circuit.

The gains of the amplifiers may be less than 1, depending on the size of the problem to solve, and the amplifiers may function as attenuators.

A multiplier multiplying an input by a multiplier $\lambda_i$ may be used in place of the amplifiers.

The second method embodiment of analyzing the operation of a semiconductor device will now be explained, with reference to the flow chart of FIG. 5.

When the p-layer and n-layer of, for example, a pn diode is set to zero potential and a positive potential, respectively, a depletion layer is formed near the p-n junction or the interface between the p-layer and the n-layer. If the potential V is equal to or less than the breakdown voltage of the diode, the current flowing through the diode is negligibly small. In this case, the distribution of potential ψ in the entire device can be accurately determined by solving only Poisson's equation (5), as is known in the art (see Kurata *Numerical Analysis for Semiconductor Devices*, Heath, 1982, Chapter 8, and Kurata *Operation Theory of Bipolar Transistors*, Kindai Kagaku Co., 1980, Sections 3.2 and 5.1). The hole density p and the electron density n are given as follows:

$$p = n_i e^{-\theta \psi} \quad (37\text{-}1)$$

$$n = n_i e^{\theta(\psi - V)} \quad (37\text{-}2)$$

Substituting equations (37-1) and (37-2) in equation (5), we obtain the following equation for a two-dimensional space:

$$(\partial^2 \psi / \partial x^2) + (\partial^2 \psi / \partial y^2) = -(q/\varepsilon)[\Gamma(x, y) + \quad (38)$$
$$n_i e^{-\theta \psi} - n_i e^{\theta(\psi - V)}]$$

Equation (38) is transformed to a discrete system in the same way as has been described. The discrete system is nothing but equation (9), wherein equations (37-1) and (37-2) are substituted on the right side, as is shown below:

$$[1/h'_x(M)]\{[\psi(M+1, N) - \psi(M, N)]/h_x(M) - \quad (39)$$
$$[\psi(M, N) - \psi(M-1, N)]/h_x(M-1)\} +$$
$$[1/h'_y(N)]\{[\psi(M, N+1) - \psi(M, N)]/h_y(N) -$$
$$[\psi(M, N) - \psi(M, N-1)]/h_y(N-1)\} = -\rho(M, N)/\varepsilon$$

where $$\rho(M, N) = q[\Gamma(M, N) + n_i e^{-\theta \psi(M,N)} - n_i e^{\theta(\psi(M,N)-V)}] \quad (40)$$

If the conventional method is employed to solve equation (39), it will be necessary to solve a matrix-vector equation and perform an iteration method, as has been described above. By contrast, the first step of the second method embodiment according to the invention is to solve the following equation (41) which contains a time differential terms and a sensitivity coefficient:

$$\partial \psi(M, N)/\partial t = \lambda(M, N) \times \ll [1/h'_x(M)]\{[\psi(M+1, N) - \quad (41)$$
$$\psi(M, N)]/h_x(M') - [\psi(M, N) -$$
$$\psi(M-1, N)]/h_x(M'-1)\} +$$
$$[1/h'_y(N)]\{[\psi(M, N+1) - \psi(M, N)]/$$
$$h_y(N') - [\psi(M, N) - \psi(M, N-1)]/$$
$$h_y(M'-1)\} + \rho(M, N)/\varepsilon \gg$$

This equation is integrated on the time axis in the same way as in the first method embodiment of the present invention, as will be explained with reference to the flow chart of FIG. 5. In the first step a2, the data items representing the structure and impurity concentrations of the semiconductor device are input to the memory of a computer. Next, in step b2, the positions of meshpoints of the device are determined. In step c2, the data showing a bias voltage V is input to the memory of the computer. In the next step, step d2, the initial trial value $\psi^0$ of potential is input to the memory. Then, in step e2, an integration-starting time $t^1$ is set.

Thereafter, the flow goes to step f2, in which $\psi^1$ is calculated, which is expressed as follows $$\psi^1(M, N) = \psi^0(MM) + \delta t \cdot \lambda(M, N) \ll [1/ \quad (42)$$
$$h'_x(M)]\{[\psi^0(M+1, N) -$$
$$\psi^0(M, N)]/h_x(M') - [\psi^0(M, N) -$$
$$\psi^0(M-1, N)]/h_x(M-1)\} +$$
$$[1/h'_y(N)]\{[\psi^0(M, N+1) - \psi^0(M, N)]/$$

-continued $$h_y(N') - [\psi^0(M, N) - \psi^0(M, N-1)]/$$
$$h_y(M'-1)] + \rho(M, N)/\varepsilon \gg$$

The value of the right side of equation (42) is found for all meshpoints $1 \leq M \leq K$, $1 \leq N \leq L$. The values thus obtained are considered equal to $\psi^1(M,N)$; $1 \leq M \leq K$, $1 \leq N \leq L$. Hence, the integration advances one step forward on the time axis.

In the next step, i.e., step g2, the absolute values of the changes in the variable quantity, $|\psi^1(M,N)-\psi^0(M,N)|$, are obtained for all meshpoints. Also in step g2, it is determined whether or not the absolute values of these changes for all meshpoints fall within predetermined error limits.

If NO even in one meshpoint in step g2, the flow goes to step h2, in which the corrected values $\psi^1(M,N)$ are used as new trial values, and hence are regarded as equal to $\psi^0(M, N)$. Then, the time $t^1$ is set to $t^0$, and integration is performed on the time axis in the same way as in the first method embodiment.

Conversely, if YES in all meshpoints in step g2, it is assumed that steady solutions have been obtained. These solutions are of such type that the time differential terms on the left side of equation (20-3) become zero, that is, $f_\psi(M, N)=0$; $1 \leq M \leq K$, $1 \leq N \leq L$. This means that the solution of equation (9) or (39) has been obtained.

If the absolute values of the changes in the unknown variable quantity $\psi(M,N)$, i.e., $|\psi^1(M,N)-\psi^0(M,N)|$, are too small, the integration cannot yield a true value of $\psi(M,N)$ within a short time, even after time t, though the integration process is steady. On the other hand, if the absolute values of the changes are too large, the integration process is unstable, and $\psi(M,N)$ fluctuates or diverges, failing to obtain the true value of $\psi(M,N)$.

The sensitivity coefficient $\lambda(M,N)$ is an adjusting factor for causing the variable quantity to change appropriately. The following equation can be applied, as one defining sensitivity coefficient $\lambda(M,N)$, in order to solve the Poisson's equation (42) representing a two-dimensional device model. First, various quantities are defined as follows, for equation (42):

$$H = 1/[h_x(M'-1)h'_x(M)] + 1/[h_x(M')h'_x(M)] + \qquad (43\text{-}1)$$
$$1/[h_y(N'-1)h'_y(N)] + 1/[h_y(N')h'_y(N)]$$

$$\alpha = (q\theta n_i/\varepsilon)[\exp\{-\theta\psi^0(M, N)\} + \exp\{\theta(\psi^0(M, N)-V)\}] \qquad (43\text{-}2)$$

Therefore:

$$\lambda(M,N)\cdot\delta t \leq 2/(2H+\alpha) \qquad (43\text{-}3)$$

The meaning of equation (43-3) will be qualitatively described. In general, either the electron density n or the hole density p is nearly equal to the impurity concentration in the high-impurity region of a semiconductor device, and neutral condition of the space charge is satisfied in this region. In this instance, since α is far greater than H and the numerator 2, $\lambda(M,N)\delta t$ is extremely small. As a result, the changes $|\psi^1(M,N)-\psi^0(M,N)|$ are extremely small, too. In a region having a relatively low impurity concentration wherein a depletion layer is more likely to be formed, α is nearly equal to H or negligibly small as compared with H, and $\lambda(M,N)\delta t$ is relatively great. In this case, the changes $|\psi^1(M,N)-\psi^0(M,N)|$ are relatively great.

For the reasons stated above, the variable change $|\psi^1(M, N)-\psi^0(M,N)|$ changes greatly in the low-impurity region, provided a value satisfying the neutral condition of the space charge is given to the variable quantity $\psi(M,N)$. As a result of this, the forming of a depletion layer is promoted, and the variable quantity $\psi(M,N)$ converges to the true solution.

Figure 6:
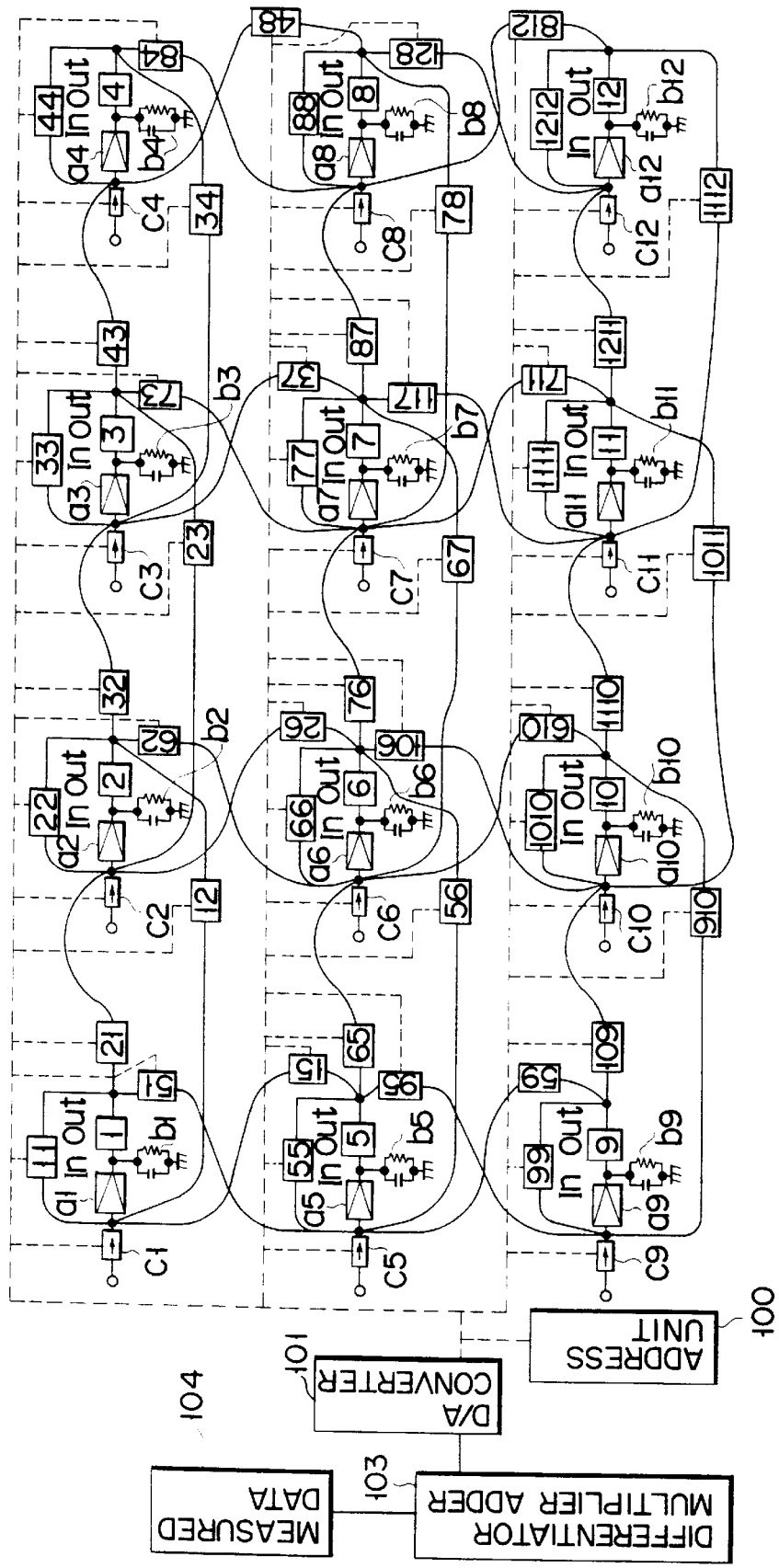
FIG. 6 is one example of circuit diagrams showing an apparatus for performing the method according to the second embodiment of the present invention.

The apparatus which performs the second method embodiment will be described, with reference to FIG. 6. As is shown in FIG. 6, the apparatus comprises $N_T$ logic cells and $N_T$ amplifiers ai having an amplification gain $\lambda_i$ and connected to the logic cells, respectively, where $N_T$ is the total number of meshpoints defined when the original continuity equation is transformed into a discrete one by means of difference approximation or finite-element approximation, so as to be solved by a computer. The amplifiers are designed to have the gain $\lambda_i$ large enough to cope with actual problems and variable. The amplifiers further comprises a dial or a controller for varying the gain of each amplifier. The gains of the amplifiers may be less than 1, depending on the size of the problem to solve. In this case, the amplifiers may function as attenuators. The amplifiers may also be replayed by multipliers, which is equivalent with an amplifier, each for obtaining the product of an input and an amplification gain.

More precisely, the apparatus shown in FIG. 6 comprises twelve logic cells 1 to 12 and twelve amplifiers a1 to a12, that is, $N_T=12$. The logic cells 1 to 12 have a nonlinear input/output response. Each amplifier is connected to the input terminal of the associated logic cell. The apparatus further comprises resonant circuits b1 to b12, each comprised of a resistor and a capacitor and connected to the node of the associated logic cell and amplifier. The variable gain of each amplifier corresponds to $\lambda$.

Currents are supplied from current sources c1 to c12 to the logic cells 1 to 12, respectively. Current-detecting means 11, 21, 22, 32, . . . 1112, and 1212, which are provided for the logic cells and form a network, detect that the input currents become steady in the apparatus. An address unit 100 is provided for designating the current-detecting means 11, 21, . . . 1212. The current detected by any current-detecting means designated by an address unit 100 is converted into a digital signal by means of an A/D converter 101. The digital signal is supplied to a circuit 103 which comprises a differentiator, a multiplier, and an adder. The differentiator, the multiplier, and the adder perform operations on the signal, providing measured data. The measured data is input to a circuit 104.

The apparatus illustrated in FIG. 6 can have a sweeper, in which case the number of logic cells required is reduced to m, where m<$N_T$.

Figure 8:
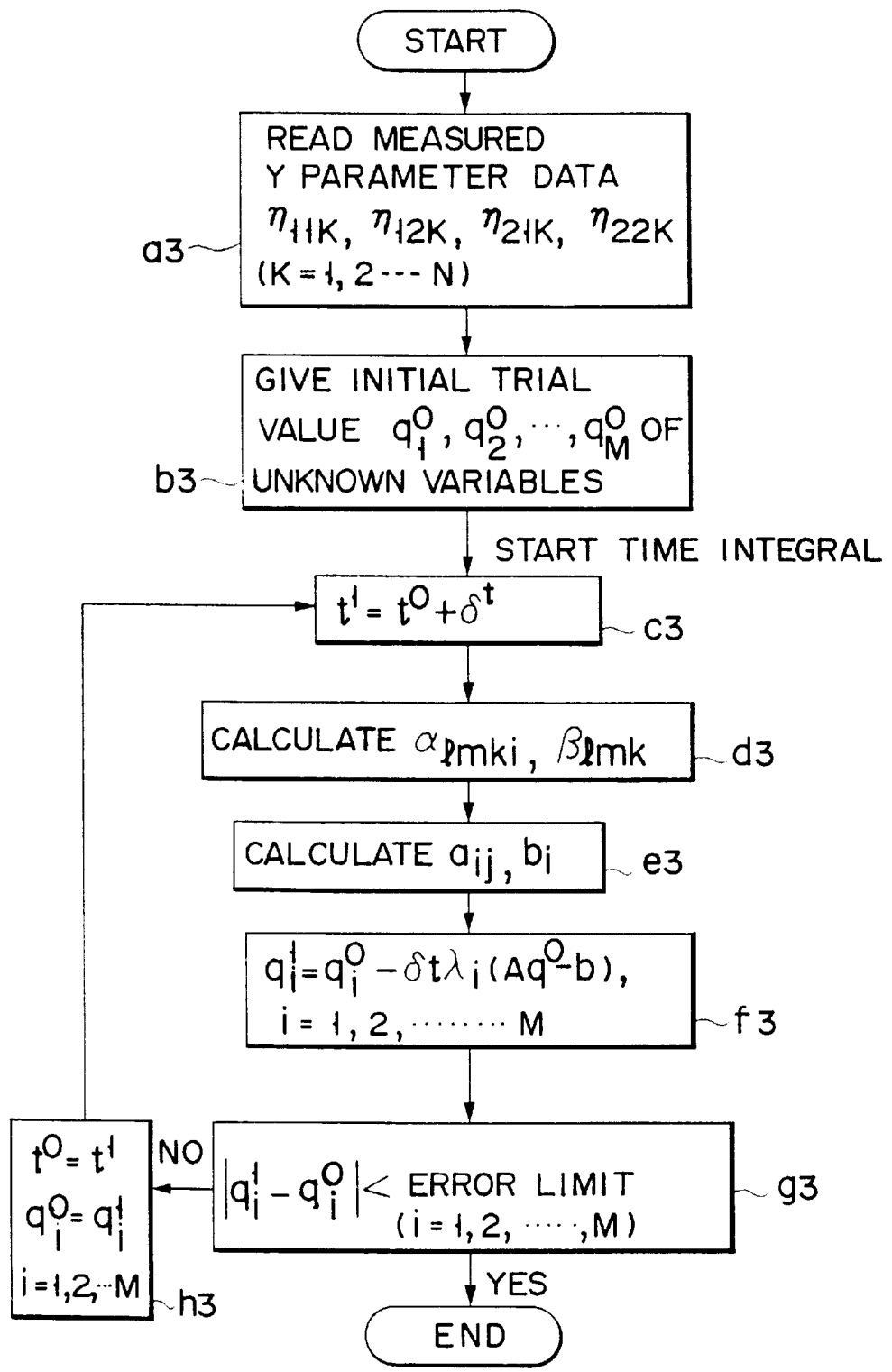
FIG. 8 is a flow chart explaining a method of determining the equivalent-circuit constant of a semiconductor device, according to a third embodiment of the present invention.

The third method embodiment according to the invention, i.e., a least square method of determining the equivalent-circuit constant of a semiconductor device, will be described, with reference to FIGS. 7A, 7B and 8.

Let us assume that four y-parameters $Y_{11}$, $Y_{12}$, $Y_{21}$ and $Y_{22}$—all complex admittances—are measured at N frequencies $f_k$ (k=1, 2, . . . , N). In order to accomplish the fitting of the four y-parameters by means of the equivalent circuit shown in FIGS. 7A and 7B which has M equivalent-circuit constants $q_1, q_2, \ldots, q_M$, it is necessary to solve the following matrix equations:

$$Aq = b, A = (a_{ij}), b = (b_i) \quad (44\text{-}1)$$

$$a_{ij} = \sum_{l,m,k} [\alpha^*_{lmki}\alpha_{lmkj} + \alpha_{lmki}\alpha^*_{lmkj}]/|\eta_{lmk}|^2 \quad (44\text{-}2)$$

$$b_i = -\sum_{l,m,k} [\beta^*_{lmk}\alpha_{lmki} + \beta_{lmk}\alpha^*_{lmki}]/|\eta_{lmk}|^2 \quad (44\text{-}3)$$

where $$\alpha_{lmki} = \partial Y_{lmk}/\partial q_i \quad (45\text{-}1)$$

$$\beta_{lmk} = Y_{lmk}^0 - \eta_{lmk} - \Sigma \alpha_{lmk} q_i^0 \quad (45\text{-}2)$$

In equations (44-2) and (44-3), the mark * indicates a conjugate complex number, and l and m are either 1 or 2.

The matrix equations are rewritten to $dq/dt = -\lambda(Aq-b)$, which is solved as will be explained with reference to the flow chart of FIG. 8. First, in step a3, the measured y-parameters $\eta_{11k}, \eta_{12k}, \eta_{21k}, \eta_{22k}$ (k=1, 2, ... N) are read. Next, in step b3, initial trial values of the unknown quantity, $q_1^0, q_2^0, \ldots, q_M^0$, are given. In step c3, an initial time and a time interval are set, and the time integration is started. Then, in step d3, $\alpha_{lmki}$ and $\beta_{lmk}$ are obtained by applying the theoretical value $Y_{lmk}$ and measured value $\eta_{lmk}$ of the y-parameter. Further, in step e3, $a_{ij}$ and $b_i$ are obtained.

The flow goes to step f3, in which $q_i^1$, which is expressed by the following equation (46), is calculated for i=1, 2, ..., M:

$$q_i^1 = q_i^0 - \delta t \cdot \lambda_i (Aq_0 - b) \quad (46)$$

Hence, the integration on the time axis advances one step forward.

Thereafter, in step g3, the absolute values of the changes in the variable quantity, $|q_i^1 - q_i^0|$ are obtained for i=1, 2, ..., M. Also in step g3, it is determined whether or not the absolute values of these changes for all equivalent-circuit constant $q_1, q_2, \ldots, q_M$ fall within predetermined error limits.

If NO in step g3, the flow goes to step h3, in which the corrected values $q_i^1$ are used as new trial values, and hence are regarded as equal to $q_i^0$. Then, the time $t^1$ is set to $t^0$, and integration is performed on the time axis in the same way as in the first and second method embodiments.

Conversely, if YES in step g3, it is assumed that equivalent-circuit constants $q_1, q_2, \ldots q_M$ have been obtained. These constants are of such type that the time differential term on the left side of equation $dq/dt = -\lambda(Aq-b)$ becomes zero. Hence, the solution of equation Aq=b has been obtained.

A numerical analysis, which was actually performed to solve a problem of determining the equivalent-circuit constants of a transistor, will now be explained, with reference to FIGS. 7A and 7B. FIG. 7A is a schematic representation of a bipolar transistor. Let us assume that the emitter-grounding equivalent circuit of the bipolar transistor is comprised of three 4-terminal networks, as is illustrated in FIG. 7B. Then, y-parameters of the equivalent circuit can easily be determined. More specifically, the y-parameters $y_i$ of the essential portion 1000 of the circuit, thus determined, are:

$$y_{11i} = \{g_b[g_e g_{ee}(1-\alpha) - \omega^2 c_e c_{ci}] + \quad (47\text{-}1)$$
$$j\omega g_b(c_e g_{ee} + c_{ci}g_e + c_{ci}g_{ee})\}/\Delta y_i$$

$$y_{12i} = -[j\omega c_{ci}g_b(g_e + g_{ee} + j\omega c_e)]/\Delta y_i \quad (47\text{-}2)$$

$$y_{21i} = [g_b[\alpha g_e g_{ee} + \omega^2 c_e c_{ci}] - \quad (47\text{-}3)$$
$$j\omega c_{ci}g_b(g_e + g_{ee})]/\Delta y_i$$

$$y_{22i} = [-\omega^2 c_e c_{ci}(g_e + g_{ee}) + \quad (47\text{-}4)$$
$$j\omega c_{ci}(g_b g_e + g_e g_{ee} + g_{ee}g_b)\}/\Delta y_i$$

$$\Delta y_i = g_b g_e + g_b g_{ee} + g_e g_{ee}(1-\alpha) - \omega^2 c_e c_{ci} + \quad (47\text{-}5)$$
$$j\omega [c_e(g_{ee} + g_b) + c_{ci}(g_e + g_{ee})]$$

In accordance with the rule of synthesizing 4-terminal networks, the y-parameters y* of the portion 1000 and the external collector capacitance 1001, combined together, are defined as follows:

$$Y_{11}^* = Y_{11i} + j\omega c_{co} \quad (48\text{-}1)$$

$$Y_{12}^* = Y_{12i} - j\omega c_{co} \quad (48\text{-}2)$$

$$Y_{21}^* = Y_{21i} - j\omega c_{co} \quad (48\text{-}3)$$

$$Y_{22}^* = Y_{22i} + j\omega c_{co} \quad (48\text{-}4)$$

Also in accordance with the rule of synthesizing 4-terminal networks, the y-parameters of the entire bipolar transistor, i.e., portions 1000, 1001, and 1002, which include the collector conductance $g_c$, are calculated, yielding the following results:

$$Y_{11} = (g_c y_{11}^* + \Delta y^*)/(g_c + Y_{22}^*) \quad (49\text{-}1)$$

$$Y_{12} = (g_c y_{12}^*)/(g_c + Y_{22}^*) \quad (49\text{-}2)$$

$$Y_{21} = (g_c y_{21}^*)/(g_c + Y_{22}^*) \quad (49\text{-}3)$$

$$Y_{22} = (g_c y_{22}^*)/(g_c + Y_{22}^*) \quad (49\text{-}4)$$

$$\Delta y^* = Y_{11}^* Y_{22}^* - Y_{12}^* y_{21}^* \quad (49\text{-}5)$$

There are eight constants which must be determined of the circuit illustrated in FIG. 7A and 7B. They are $g_e, g_{ee}, g_b, \alpha, c_e, c_{ci}$, and $c_{co}$. the object function, which is the characteristic of y-parameter fitting, is represented by the following equation:

$$E = \sum_{l,m,k} |y_{lmk} - \eta_{lmk}|^2/|\eta_{lmk}|^2 \quad (50)$$

This represents a relative error of the fitting between the theoretical value $Y_{lmk}$ of the y-parameter and the measured value $\eta_{lmk}$ of the y-parameter. Here, l and n are either 1 or 2, and k is the number of the measuring frequency used, which is 1, 2, ..., or N.

To facilitate the actual computation, eight unknown quantities $P_1$ to $P_8$ and eight normalization units $r_1$ to $r_8$ for these quantities are defined as follows. It should be noted that $q_i = r_i p_i$, i=1, 2, ..., 8, by definition of normalization.

| | |
|---|---|
| $p_1 = g_e(1 - \alpha)$, | $r_1 = 1$ |
| $p_2 = \alpha g_e$, | $r_2 = 1$ |
| $p_3 = g_{ee}$, | $r_3 = 1$ |
| $p_4 = g_b$, | $r_4 = 1$ |
| $p_5 = g_c$, | $r_5 = 1$ |
| $p_6 = c_e$, | $r_6 = 10^{-12}$ |
| $p_7 = c_{ci}$, | $r_7 = 10^{-12}$ |
| $p_8 = c_{co}$, | $r_8 = 10^{-12}$ |

To accomplish the fitting of the y-parameters, measured data must be acquired. Ideally, the data measured of an actual device (i.e., a bipolar transistor) should be used for this purpose. However, in accordance with a requirement that the data having known nature should be used, appropriate values (hereinafter referred to as "true values") are imparted to the circuit constants $P_1$ to $P_8$ to generate y-parameters, thereby providing artificial "measured data." The true values imparted to the circuit constants are:

| | |
|---|---|
| $g_e = 0.6$ siemens | $p_1 = g_e(1 - \alpha)$ |
| | $= 0.012$ siemens |
| $\alpha = 0.98$ | $p_2 = g_e \alpha$ |
| | $= 0.588$ siemens |
| $g_{ee} = 0.08$ siemens $= p_3$ | |
| $g_b = 0.04$ siemens $= p_4$ | |
| $g_c = 0.15$ siemens $= p_5$ | |
| $c_e = 200$ fF $=$ | $p_6$ |
| $c_{ci} = 3$ fF $=$ | $p_7$ |
| $c_{co} = 50$ fF $=$ | $p_8$ |

Forty "measured" frequencies are provided, ranging from 0.1 GHz to 19.6 GHz, each differing by 0.5 GHz from the immediately adjacent one. Before starting the fitting of the y-parameters, the following initial trial values are imparted to the circuit constants:

| | |
|---|---|
| $g_e = 0.7$ siemens | $p_1 = 0.014$ siemens |
| $\alpha = 0.98$ | $p_2 = 0.686$ siemens |
| $g_{ee} = 0.1$ siemens $=$ | $p_3$ |
| $g_b = 0.2$ siemens $=$ | $p_4$ |
| $g_c = 0.2$ siemens $=$ | $p_5$ |
| $c_e = 300$ fF $=$ | $p_6$ |
| $c_{ci} = 5$ fF $=$ | $p_7$ |
| $c_{co} = 60$ fF $=$ | $p_8$ |

Four y-parameters, to which the true values and the trial values, all specified above, have been imparted, are plotted in a complex plane. The y-parameters are distributed in the complex plane as is illustrated in FIGS. 9A to 9D. Since the measured data has been acquired artificially as has been described, it contains no noisy elements which is inherent in the data measured of the actual bipolar transistor. Nevertheless, as FIGS. 9A to 9D clearly show, the true value and the trial value for the same frequency differ considerably from each other. To quantitatively analyze the difference between the true value and the trial value, we determine the square root of the object function defined by equation (50), thereby to evaluate the relative error vector for all y-parameters. That is:

$$R.E. = \left[ \sum_{l,m,k} |y_{lmk} - \eta_{lmk}|^2 / |\eta_{lmk}|^2 \right]^{1/2} \quad (51)$$

In the instance shown in FIGS. 9A to 9D, R.E.=3.19, or 319%. This value is too great, since the condition for a desirable fitting of the y-parameters is that the relative error vector for all y-parameters should be about 1% or less.

The intervals at which the integration is performed on the time axis are set to $10^{-9}$s, i.e., 1 ns. The results of the five tests actually conducted by means of a computer were as shown in Table 1. The first job S consisted of 500 time steps of calculation, wherein use is made of $\lambda_1$ to $\lambda_8$ specified in the second leftmost column of Table 1. The relative error R.E. obtained in the first job S is 4.12%. This value of 4.12% is indeed far smaller than 319%, but cannot be regarded as a sufficient condition for a desirable fitting of the y-parameters. Hence, the second job W is executed, wherein $P_6$ (=$c_e$) is changed greatly, while $p_7$ is changed a little, in accordance with the interim results of the first job S. The results obtained in the second job W are: R.E.=2.47%. obviously, the relative error has been reduced. Then, the third job I is executed, wherein the results of the job W are used as initial condition, and 500 time steps of calculation are performed, using $\lambda_1$ to $\lambda_8$ identical to those used in the second job W. The third job I yields the relative error R.E. of 1.07%. Further, the fourth job Q is performed in a similar manner, using $\lambda_1$ to $\lambda_8$ identical to those used in the second job W, except that $\lambda_7$=5.0E3 (the previous value: 5.0E2). The fourth job Q yields the relative error R.E. of 0.210%, which is far less than the upper limit for a desirable fitting of the y-parameters.

This type of integration has the following general trend. Namely, if a relatively good result, e.g., R.E. of about several %, is obtained in a job, the next job is executed, using the result of the preceding job as initial value and using $\lambda$ identical to, or slightly greater than, the one applied in the preceding job. Then, the next job yields better results.

The last job U is performed, using the results of the fourth job Q as initial value. When 192 time steps are completed, the relative error R.E. reaches a minimum value of 0.1%, or the best possible value. The y-parameters, thus fixed, are plotted in the complex plane. The results of this plotting are as is shown in FIG. 9A to 9D. As far as the graphs of FIGS. 9A to 9D are concerned, the resulting y-parameters appear to coincide completely with those given the true values of $P_1$ to $P_8$. Thus, the fitting of the y-parameters accomplished by the numerical analysis can be considered to be sufficiently accurate.

Figure 10:
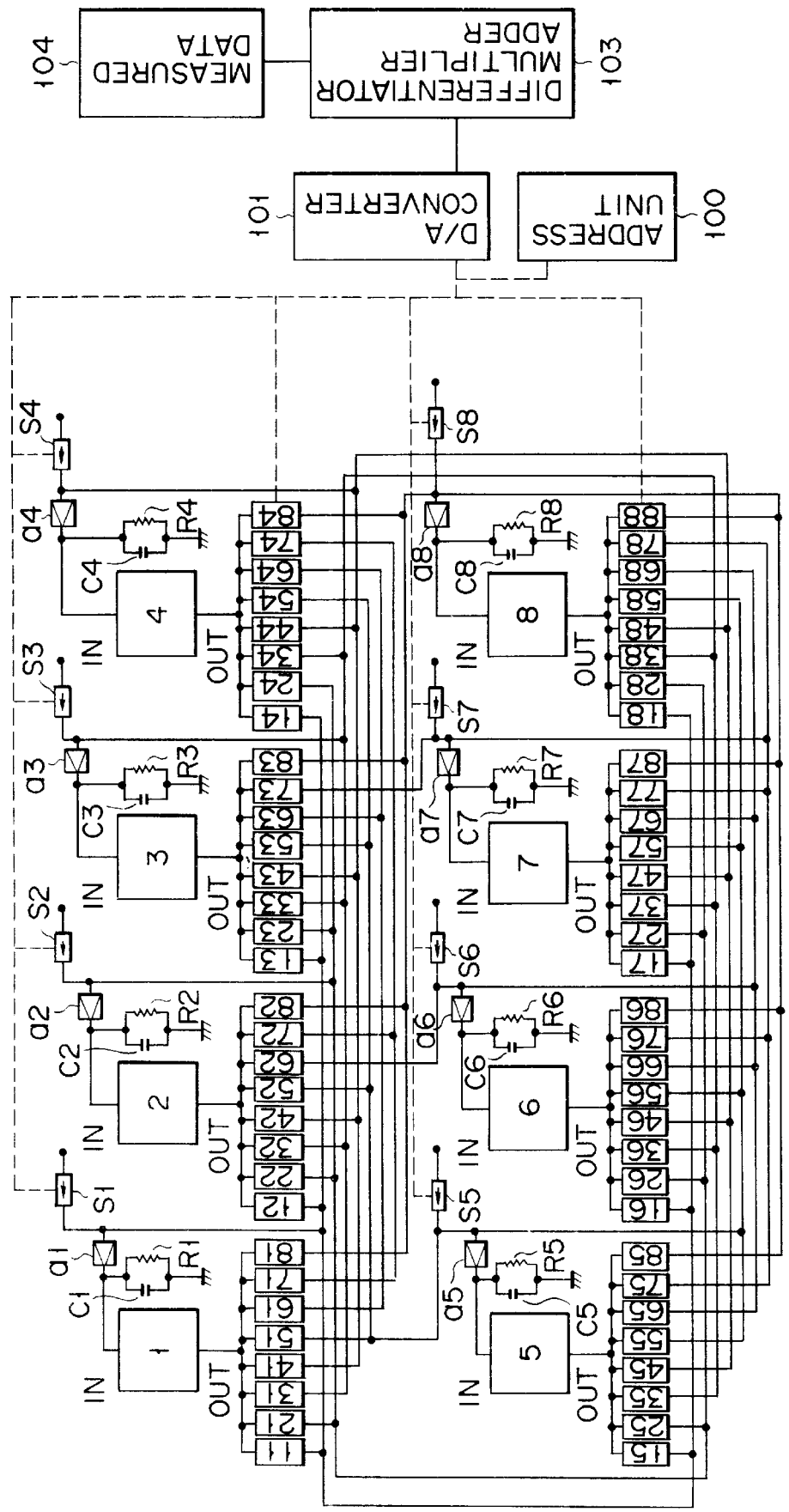
FIG. 10 is one example of circuit diagrams illustrating an apparatus for performing the method according to the third embodiment of the invention.

FIG. 10 illustrates an apparatus which is designed to perform the above-described numerical analysis performed to determine the equivalent-circuit constants of the bipolar transistor. As FIG. 10 clearly shows, this apparatus comprises eight logic cells 1 to 8, eight amplifiers a1 to a8 connected to the inputs of the logic cells 1 to 8, respectively, eight resonant circuits, each consisting of a resistor (R1, R2, . . . , or R8) and a capacitor (C1, C2, . . . , or C8) connected to the inputs of the logic cells 1 to 8, respectively. The logic cells 1 to 8 correspond to the eight circuit constants $P_1$ to $P_8$, each having a nonlinear input/output response, V=g(v). The amplifiers a1 to a8 have variable gains corresponding to $\lambda_1, \lambda_2, \ldots, \lambda_8$. As has been pointed out, it is important to adjust the gains of the amplifiers a1 to a8, for a successful numerical analysis of the circuit constants of the bipolar transistor.

the above condition (1) to (4). However, to provide the current sources $T_{ij}{}^V j$ and $I_i$, which depend on voltages, by means of analog techniques, it is necessary to employ the control device illustrated in the right section of FIG. 10. The

TABLE 1

| Job | λ | Initial Value | Final Value of P | R.E. (%) | Number of time steps |
|---|---|---|---|---|---|
| S | $\lambda_1$ = 2.E4 $\lambda_2$ = 1.E7 $\lambda_3$ = 5.E4 $\lambda_4$ = 5.E5 $\lambda_5$ = 5.E6 $\lambda_6$ = 5.E3 $\lambda_7$ = 5.E3 $\lambda_8$ = 5.E3 | Specified in text | 0.01504/0.7355/0.07742/0.04377/ 0.1820/299.8fF/3.648fF/49.27fF | 4.12 | 500 |
| W | Same as in jobs, except for $\lambda_6$ = 1.E7, $\lambda_7$ = 5.E2 | Specified in text | 0.01409/0.6892/0.07805/0.04568/ 0.1617/254.4fF/3.539fF/49.37fF | 2.47 | " |
| I | Same as in job W | Final Value of W | 0.01420/0.6952/0.07818/0.04266/ 0.1549/245.4fF/3.246fF/49.72fF | 1.07 | " |
| Q | Same as in job I, except for $\lambda_2$ = 1.E7, $\lambda_7$ = 5.E3 | Final Value of W | 0.01421/0.6963/0.07831/0.04085/ 0.1512/239.0fF/3.071fF/49.92fF | 0.210 | " |
| U | Same as in job Q | Final Value of Q | 0.01422/0.6967/0.07832/0.04060/ 0.1505/237.8fF/3.047fF/49.95fF | 0.100 | 192 |

The capacitors C1, C2, . . . , C8 give currents C (dv/dt) corresponding to the time differential terms, whereas the resistors R1, R2, . . . , R8 define a relaxation time constant, τ=CR. Current sources S1, S2, . . . , S8 are connected to the inputs of the amplifiers a1, a2, . . . , a8, respectively. These current sources S1 to S8 correspond to constant terms bi contained in equation (43-3), as will be described later.

The apparatus shown in FIG. 10 further has current sources 11, 21, . . . , 81, . . . , 18, 28, . . . 88. Each of the eight current sources are connected to the outputs of the logic cells 1 to 8, respectively. The currents supplied from these sources are expressed as $T_{ij}V_j$, meaning that the jth parameter $p_j$ is normalized with a normalization unit $r_j$, thus obtaining a quantity $q_j$, which is related to the output voltage $V_j$ of the jth logic cell. The apparatus shown in FIG. 10 can, therefore, provide the following equations (52) and (53) to determine the transient response of the circuit network shown in FIG. 10:

$$C_i(dv_i/dt) = -v_i/R_i + \lambda_i\left(\sum_j T_{ij}V_j + I_i\right) \quad (52)$$

$$V_i = g(v_i) \quad (53)$$

where i is the number of any logic cell, $v_i$ and $v_i$ are the input and output voltages of the ith logic cell, $R_i$, $C_i$ and $I_i$ are the resistor, capacitor and current source provided for the ith logic cell, $T_{ij}$ is the coupling strength between the input of the ith logic cell and the output of the jth logic cell, and g is the input/output response function of each logic cell. Both equations (52) and (53) reduce to equation of $dq/dt=-\lambda(Aq-b)$, provided the following conditions are satisfied:

(1) $T_{ij}/C_i$ corresponds to $a_{ij}$.

(2) $I_i/C_i$ corresponds to constant $b_i$.

(3) Function g is substituted by linear function $V_i=V_i$.

(4) Time constant $C_iR_i$, unnecessary for solving $dq/dt=-\lambda(Aq-b)$, is replaced by Ri=∞.

In other words, equation $dq/dt=-\lambda(Aq-b)$ is automatically solved using the circuit network shown in FIG. 10 based on control device comprises an address unit 100, a D/A converter 101, and a circuit 103 including a differentiator, a multiplier, and an adder.

The apparatus shown in FIG. 10 needs measured data 104 supplied from the device (not shown) which has measured the y-parameters. The measured data 104 will be used as reference for achieving the fitting of the y-parameters. The measured data 104 and the output voltages of the logic cells 1 to 8 are differentiated, multiplied and added by the circuit 103, thereby solving equations (44-1), (44-2), and (44-3). The data 104 and the voltages can be processed, in the form of either digital data or analog data. In view of the accuracy of calculation, however, it seems better to process them in the form of analog data.

In the case where the data representing the terms of equations (44-1), (44-2), and (44-3) are digital, it is converted to analog signals by means of the D/A converter 101, and the analog signals, thus provided, are transferred to the addresses (i,j), where i and j=1, 2, . . . , 8, which have been designated by the address unit 100.

A method of determining sensitivity coefficients will now be described, which is the fourth method embodiment according to the invention and designed to analyze the operation of a semiconductor device. Like the second method embodiment described above, this method can determine λ, thereby to solve Poisson's equation (5) of the semiconductor device.

In device modeling, when the p-layer and n-layer of, for example, a pn diode is set to zero potential and a positive potential, respectively, a depletion layer is formed near the p-n junction or the interface between the p-layer and the n-layer. If the potential V is equal to or less than the breakdown voltage of the diode, the current flowing through the diode is negligibly small. In this case, the distribution of potential in the entire device can be accurately determined by solving only Poisson's equation (5), i.e., one of the five basic equations (1) to (5), as is generally known in the art (see Kurata *Numerical Analysis for Semiconductor Devices*, Heath, 1982, Chapter 8, and Kurata *Operation Theory of Bipolar Transistors*, Kindai Kaguku Co., 1980, Sections 3.2 and 5.1). The hole density p and the electron density n are given as follows:

$$p = n_i e^{-\theta \psi} \qquad (37\text{-}1)$$

$$n = n_i e^{\theta(\psi - V)} \qquad (37\text{-}2)$$

Substituting equations (37-1) and (37-2) in equation (5), we obtain the following equation for a two-dimensional space:

$$(\partial^2 \psi / \partial x^2) + (\partial^2 \psi / \partial y^2) = -(q/\varepsilon)[\Gamma(x, y) + \qquad (38)$$
$$n_i e^{-\theta \psi} - n_i e^{\theta(\psi - V)}]$$

Equation (38) is transformed to a discrete system in the same way as has been described. The discrete system is nothing but equation (9), wherein equations (37-1) and (37-2) are substituted on the right side, as is shown below:

$$[1/h'_x(M)]\{[\psi(M+1, N) - \psi(M, N)/h_x(M) - \qquad (39)$$
$$[\psi(M, N) - \psi(M-1, N)]/h_x(M-1)\} + [1/h'_y(M)]$$
$$\{[\psi(M, N+1) - \psi(M, N)]/h_y(N) - [\psi(M, N) -$$
$$\psi(M, N-1)]/h_y(N-1)\} = -\rho(M, N)/\varepsilon$$

where $$\rho(M, N) = q[\Gamma(M, N) + n_i e^{-\theta \psi(M,N)} - n_i e^{\theta(\psi(M,N)-V)}] \qquad (40)$$

If the conventional method is employed to solve equation (39), it will be necessary to solve a matrix-vector equation and perform an interation method, as has been described above. By contrast, the first step of the fourth method embodiment according to the invention is to solve the following equation (41) which contains a time differential terms and a sensitivity coefficient:

$$\partial \psi(M, N)/\partial t = \lambda(M, N) \times \ll [1/h'_x(M)] \times \{[\psi(M+1, N) - \qquad (41)$$
$$\psi(M, N)]/h_x(M') - [\psi(M, N) -$$
$$\psi(M-1, N)/h_x(M'-1)\} +$$
$$[1/h'_y(N)] \times \{[\psi(M, N+1) - \psi(M, N)/$$
$$h_y(N') - [\psi(M, N) - \psi(M, N-1)/$$
$$h_y(M'-1)\} + \rho(M, N)/\varepsilon \gg$$

Figure 11:
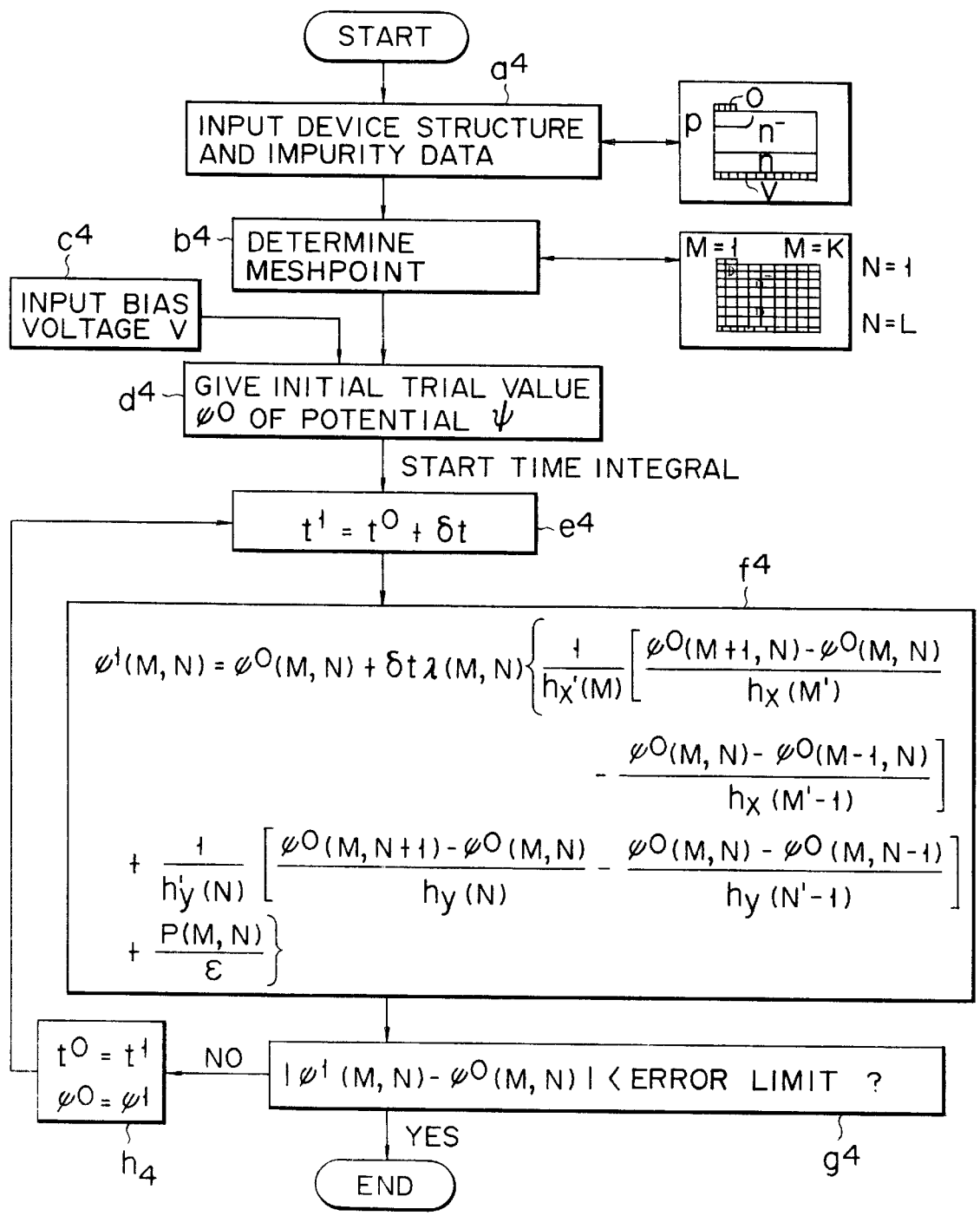
FIG. 11 is a flow chart explaining a method of analyzing the operation of a semiconductor device, according to a fourth embodiment of this invention.

This equation is integrated on the time axis, as will be explained with reference to the flow chart of FIG. 11. In the first step a4, the data items representing the structure and impurity concentrations of the semiconductor device are input to the memory of a computer. Next, in step b4, the positions of meshpoints of the device are determined. In step c4, the data showing a bias voltage V is input to the memory of the computer. In the next step, step d4, the initial trial value $\psi_0$ of potential is input to the memory. Then, in step e4, an integration-starting time $t^1$ is set.

Thereafter, the flow goes to step f4, in which $\psi^1$ is calculated, which is expressed as follows $$\psi^1(M, N) = \psi^0(M, N) + \delta t \cdot \lambda(M, N) \times \ll [1/ \qquad (42)$$
$$h'_x(M)] \times \{[\psi^0(M+1, N) -$$
$$\psi^0(M, N)]/h_x(M') - [\psi^0(M, N) -$$
$$\psi^0(M-1, N)]/h_x(M'-1)\} +$$
$$[1/h'_y(N)] \times \{[\psi^0(M, N+1) - \psi^0(M, N)]/$$
$$h_y(N') - [\psi^0(M, N) - \psi^0(M, N-1)]/$$
$$h_y(M'-1)\} + \rho(M, N)/\varepsilon \gg$$

The value of the right side of equation (42) is found for all meshpoints $1 \leq M \leq K$, $1 \leq N \leq L$. The values thus obtained are considered equal to $\psi^1(M,N)$; $1 \leq M \leq K$, $1 \leq N \leq L$. Hence, the integration advances one step forward on the time axis.

In the next step, i.e., step g4, the absolute values of the changes in the variable quantity, $|\psi^1(M,N) - \psi^0(M,N)|$, are obtained for all meshpoints. Also in step g4, it is determined whether or not the absolute values of these changes for all meshpoints fall within predetermined error limits.

If NO even in one meshpoint in step g4, the flow goes to step h4, in which the corrected values $\psi^1(M,N)$ are used as new trial values, and hence are regarded as equal to $\psi^0(M, N)$. Then, the time $t^1$ is set to $t^0$, and integration is performed on the time axis in the same way as in the first method embodiment.

Conversely, if YES in all meshpoints in step g4, it is assumed that steady solutions have been obtained. These solutions are of such type that the time differential terms on the left side of equation (20-3) become zero, that is, $f_\psi(M, N) = 0$; $1 \leq M \leq K$, $1 \leq N \leq L$. This means that the solution of equation (39) has been obtained.

If the absolute values of the changes in the unknown variable quantity $\psi(M,N)$, i.e., $|\psi^1(M,N) - \psi^0(M,N)|$, are too small, the integration cannot yield a true value of $\psi(M,N)$ within a short time, even after time t, though the integration process is steady. On the other hand, if the absolute values of the changes are too large, the integration process is unstable, and $\psi(M,N)$ fluctuates or diverges, failing to obtain the true value of $\psi(M,N)$.

The sensitivity coefficient $\lambda(M,N)$ is an adjusting factor for causing the variable quantity to change appropriately. Sensitivity coefficient $\lambda(M,N)$ satisfying the above condition is determined as follows in order to solve the Poisson's equation (42) representing a two-dimensional semiconductor device model. First, the variable $\psi$ in equation (41) is substituted by $\psi^0 + \delta_\psi^0$, and the equation (41) is linearized for $\delta \psi$. Then, the stability of the linearized equation is considered. Omitting any term not containing $\delta \psi$, as a constant, we obtain:

$$\delta \psi^1(M, N) = \delta t \cdot \lambda(M, N) \times \{A \delta \psi^0(M, N-1) + \qquad (54\text{-}1)$$
$$B \delta \psi^0(M-1, N) + C \delta \psi^0(M, N+1) +$$
$$D \delta \psi^0(M+1, N) + H \delta \psi^0(M, N) -$$
$$\alpha \delta \psi^0(M, N)\} + \delta \psi^0(M, N)$$

$$A = 2/[h_y(M'-1) \cdot h'_y(N)] \qquad (54\text{-}2)$$

-continued $$B = 2/[h_x(M'-1) \cdot h'_x(M)] \quad (54\text{-}3)$$

$$C = 2/[h_y(N') \cdot h'_y(N)] \quad (54\text{-}4)$$

$$D = 2/[h_x(M') \cdot h'_x(M)] \quad (54\text{-}5)$$

$$H = 1/[h_x(M'-1)h'_x(M)] + 1/[h_x(M')h'_x(M)] + \quad (54\text{-}6)$$
$$1/[h_y(N'-1)h'_y(N)] + 1/[h_y(N')h'_y(N)]$$

$$\alpha = (q\theta n_i/\varepsilon) \times [\exp\{-\theta\psi^0(M,N)\} + \quad (54\text{-}7)$$
$$\exp\{\theta(\psi^0(M,N) - V)\}]$$

These equations are combined into the following vector equation (54-8):

$$\psi^1 = \hat{A}\psi \quad (54\text{-}8)$$

According to Gerschgorin theorem, the coordinates of the center of discs defined by the theorem are real numbers if the condition for stabilizing equation (42) is satisfied, that is, if an eigen value of the error propagation matrix $\hat{A}$ has an absolute value of 1 or less. In this case, the center of the discs is on a real axis. Hence, it suffices to satisfy the following two inequalities:

$$1-\lambda(M,N)\cdot\delta t(H+\alpha)-\lambda(M,N)\cdot\delta t\cdot H > -1 \quad (54\text{-}9)$$

$$1-\lambda(M,N)\cdot\delta t(H+\alpha)+\lambda(M,N)\cdot\delta t\cdot H < 1 \quad (54\text{-}10)$$

In inequality (54-10), $-\lambda(M,N)\delta t\alpha$ is obviously less than 0. Therefore, it is inequality (54-9) which ensures the condition of stability for equation (42). In other words, to stabilize equation (42), it is sufficient to determine time increment $\Delta t$ and function $\lambda$, which are functions of space interval H and nonlinear term $\alpha$, respectively, by the following equation (54-11):

$$\lambda(M,N)\cdot\delta t \leq 2/(2H+\alpha) \quad (54\text{-}11)$$

The space interval H is a function related to position only, and does not depend on time at all, whereas the nonlinear term $\alpha$, which contains $\psi$, is a function of position and time. Therefore, $\lambda$ is, after all, a function of both position and time.

When the above discussion is applied to a one-dimensional system or a two-dimensional system, it is only the space interval H which changes. The method of determining $\lambda$ can be applied not only to calculus of finite difference, but also to other discreting methods such (e.g., finite element method and finite volume method) without being modified.

When this method is applied in practice, $\lambda\delta t$ is set to a value slightly less than the right side of equation (54-11). More specifically, $\lambda\delta t$ is defined as follows, by using parameter $\omega$ (a positive number less than and nearly equal to 1):

$$\lambda\cdot\delta t = 2\omega/(2H+\alpha) \quad (54\text{-}12)$$

The meaning of equation (54-12) will be qualitatively described. In general, either the electron density n or the hole density p is nearly equal to the impurity concentration in the high-impurity region of a semiconductor device, and a neutral condition of the space charge is maintained in this region. In this instance, since $\alpha$ is far greater than H and the numerator 2, and $\lambda(M,N)\delta t$ is extremely small. As a result, the changes $|\psi^1(M,N)-\psi^0(M,N)|$ are extremely small, too. In a region having a relatively low impurity concentration wherein a depletion layer is more likely to be formed, a is nearly equal to H or negligibly small as compared with H, and $\lambda(M,N)\delta t$ is relatively great. In this case, the changes $|\psi^1(M,N)-\psi^0(M,N)|$ are relatively great.

For the reasons stated above, the variable change $|\psi^1(M,N)-\psi^0(M,N)|$ changes greatly with time in the low-impurity region, provided a value satisfying the neutral condition for the space charge is given to the variable quantity $\psi(M,N)$ as an initial condition for starting the calculation. As a result of this, the forming of a depletion layer is promoted, and the variable quantity $\psi(M,N)$ converges to the true solution.

This calculation can of course be executed by means of a large digital computer, but it can also be solved by an apparatus comprising electronic circuits whose time response (i.e., transient phenomenon) attains a steady state, thus solving specific equations, as will be explained later in conjunction with the description of the apparatuses according to the invention.

The apparatus which performs the fourth method embodiment will be described. The apparatus comprises $N_T$ logic cells and $N_T$ amplifiers having an amplification factor $\lambda_i$ and connected to the logic cells, respectively, where $N_T$ is the total number of meshpoints defined when the original continuity equation of a continuous system is transformed into a discrete system by means of difference approximation or finite-element approximation, so as to be solved by a computer. The amplifiers are designed to have a gain large enough to cope with actual problems. The amplification gain is determined from the input by means of an adder, a multiplier, and a divider, as can be understood from equation (54-12).

The apparatus further comprises a dial or a controller for adjusting the parameter $\omega$ contained in equation (54-12) and assigned to the entire circuit network.

Part of equation (54-12) for calculating the amplification gain can be an approximate expression, depending on the value of a or H. Also, the amplification gain can be determined from the input to the circuit.

The gains of the amplifiers may be less than 1, depending on the size of the problem to solve, and the amplifiers may function as attenuators.

A multipliers producting an input by a multiplier $\lambda_i$ may be used in place of the amplifiers.

Figure 12C:
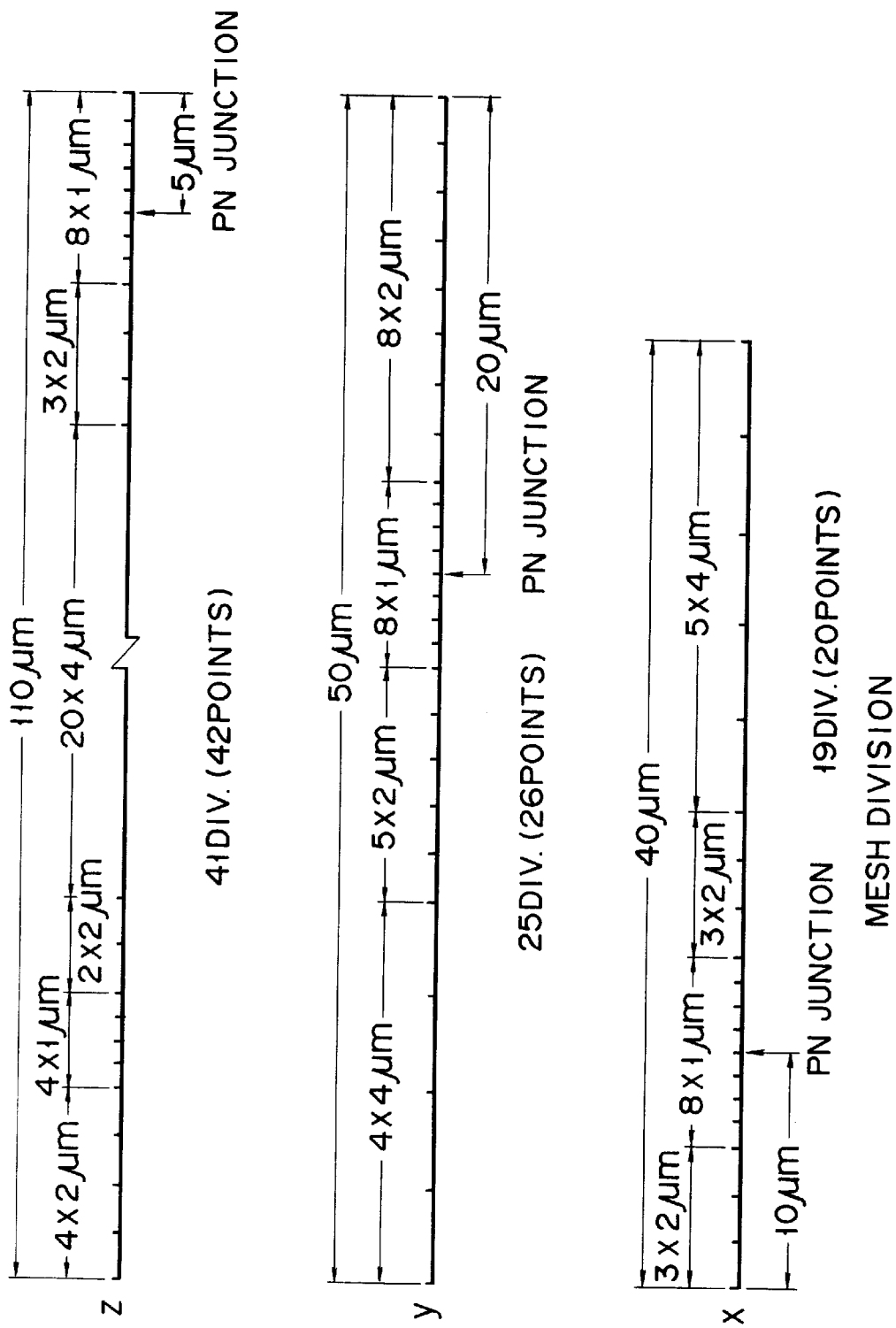
Figure 13E:
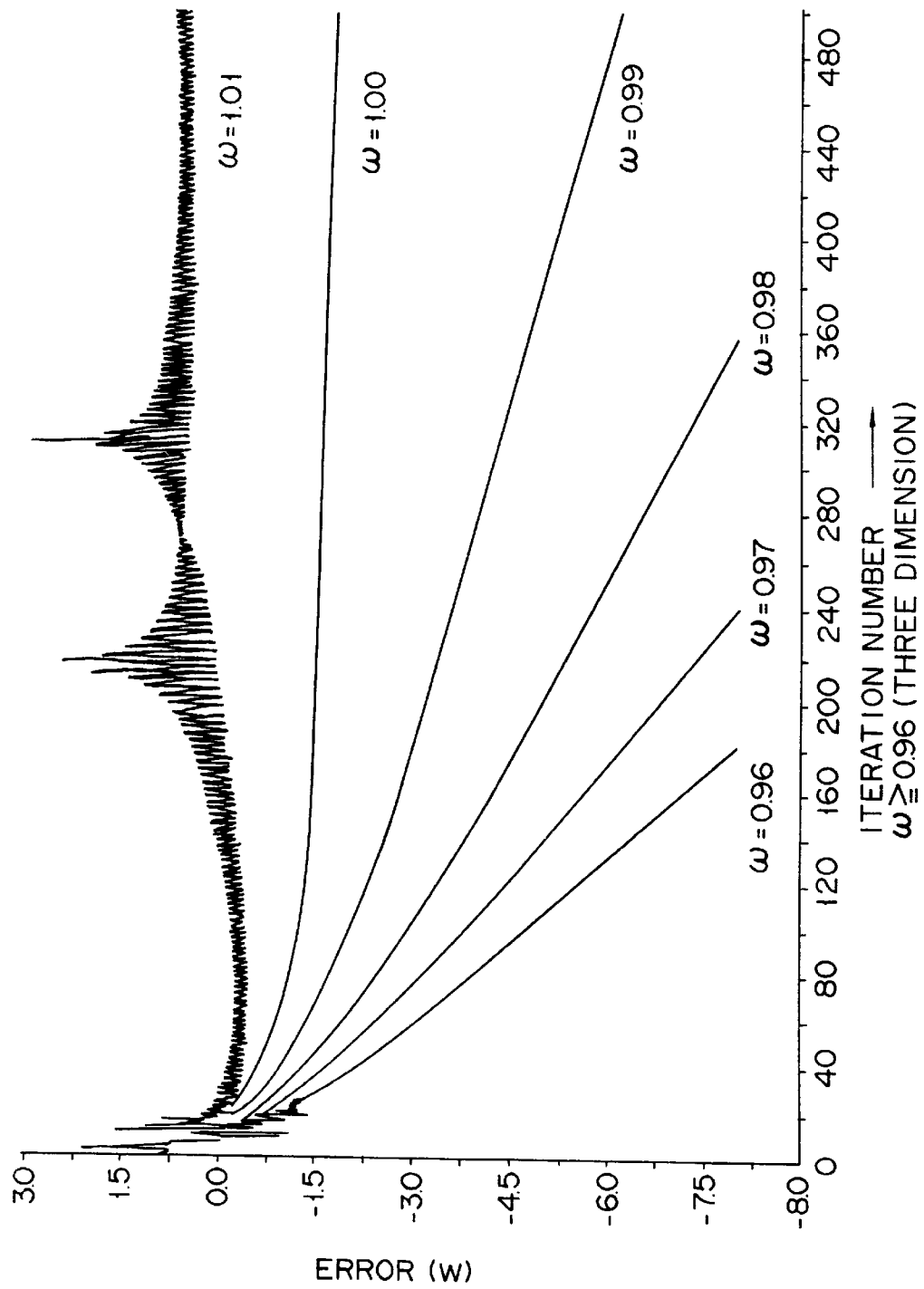

A numerical analysis will be explained, which was actually performed to solve the Poisson's equation representing the relationship between potential and space charge, by means of a computer, thus performing modeling of a semiconductor device a pn junction had the dimensions and impurity distribution specified in FIGS. 12A to 12C. To analyze this device as a three-dimensional problem, the device is divided into 21840 meshes (=20×26×42). To analyze the device as a two-dimensional problem, the x-z plane is divided into 840 meshes (=20×42). At zero bias, the trial value is set as follows:

$$\psi_T = (1/\theta)\ln(n/n_i) \begin{cases} n = \Gamma, p = n_i^2/n & (\Gamma > 0) \\ p = -\Gamma, n = n_i^2/p & (\Gamma < 0) \\ n = p = n_i & (\Gamma = 0) \end{cases}$$

Table 2 and FIGS. 13A to 13E show how a numerical convergence takes place and what relation the positive iteration number and the parameter ω have, in a three-dimensional system to which sensitivity coefficients λ have been applied by the method described above. Here, the error w is defined as:

$$w = \|\delta\psi/(\psi^0 + \delta\psi)\|_\infty$$

The iteration is performed up until the error w takes the value of 1.E-8. Table 2 and FIGS. 13A to 13E show the following facts:

1) When ω is small, the iteration number must be large to achieve an error convergence. The greater the parameter ω, the faster the convergence. However, when ω>0.9, the convergence speed is reduced very much.
2) When ω<1.0, the error converges monotonously, though the error w fluctuates greatly at the start of the interation.
3) When ω=1.0, the error w decreases, but no convergence occurs.
4) When ω>1.0, no convergence occurs; the error w irregularly fluctuates.

As can be understood from Table 2, the error w converges fastest when ω=0.9.

TABLE 2

Iteration Number Required
3-dimensional model; zero bias

| ω | 0.2 | 0.4 | 0.6 | 0.8 | 0.86 | 0.88 | 0.90 | 0.92 | 0.94 | 0.96 | 1.00 |
|---|---|---|---|---|---|---|---|---|---|---|---|
| Iteration Number | 366 | 185 | 123 | 91 | 84 | 82 | 80 | 92 | 123 | 183 | >500 |

Table 3 and FIG. 13F show how a numerical convergence takes place and what relation the positive iteration number and the parameter ω have, in a two-dimensional system to which sensitivity coefficients λ have been applied by the method described above. The error w converges in the same way as in the case of the three-dimensional model (zero bias), but it converges fastest when ω=0.88. Table 3 shows that the value of the parameter ω influences the calculation time when positive iteration is performed, and that the interation number does changes but a little, provided the parameter ω is set to about 0.9.

TABLE 3

Iteration Number Required
2-dimensional model; zero bias

| ω | 0.2 | 0.4 | 0.6 | 0.8 | 0.86 | 0.88 | 0.90 | 0.92 | 0.94 | 0.96 | 1.00 |
|---|---|---|---|---|---|---|---|---|---|---|---|
| Iteration Number | 267 | 135 | 89 | 66 | 61 | 58 | 67 | 83 | 110 | 162 | >500 |

The time required to analyze two- and three-dimensional models, at zero bias, by the method of the present invention will be compared with the time required to analyze the same by the conventional method which involves negative iteration. The conventional method consists in Newton's method for solving nonlinear equations; Gauss's elimination, BCG method, and CR method are applied to solve massive simultaneous equations, which require the periods of time specified in Table 4. Also specified in Table 4 are the periods of time which the method of this invention requires to analyze two- and three-dimensional models. As is evident from Table 4, the method according to the invention can solve nonlinear equations, two to four times faster than the conventional method. In Newton's method, the error is extremely great at first and abruptly converges some time later. In the method of the present invention, the error gradually decreases to yield a solution, and the allowable error w, which is a criterion of determining numerical convergence, can be as great as 1.0E-4. In view of this, the positive iteration is obviously advantageous over the negative iteration employed in the conventional method.

TABLE 4

| | Calculation Time | | |
|---|---|---|---|
| Model | Method | Time | Remarks |
| 2-D | Gauss's | 0.78 s | IMSL (LEQT1B), (SC1) |
| 2-D | BCG Method | 0.28 s | Newton's method, converged at 6th calculation step |

TABLE 4-continued

| | Calculation Time | | |
|---|---|---|---|
| Model | Method | Time | Remarks |
| 2-D | CR Method | 0.24 s | |
| 2-D | Invention | 0.11 s | Positive iteration, con- at 58th calculation step |
| 3-D | BCG Method | 5.8 s | Newton's method, converged at 6th calculation step |
| 3-D | CR Method | 5.0 s | |

TABLE 4-continued

| | | Calculation Time | |
|---|---|---|---|
| Model | Method | Time | Remarks |
| 3-D | Invention | 1.0 s | Positive iteration, con- at 58th calculation step |

The results obtained by a calculating method in a reverse bias, which is the present invention, will now be described, with reference to FIG. 14. The reverse bias $V_R$ is increased stepwise, from 1V to 200V. The trial values applied to obtain the solution are determined as follows, based on the solution obtained by applying a bias V1 in the immediately preceding step and the difference between the bias V2 being applied and the bias V1, i.e., V2−V1:

$$\psi T = \begin{cases} \psi_{VI} + V2 - VI & (\Gamma \geq 0) \\ \psi_{VI} & (\Gamma < 0) \end{cases}$$

Figure 14:
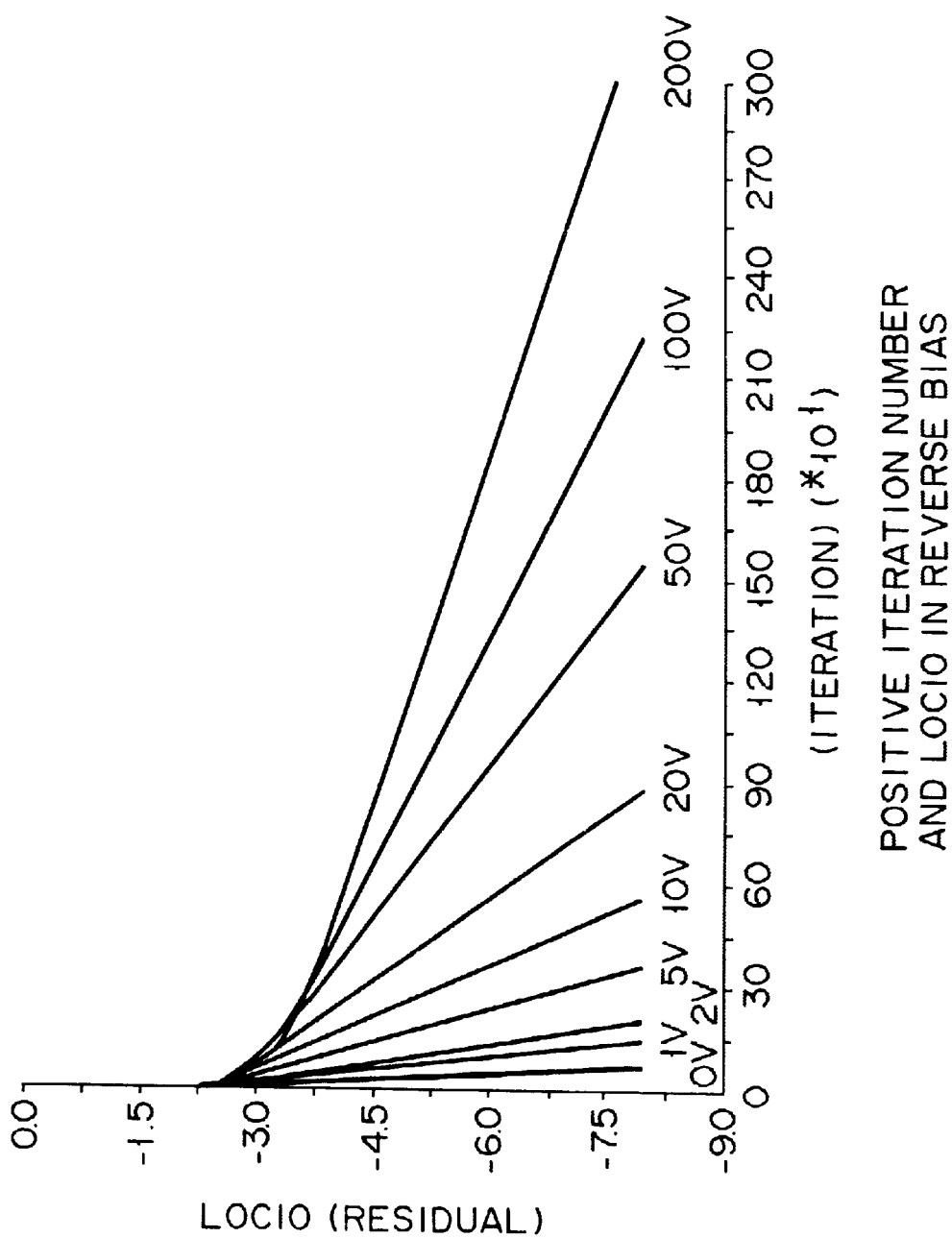
FIG. 14 is a diagram showing how a numerical convergence occurs while a reverse biased object is being calculated by the method according to the fourth embodiment of this invention.

FIG. 14 also shows the relationship between the difference obtained while calculating the reverse bias case and the positive iteration numbers. Although the iteration number, which is required to converge the difference, increases as the voltage applied rises, the difference converges in any case, thereby yielding a solution. This shows that the method, incorporating the present invention, can be utilized to calculate a reverse bias case.

A method of determining the sensitivity coefficients will now be described which is the fifth method embodiment according to the invention and designed to analyze the operation of a semiconductor device. In the fifth method embodiment of the invention, to solve equations (8-1), (8-2) and (9), these equations are transformed to the following ones, each contains a time is differential term:

$$dp(M,N)/dt = -\lambda_p(M,N)f_p(M,N) \quad (20\text{-}1)$$

$$dn(M,N)/dt = \lambda_n(M,N)f_n(M,N) \quad (20\text{-}2)$$

$$d_\psi(M,N)dt = -\lambda_\psi(M,N)f_\psi(M,N) \quad (20\text{-}3)$$

where $f_p$, $f_n$, and $f_\psi$, which are in the right sides of these equations, are defined as follows:

$$f_p(M, N) = (1/q)\{[J_{px}(M) - J_{px}(M-1)]/h'_x(M)\} + \quad (21\text{-}1)$$
$$(1/q)\{[J_{py}(N) - J_{py}(N-1)]/h'_y(M)\} + U(M, N)$$

$$f_n(M, N) = (1/q)\{[J_{nx}(M) - J_{nx}(M-1)]/h'_x(M)\} + \quad (21\text{-}2)$$
$$(1/q)\{[J_{ny}(N) - J_{ny}(N-1)]/h'_y(M)\} + U(M, N)$$

$$f_\psi(M, N) = [1/h'_x(M)] \times \quad (21\text{-}3)$$
$$\{[\psi(M, N) - \psi(M, N)]h_x(M) - [\psi(M, N) - \psi(M-1, N)]/$$
$$h_x(M-1)\} + [1/h'_y(N)] \times \{[\psi(M, N+1) - \psi(M, N)]/$$
$$h_y(M) - [\psi(M, N) - \psi(M, N-1)]/h_y(N-1)\} +$$
$$(q/\varepsilon)[\Gamma(M, N) + p(M, N) - n(M, N)]$$

The time-differential terms on the left sides of equations (20-1), (20-2) an (20-3) are difference-approximated, by setting a finite number of meshpoints on the time axis, whereby the following equations are obtained:

$$p^1(M,N) = p^0(M,N) - \delta t \lambda_p(M,N) f_p^0(M,N) \quad (36\text{-}1)$$

$$n^1(M,N) = n^0(M,N) - \delta t \lambda_n(M,N) f_n^0(M,N) \quad (36\text{-}2)$$

$$\psi^1(M,N) = \psi^0(M,N) - \delta t \lambda_\psi(M,N) f_\psi^0(M,N) \quad (36\text{-}2)$$

where $1 \leq M \leq K$, $1 \leq N \leq L$. In equations (36-1), (36-2) and (36-3), the superscript 0 denotes an old time point, and the superscript 1 denotes a new time point.

Figure 15:
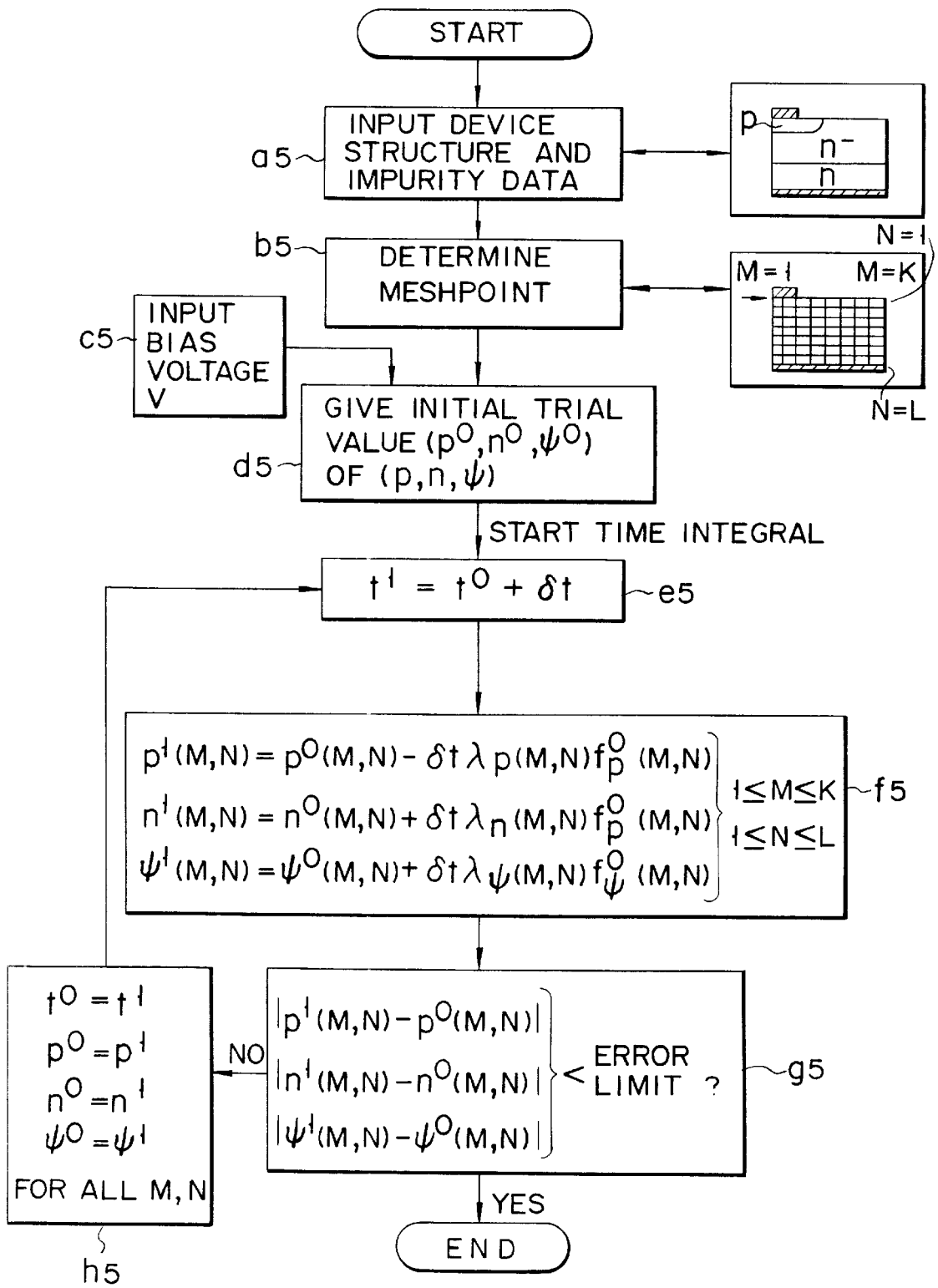
FIG. 15 is a flow chart explaining a method of analyzing the operation of a semiconductor device, according to a fifth embodiment of the invention.

The fifth method embodiment of analyzing the operation of a semiconductor device will now be explained, with reference to the flow chart of FIG. 15. First, in step a5, the data items representing the structure and impurity concentrations of the semiconductor device are input to the memory of a computer. Next, in step b5, the positions of meshpoints of the device are determined. In step c5, the data showing a bias voltage V is input to the memory of the computer. The flow goes to step d5, in which initial trial values $p^0(M,N)$, $n^0(M,N)$, $\psi^0(M,N)$ for basic variables quantities $p(M,N)$, $n(M,N)$, and $\psi(M,N)$ are applied. Further, in step e5, an integration-starting time $t^1$ is set.

Next, in step f5, the values of the right sides of equations (36-1), (36-2), and (36-3) are obtained for all meshpoints $1 \leq M \leq K$, $1 \leq N \leq L$. The values thus obtained are considered equal to $p^1(M,N)$, $n^1(M,N)$, $\psi^1(M,N)$; $1 \leq M \leq K$, $1 \leq N \leq L$. Hence, the integration advances one step forward on the time axis.

In the next step, i.e., step g5, the absolute values of the changes in the variable quantities, $|p^1(M,N) - p^0(M,N)|$, $|n^1(M,N) - n^0(M,N)|$, $|\psi^1(M,N) - \psi^0(M,N)|$ are obtained for all meshpoints. Also in step g5, it is determined whether or not the absolute values of these changes for all meshpoints fall within predetermined error limits.

If NO even in one meshpoint in step g5, the flow goes to step h5, in which the corrected values $p^1(M,N)$, $n^1(M,N)$, $\psi^1(M,N)$ are used as new trial values, and hence are regarded as equal to $p^0(M,N)$, $n^0(M,N)$, and $\psi^0(M,N)$. Then, the time $t^1$ is set to $t^0$, and integration is performed on the time axis.

Conversely, if YES in all meshpoints in step g5, it is assumed that steady solutions have been obtained. These solutions are of such type that the time differential terms on the left sides of equations (20-1), (20-2) and (20-3) become zero, that is, $f_p(MN) = 0$, $f_n(M,N) = 0$, $f_\psi(M,N) = 0$; $1 \leq M \leq K$, $1 \leq N \leq L$. This means that the solutions of equations (8-1), (8-2) and (9) have been obtained.

In the fifth method embodiment, the sensitivity coefficients $\lambda_p(M,N)$, $\lambda_n(M,N)$, and $\lambda_\psi(M,N)$ can be determined in the same way as in the fourth method embodiment. Hence, they are represented by the following equation (55-4). Since the eigen values of the error propagation matrix A exist within unit circles in a complex plane, $\lambda_p$, $\lambda_n$, and $\lambda_\psi$ are determined.

$$\begin{pmatrix} \delta p \\ \delta n \\ \delta \psi \end{pmatrix}_{t+\delta t} = A \begin{pmatrix} \delta p \\ \delta n \\ \delta \psi \end{pmatrix}_t \quad (55\text{-}4)$$

Actual equations expressing the sensitivity coefficients $\lambda_p(M,N)$, $\lambda_n(M,N)$, and $\lambda_\psi(M,N)$, which are important to the present invention, will be explained. In order to perform the method of the invention successfully, it is utmost required to impart appropriate values to these coefficients. To this end, Gerschgorin's circle theorem is applied.

It will now be explained how equations (19-1), (19-2) and (19-3), i.e., the basic equations of the invention, are processed, thereby to derive equations (32-1), (32-2) and (32-3) representing the conditions of a sixth method embodiment of the invention, which is designed to analyze the operation condition of a semiconductor device. In this process, Gerschgorin's circle theorem is applied. More precisely, equations (19-1), (19-2), and (19-3) are rewritten to the following general form:

$$x = \begin{pmatrix} p \\ n \\ \psi \end{pmatrix}$$

Then, we obtain:

$$dx/dt = \lambda f(x) \tag{25}$$

Let us assume that the variable x changes by $\delta x_1$ during the period of $\delta t$. Namely:

$$\delta x_1 = \lambda \delta t f(x_0) \tag{56}$$

Further, assuming that the variable x changes by $\delta x_2$ during the next period of $\delta t$, then:

$$\begin{aligned}\delta x_2 &= \lambda \delta t f(x_0 + \delta x_1) \\ &\simeq \lambda \delta t [f(x_0) + (\delta f/\delta x)\delta x_1] \\ &= \delta x_1 + \lambda \delta t (\delta f/\delta x)\delta x_1\end{aligned} \tag{57}$$

Thus, the error propagation matrix A is defined by $[1+\lambda\delta t(\delta f/\delta x)]$. The second term of equation (57) is rewritten to the following:

$$\delta p(M, N) = -\lambda_p(M, N)\delta t \times \tag{58-1}$$
$$\{f_p(M, N) + (\partial f_p(M, N)/\partial n(M, N-1))\delta n(M, N-1) +$$
$$(\partial f_p(M, N)/\partial p(M, N-1))\delta p(M, N-1) +$$
$$(\partial f_p(M, N)/\partial \psi(M, N-1))\delta \psi(M, N-1) +$$
$$(\partial f_p(M, N)/\partial n(M, N))\delta n(M, N) +$$
$$(\partial f_p(M, N)/\partial p(M, N))\delta p(M, N) +$$
$$(\partial f_p(M, N)/\partial \psi(M, N))\delta \psi(M, N) +$$
$$(\partial f_p(M, N)/\partial n(M, N+1))\delta n(M, N+1) +$$
$$(\partial f_p(M, N)/\partial p(M, N+1))\delta p(M, N+1) +$$
$$(\partial f_p(M, N)/\partial \psi(M, N+1))\delta \psi(M, N+1) +$$
$$(\partial f_p(M, N)/\partial n(M-1, N))\delta n(M-1, N) +$$
$$(\partial f_p(M, N)/\partial p(M-1, N))\delta p(M-1, N) +$$
$$(\partial f_p(M, N)/\partial \psi(M-1, N))\delta \psi(M-1, N) +$$
$$(\partial f_p(M, N)/\partial n(M+1, N))\delta n(M+1, N) +$$
$$(\partial f_p(M, N)/\partial p(M+1, N))\delta p(M+1, N) +$$
$$(\partial f_p(M, N)/\partial \psi(M+1, N))\delta \psi(M+1, N)\}$$

$$\delta n(M, N) = \lambda_n(M, N)\delta t \times \tag{58-2}$$
$$\{f_n(M, N) + (\partial f_n(M, N)/\partial n(M, N-1))\delta n(M, N-1) +$$
$$(\partial f_n(M, N)/\partial p(M, N-1))\delta p(M, N-1) +$$
$$(\partial f_n(M, N)/\partial \psi(M, N-1))\delta \psi(M, N-1) +$$
$$(\partial f_n(M, N)/\partial n(M, N))\delta n(M, N) +$$
$$(\partial f_n(M, N)/\partial p(M, N))\delta p(M, N) +$$
$$(\partial f_n(M, N)/\partial \psi(M, N))\delta \psi(M, N) +$$
$$(\partial f_n(M, N)/\partial n(M, N+1))\delta n(M, N+1) +$$
$$(\partial f_n(M, N)/\partial p(M, N+1))\delta p(M, N+1) +$$
$$(\partial f_n(M, N)/\partial \psi(M, N+1))\delta \psi(M, N+1) +$$
$$(\partial f_n(M, N)/\partial n(M-1, N))\delta n(M-1, N) +$$
$$(\partial f_n(M, N)/\partial p(M-1, N))\delta p(M-1, N) +$$
$$(\partial f_n(M, N)/\partial \psi(M-1, N))\delta \psi(M-1, N) +$$
$$(\partial f_n(M, N)/\partial n(M+1, N))\delta n(M+1, N) +$$
$$(\partial f_n(M, N)/\partial p(M+1, N))\delta p(M+1, N) +$$
$$(\partial f_n(M, N)/\partial \psi(M+1, N))\delta \psi(M+1, N)\}$$

$$\delta \psi(M, N) = \lambda_\psi(M, N)\delta t \times \tag{58-3}$$
$$\{f_\psi(M, N) + (\partial f_\psi(M, N)/\partial n(M, N-1))\delta n(M, N-1) +$$
$$(\partial f_\psi(M, N)/\partial p(M, N-1))\delta p(M, N-1) +$$
$$(\partial f_\psi(M, N)/\partial \psi(M, N-1))\delta \psi(M, N-1) +$$
$$(\partial f_\psi(M, N)/\partial n(M, N))\delta n(M, N) +$$
$$(\partial f_\psi(M, N)/\partial p(M, N))\delta p(M, N) +$$
$$(\partial f_\psi(M, N)/\partial \psi(M, N))\delta \psi(M, N) +$$
$$(\partial f_\psi(M, N)/\partial n(M, N+1))\delta n(M, N+1) +$$
$$(\partial f_\psi(M, N)/\partial p(M, N+1))\delta p(M, N+1) +$$
$$(\partial f_\psi(M, N)/\partial \psi(M, N+1))\delta \psi(M, N+1) +$$
$$(\partial f_\psi(M, N)/\partial n(M-1, N))\delta n(M-1, N) +$$
$$(\partial f_\psi(M, N)/\partial p(M-1, N))\delta p(M-1, N) +$$
$$(\partial f_\psi(M, N)/\partial \psi(M-1, N))\delta \psi(M-1, N) +$$
$$(\partial f_\psi(M, N)/\partial n(M+1, N))\delta n(M+1, N) +$$
$$(\partial f_\psi(M, N)/\partial p(M+1, N))\delta p(M+1, N) +$$
$$(\partial f_p(M, N)/\partial \psi(M+1, N))\delta \psi(M+1, N)\}$$

Let us now consider equation (58-1) for the variable p. If $\delta n(M,N)$ and $\delta \psi(M,N)$ are 0, then:

$$\delta p(M, N) = -\lambda_p(M, N)\delta t \left\{ \sum_{K,L} \partial f_p(M, N)/\partial p(K, L)\delta p(K, L) + \partial f_p(M, N)/\delta p(M, N)\delta p(M, N) \right\} \tag{59}$$

where $$\sum_{K,L}$$

is defined as follows:

$$\sum_{K,L} (\partial f_p(M, N)/\partial p(K, L))\delta p(K, L) = \tag{60}$$
$$(\partial f_p(M, N)/\partial p(M-1, N))\delta p(M-1, N) +$$
$$(\partial f_p(M, N)/\partial p(M+1, N))\delta p(M+1, N) +$$
$$(\partial f_p(M, N)/\partial p(M, N-1))\delta p(M, N-1) +$$
$$(\partial f_p(M, N)/\partial p(M, N+1))\delta p(M, N+1)$$

The following error propagation equation (61), which corresponds to equation (57), will derive from equation (59) corresponding to equation (56):

$$\delta p^2(M, N) = \delta p^1(M, N) - \qquad (61)$$

$$\lambda_p(M, N)\delta t \times \left\{ \sum_{K,L} (\partial f_p(M, N)/\partial p(K, L))\delta p^1(K, L) + \partial f_p(M, N)/\partial p(M, N)\delta p^1(M, N) \right\}$$

Transforming equation (61) to a matrix equation, we find a diagonal term expressed as:

$$: 1 - \lambda_p(M,N)\delta t (\partial f_p(M,N)/\partial p(M,N)) \qquad (62)$$

The sum of the absolute values of non-diagonal term is given as follows:

$$+ \lambda_p(M, N)\delta t \sum_{K,L} (|\partial f_p(M, N)/\partial p(K, L)|) \qquad (63)$$

Here, we apply Gerschgorin's circle theorem. By definition, the components of the error propagation matrix are real numbers if the eigen values to the matrix exist within unit circles in a complex plane. It follows that the centers $G_i$ of the unit circles are distributed on a real axis. Therefore, the following two inequalities must hold true:

$$-1 \leq 1 - \lambda_p(M, N)\delta t (\partial f_p(M, N)/\partial p(M, N)) - \qquad (64)$$
$$\lambda_p(M, N)\delta t \sum_{K,L} |\partial f_p(M, N)/\partial p(K, L)|$$

$$1 - \lambda_p(M, N)\delta t (\partial f_p(M, N)/\partial p(M, N)) + \qquad (65)$$
$$\lambda_p(M, N)\delta t \sum_{K,L} (|\partial f_p(M, N)/\partial p(K, L)|) \leq 1$$

Rewriting equation (64) yields:

$$2 \Big/ \left\{ \partial f_p(M, N)/\partial p(M, N) + \sum_{K,L} |\partial f_p(M, N)/\partial p(K, L)| \right\} \geq \lambda_p(M, N)\delta t \qquad (66)$$

Meanwhile, equation (65) changes to:

$$0 \geq \lambda_p(M, N)\delta t \qquad (67)$$
$$\left\{ \left( \sum_{K,L} |\partial f_p(M, N)/\partial p(K, L)| \right) - \partial f_p(M, N)/\partial p(M, N) \right\}$$

Clearly, $\lambda_p(M,N)\delta t$ assumes either a positive value when the value in parentheses is negative. Alternatively $\lambda_p(M,N)\delta t$ assumes a negative value when the value in parentheses is positive. To meet physical requirements, $\lambda_p(M,N)\delta t$ must have a positive value. Hence, equation (67) is not used; equation (66) only is utilized. In practice, parameter $\omega_p$ ($0 \leq \omega_p \leq 1$) is used. Namely:

$$\lambda_p(M, N)\delta t = \qquad (68)$$
$$2\omega_p \Big/ \left\{ \left( \sum_{K,L} |\partial f_p(M, N)/\partial p(K, L)| \right) + \partial f_p(M, N)/\partial p(M, N) \right\}$$

Similarly, $\lambda_n(M,N)\delta t$ and $\lambda_\psi(M,N)\delta t$ can be determined for variables n and $\psi$.

Another method of analyzing the operation of a semiconductor device will be described which is the sixth method embodiment of the invention. In the sixth method embodiment, to solve equations (8-1), (8-2) and (9), these equations are transformed to the following ones, each contains a time differential term:

$$dp(M,N)/dt = -\lambda_p(M,N)f_p(M,N) \qquad (20\text{-}1)$$
$$dn(M,N)/dt = \lambda_n(M,N)f_n(M,N) \qquad (20\text{-}2)$$
$$d\psi(M,N)/dt = \lambda_\psi(M,N)f_\psi(M,N) \qquad (20\text{-}3)$$

where $f_p$, $f_n$, and $f_\psi$, which are in the right sides of these equations, are defined as follows:

$$f_p(M, N) = (1/q)\{[J_{px}(M) - J_{px}(M-1)]/h'_x(M)\} + \qquad (21\text{-}1)$$
$$(1/q)\{[J_{py}(N) - J_{py}(N-1)]/h'_y(M)\} + U(M, N)$$

$$f_n(M, N) = (1/q)\{[J_{nx}(M) - J_{nx}(M-1)]/h'_x(M)\} + \qquad (21\text{-}2)$$
$$(1/q)\{[J_{ny}(N) - J_{ny}(N-1)]/h'_y(M)\} + U(M, N)$$

$$f_\psi(M, N) = [1/h'_x(M)]\{[\psi(M+1, N) - \psi(M, N)]/ \qquad (21\text{-}3)$$
$$h_x(M) - [\psi(M, N) - \psi(M-1, N)]/$$
$$h_x(M-1)\} + [1/h'_y(N)]\{[\psi(M, N+1) - \psi(M, N)]/$$
$$h_y(N) - [\psi(M, N) - \psi(M, N-1)]/h_x(N-1)\} +$$
$$(q/\varepsilon)[\Gamma(M, N) + P(M, N) - n(M, N)]$$

The time-differential terms on the left sides of equations (20-1), (20-2) an (20-3) are difference-approximated, by setting a finite number of meshpoints on the time axis, whereby the following equations are obtained:

$$p^1(M,N) = p^0(M,N) - \delta t \lambda_p(M,N) f_p^0(M,N) \qquad (36\text{-}1)$$
$$n^1(M,N) = n^0(M,N) + \delta t \lambda_n(M,N) f_n^0(M,N) \qquad (36\text{-}2)$$
$$\psi^1(M,N) = \psi^0(M,N) + \delta t \lambda_\psi(M,N) f_\psi^0(M,N) \qquad (36\text{-}3)$$

where $1 \leq M \leq K$, $1 \leq N \leq L$. In equations (36-1), (36-2) and (36-3), the superscript 0 denotes an old time point, and the superscript 1 denotes a new time point.

Figure 16:
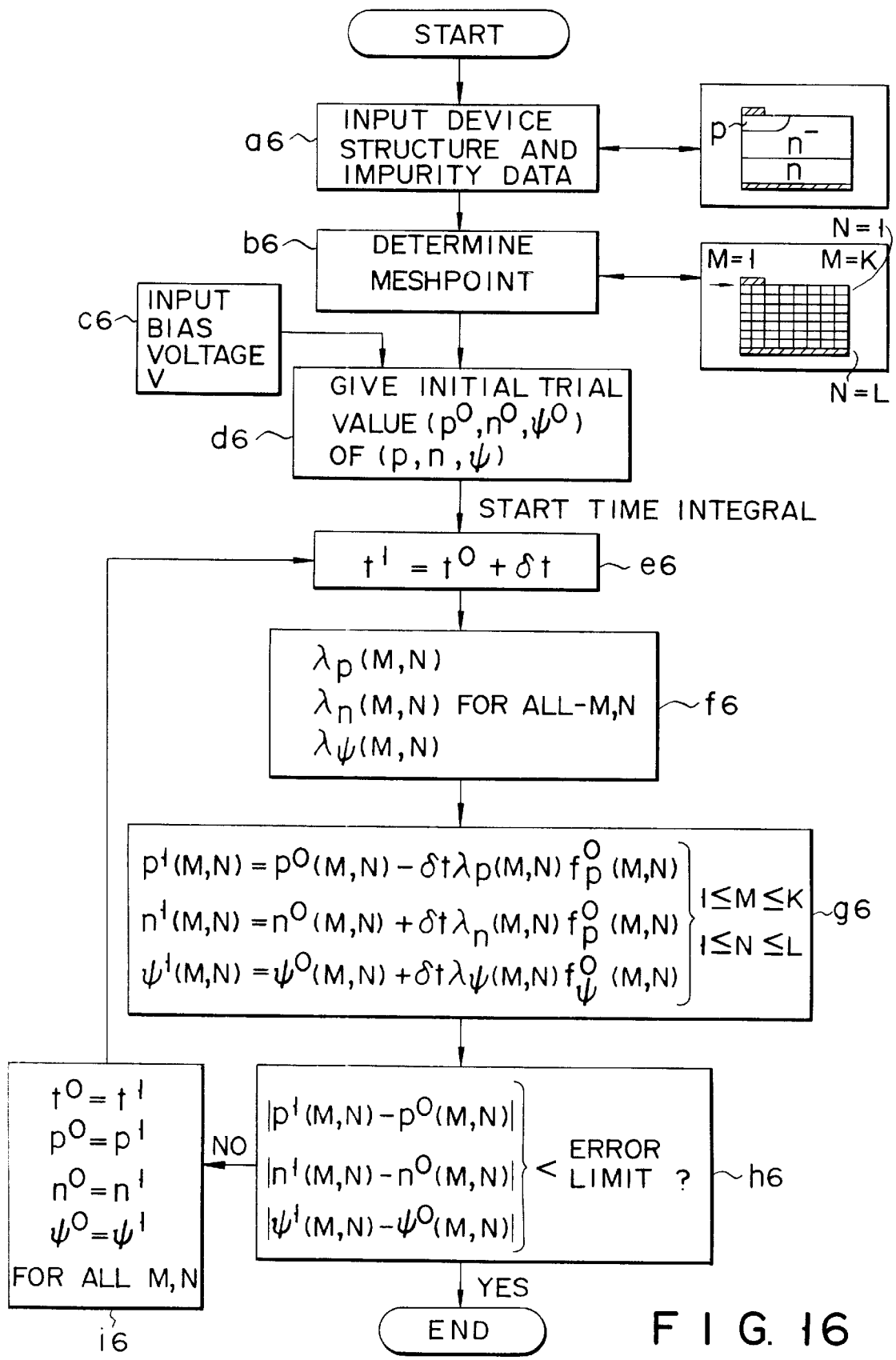
FIG. 16 is a flow chart explaining a method of analyzing the operation of a semiconductor device, according to a sixth embodiment of the invention.

The sixth method embodiment of analyzing the operation of a semiconductor device will now be explained, with reference to the flow chart of FIG. 16. First, in step a6, the data items representing the structure and impurity concentrations of the semiconductor device are input to the memory of a computer. Next, in step b6, the positions of meshpoints of the device are determined. In step c6, the data showing a bias voltage V is input to the memory of the computer. The flow goes to step d6, in which initial trial values $p^0(M,N)$, $n^0(M,N)$, $\psi^0(M,N)$ for basic variables quantities $p(M,N)$, $n(M,N)$, and $\psi(M,N)$ are applied. Further, in step e6, an integration-starting time $t^1$ is set.

Next, in step f6, sensitivity coefficients $\lambda_p(M,N)$, $\lambda_n(M, N)$, and $\lambda_\psi(M,N)$ are calculated for all meshpoints in accordance with equations (32-1), (32-2) and (32-3). Further, in step g6, the values of the right sides of equations (36-1), (36-2), and (36-3) are obtained for all meshpoints $1 \leq M \leq K$, $1 \leq N \leq L$. The values thus obtained are considered equal to $p^1(M,N)$, $n^1(M,N)$, $\psi^1(M,N)$; $1 \leq M \leq K$, $1 \leq N \leq L$. Hence, the integration advances one step forward on the time axis.

In step h6, the absolute values of the changes in the variable quantities, $|p^1(M,N)-p^0(M,N)|$, $|n^1(M,N)-n^0(M,N)|$, $|\psi^1(M,N)-\psi^0(M,N)|$ are obtained for all meshpoints. Also in step h6, it is determined whether or not the absolute values of these changes for all meshpoints fall within predetermined error limits.

If NO even in one meshpoint in step h6, the flow goes to step i6, in which the corrected values $p^1(M,N)$, $n^1(M,N)$, $\psi^1(M,N)$ are used as new trial values, and hence are regarded as equal to $p^0(M,N)$, $n^0(M,N)$, and $\psi^0(M,N)$. Then, the time $t^1$ is set to $t^0$, and integration is performed on the time axis in the same way as in the fifth method embodiment.

Conversely, if YES in all meshpoints in step h6, it is assumed that steady solutions have been obtained. These solutions are of such type that the time differential terms on the left sides of equations (20-1), (20-2) and (20-3) become zero, that is, $f_p(M,N)=0$, $f_n(M,N)=0$, $f_\psi(M,N)=0$; $1 \leq M \leq K$, $1 \leq N \leq L$. This means that the solutions of equations (8-1), (8-2) and (9) have been obtained.

Thus far described is the basic concept of the sixth method embodiment according to the present invention. In comparison with the conventional method, the sixth method embodiment is characterized in the following respects:

1. The method includes no processes for linearizing nonlinear equations.

2. No massive matrix-vector equation, such as equation (16) or the equation derived from equation (16) and schematically shown in FIG. 2, need be solved, and hence, no calculations which are so complex that large memories are required to perform them need be carried out. It suffices to find the values of the right sides of equations (36-1), (36-2) and (36-3), and to correct the basic variable quantities.

3. Since the coefficients $\lambda_p(M,N)$, $\lambda_n(M,N)$ and $\lambda_\psi(M,N)$ used as adjusting factors (i.e., the sensitivity coefficients) can take different values for the mesh-points of the device space, the solutions of the equations can effectively converge by setting the sensitivity coefficients at values which are appropriate for the physical properties of the device.

4. The process of solving equations (20-1), (20-2), and (20-3) is nothing but a numerical integration on the time axis. The integration can of course be executed by means of a large digital computer, but it can also be solved by an apparatus comprising electronic circuits whose time response (i.e., transient phenomenon) attains a steady state, thus solving specific equations, as will be soon explained in conjunction with the description of the apparatuses according to the invention.

As may be understood from the above, the sixth method embodiment of this invention is novel, quite different from the conventional method consisting in solving matrix-vector problems, and possibly opening a new field in device modeling technology.

An apparatus for performing the sixth method embodiment, explained above, will be described with reference to FIGS. 17 and 18. This apparatus is designed to solve differential equations (19-1), (19-2) and (19-3) containing time differential terms and sensitivity coefficients transformed from simultaneous equations (i.e., electron- and hole-transport equations and Poisson's equation), in order to achieve the modeling of a semiconductor device.

FIG. 17 is a schematic representation of this apparatus for analyzing a semiconductor device model 200. As is shown in this figure, the apparatus comprises an address unit 202, a meshpoint unit 204, a memory unit 206, and a judging unit 208.

The meshpoint unit 204 has three input terminals and three output terminals. Basic variable quantities $p(M,N)$, $n(M,N)$ and $\psi(M,N)$ of meshpoints are supplied to the input terminals of the unit 204, and three updated variable quantities are delivered from the output terminals of the unit 204. The internal structure of the meshpoint unit 204 will be described later. Additional meshpoint units can be used. In other words, the apparatus can have one to m meshpoint units. If it has m meshpoint units in total, it can carry out m parallel calculations simultaneously. In the following description, it assumes that the apparatus has one meshpoint unit.

The address unit 202 is designed to designate any memory location of the memory unit 206, thereby to store the output from the meshpoint unit 204 at this memory location.

The judging unit 208 is used to determine whether or not the difference between the previous value of each variable quantity and the updated value thereof has decreased sufficiently for all meshpoints of the device model 200. If this difference has not decreased sufficiently for even one of the meshpoints, the updated value is regarded as one previous to the next time point, and is thus supplied to the input of the mesh-point unit 204. On the other hand, if the difference has decreased adequately for all meshpoints of the device model 200, it is assumed that steady solutions have been obtained, and the computation is ended.

Figure 18:
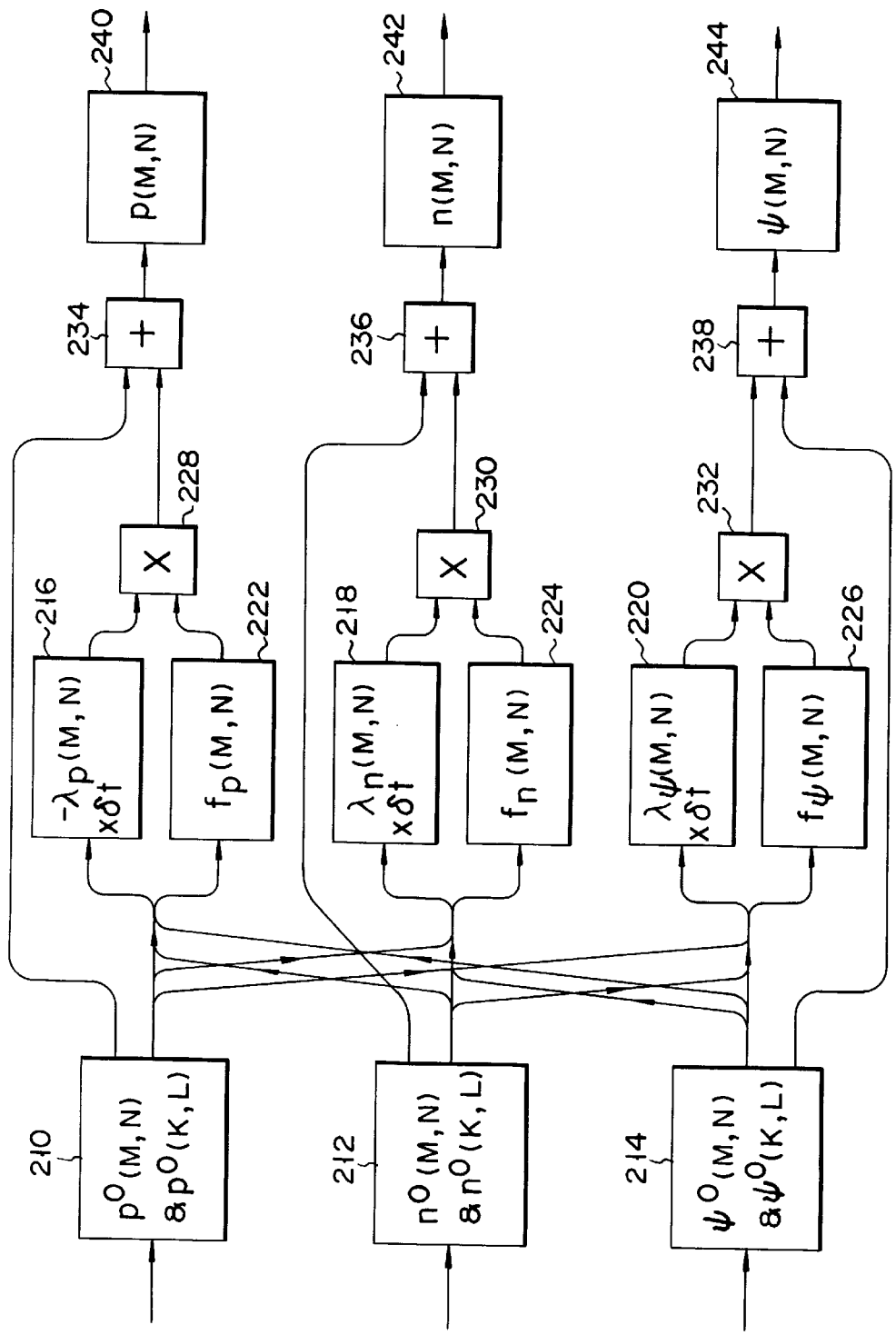
FIG. 18 is a block diagram illustrating the meshpoint unit incorporated in the apparatus shown in FIG. 17.

The internal structure and operation of the meshpoint unit 204, which is the main component of the apparatus shown in FIG. 17, will be described with reference to FIG. 18. The old values $p^0(M,N)$, $n^0(M,N)$, and $\psi^0(M,N)$ of basic variable quantities $p(M,N)$, $n(M,N)$, and $\psi(M,N)$ for a specified meshpoint (M,N) are supplied to the three input terminals 210, 212 and 213 of the meshpoint unit 204. These values $p^0(M,N)$, $n(M,N)$, and $\psi^0(M,N)$ are input to blocks 216, 218 an 220 for calculating sensitivity coefficients $-\lambda_p$, $\lambda_n$, and $\lambda_\psi$, and also to blocks 222, 224 and 226 for calculating functions $f_p$, $f_n$ and $f_\psi$. More specifically, the value $p^0(M,N)$ related to the continuity equation of holes is supplied to the input terminals of the blocks 216 and 222 for calculating $-\lambda_p$ and $f_p(M,N)$. At the same time, the values $p^0(K,L)$, which represent the hole density at the neighboring meshpoints, are also supplied to the blocks 216 and 222 by means of the address unit 202.

The continuity equation of holes is applied to determine hole density. The two other variable quantities $n(M,N)$ and $\psi(M,N)$, and the variable quantities $n(K,L)$ and $\psi(K,L)$ for the neighboring meshpoints are supplied to blocks 216 and 222 by means of the address unit 202 in order to calculate $f_p(M,N)$ and $\lambda_p(M,N)$.

After the functions and sensitivity coefficients for the three variable quantities have been calculated, they are input to multipliers 228, 230, and 232. The outputs of these multipliers 228, 230, and 232 are input to adders 234, 236, and 238. The adders 234, 236, and 238 add the outputs of the multipliers 228, 230 and 232 to the old values of the corresponding variable quantities, producing updated or new values of the variable quantities p(M,N), n(M,N), and V(M, N), which are supplied to the output terminals 240, 242 and 244 of the meshpoint unit 204.

The meshpoint unit 204 can be either a digital data-processing unit or an analog data-processing unit, or a hybrid unit which can process both digital data and analog data.

Still another method will be described which is the seventh method embodiment according to the present invention and is designed to analyze the operation of a semiconductor device.

The hole density p and the electron density n, either described in terms of Boltzmann statistics, a quasi-Fermi hole potential $\phi_p$, and a quasi-Fermi electron potential $\phi_n$ have the following relations:

$$p(M,N) = n_i \exp[\theta(\phi_p(M,N) - \psi(M,N))] \quad (69\text{-}1)$$

$$n(M,N) = n_i \exp[\theta(\phi(M,N) - \phi_n(M,N)] \quad (69\text{-}2)$$

Substituting equations (69-1) and (69-2) in equations (19-1) and (19-2), yields the following two equations:

$$d\phi_p(M,N)/dt = -\lambda_p(M,N)f_p(M,N)/[\theta p(M,N)] + \lambda_\psi(M,N)f_\psi(M,N) \quad (70\text{-}1)$$

$$d\phi_n(M,N)/dt = -\lambda_n(M,N)f_n(M,N)/[\theta n(M,N)] + \lambda_\psi(M,N)f_\psi(M,N) \quad (70\text{-}2)$$

These two equations (70-1) and (70-2) are applied, instead of equations (19-1) and (19-2). In other words, three variables $\phi_p(M,N)$, $\phi_n(M,N)$, and $\psi(M,N)$ are used as basic variable quantities, instead of p(M,N), n(M,N), and $\psi(M,N)$. This characterizes the seventh method embodiment of the invention. The seventh method embodiment is identical to the sixth method embodiment, in that the third equation applied is also equation (19-3) which is:

$$d\psi(M,N)/dt = \lambda_\psi(M,N)f_\psi(M,N) \quad (70\text{-}3)$$

Unlike in the sixth method embodiment, three potentials $\phi_p$, $\phi_n$, and $\psi$, which are of the same physical dimension, can be considered to be basic variables. Hence, their values have so similar size that they can be numerically processed quite easily.

Figure 19:
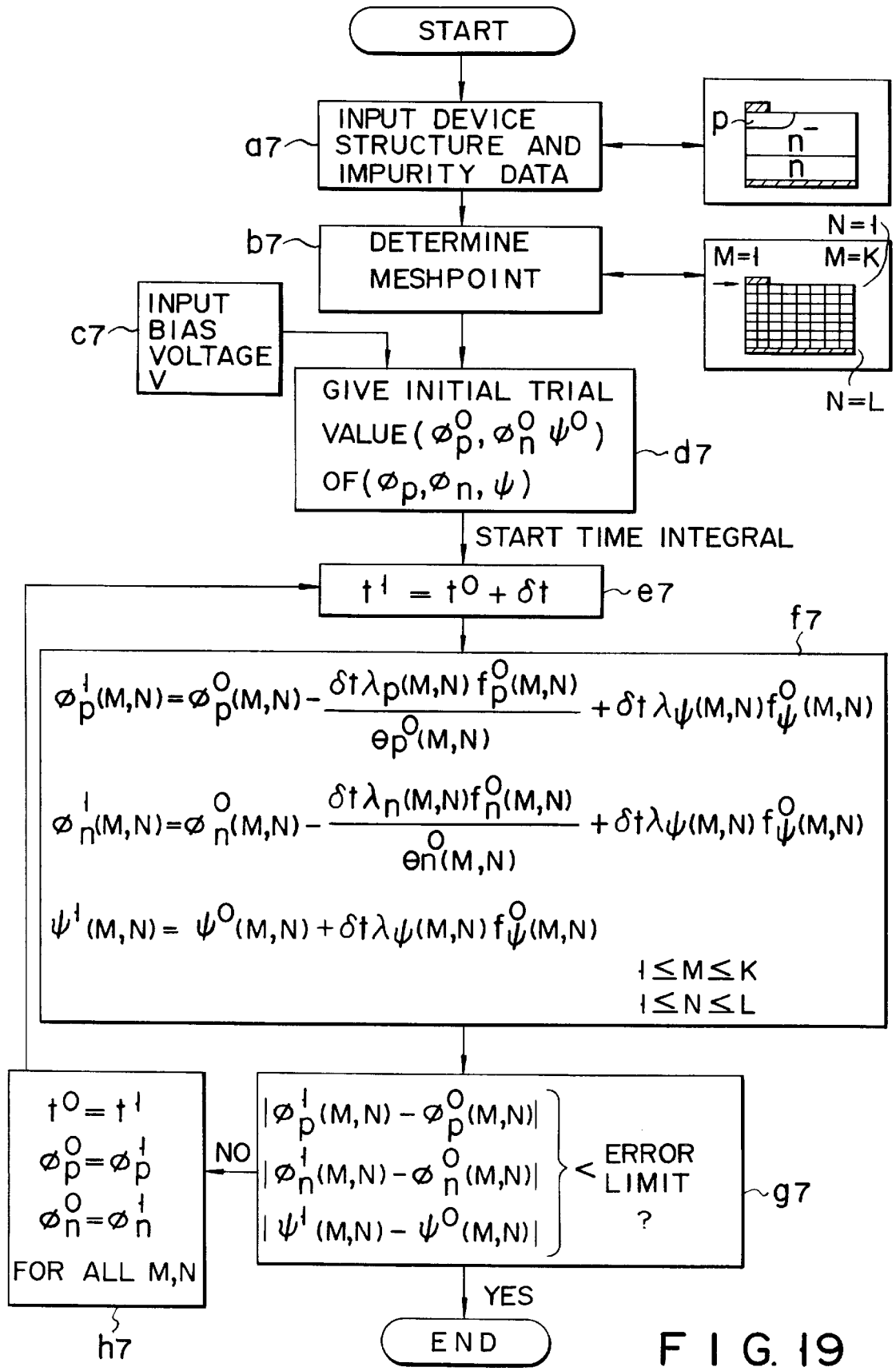
FIG. 19 is a flow chart explaining a method of analyzing the operation of a semiconductor device, according to a seventh embodiment of the invention.

The seventh method embodiment will now be explained, in detail, with reference to the flow chart of FIG. 19. First, in step a7 the data items representing the structure and impurity concentrations of the semiconductor device are input to the memory of a computer. Next, in step b7 the positions of meshpoints of the device are determined. In step c7, the data showing a bias voltage V is input to the memory of the computer. The flow goes to step d7 in which initial trial values $\phi_p^0(M,N)$, $\phi_n^0(M,N)$, $\psi^0(M,N)$ for basic variables quantities $\phi_p(M,N)$, $\phi_n(M,N)$, and $\psi(M,N)$ are applied. Further, in step e7, an integration-starting time $t^1$ is set.

Next, in step f7, the values of the right sides of the following equations (71-1), (71-2), and (71-3) are obtained for all meshpoints $1 \leq M \leq K$, $1 \leq N \leq L$. The values thus obtained are considered equal to $\phi_p^1(M,N)$, $\phi_n^1(M,N)$, $\psi^1(M,N)$; $1 \leq M \leq K$, $1 \leq N \leq L$. Hence, the integration advances one step forward on the time axis.

$$\phi_p^1(M,N) = \phi_p^0(M,N) - \qquad (71\text{-}1)$$
$$\delta t \lambda_p(M,N) f_p^0(M,N)/[\theta p^0(M,N)] + \delta t \lambda_\psi(M,N) f_\psi^0(M,N)$$

$$\phi_n^1(M,N) = \phi_n^0(M,N) - \qquad (71\text{-}2)$$
$$\delta t \lambda_p(M,N) f_n^0(M,N)/[\theta n^0(M,N)] + \delta t \lambda_\psi(M,N) f_\psi^0(M,N)$$

$$\psi^1(M,N) = \psi^0(M,N) + \delta t \lambda_\psi(M,N) f_\psi^0(M,N) \qquad (71\text{-}3)$$

In step g7, the absolute values of the changes in the variable quantities, $|\phi_p^1(M,N) - \phi_p^0(M,N)|$, $|\phi_n^1(M,N) - \phi_n^0(M,N)|$, $|\psi^1(M,N) - \psi^0(M,N)|$ are obtained for all meshpoints. Also in step g7, it is determined whether or not the absolute values of these changes for all meshpoints fall within predetermined error limits.

If NO even in one meshpoint in step g7, the flow goes to step h7, in which the corrected values $\phi_p1(M,N)$, $\phi_n1(M,N)$, $\psi^1(M,N)$ are used as new trial values, and hence are regarded as equal to $\phi_p^0(M,N)$, $\phi_n^0(M,N)$, and $\psi^0(M,N)$. Then, the time $t^1$ is set to $t^0$, and integration is performed on the time axis in the same way as in the sixth method embodiment.

Conversely, if YES in all meshpoints in step g7, it is assumed that steady solutions have been obtained. These solutions are of such type that the time differential terms on the left sides of equations (70-1), (70-2) and (70-3) become zero, that is, $f_p(M,N)=0$, $f_n(M,N)=0$, $f_\psi(M,N)=0$; $1 \leq M \leq K$, $1 \leq N \leq L$. This means that the solutions of equations (8-1), (8-2) and (9) have been obtained.

Figure 20:
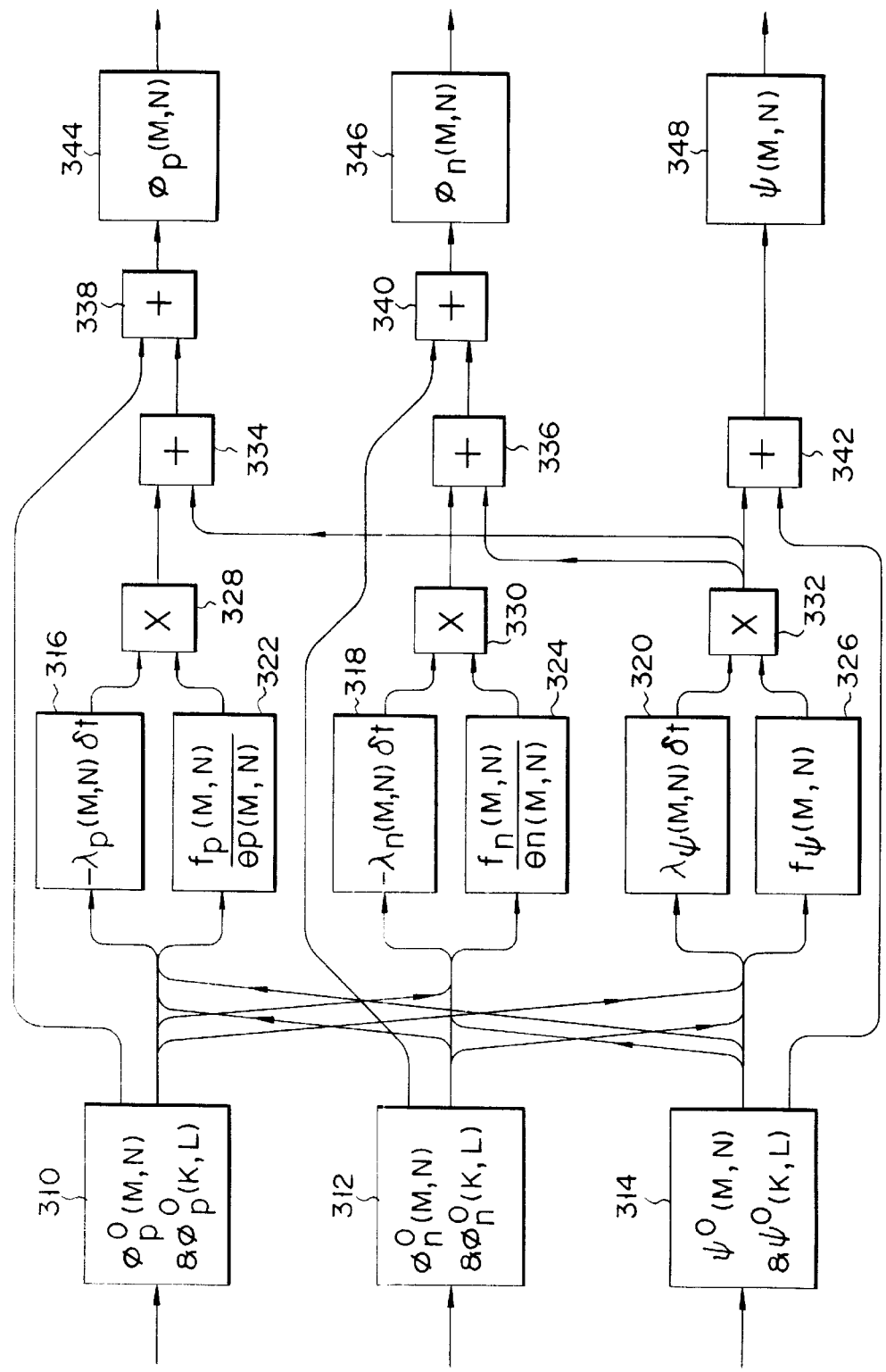
FIG. 20 is a block diagram illustrating the mesh-point unit incorporated in the apparatus designed to perform the operation-analyzing method according to the seventh embodiment of the invention.

An apparatus designed to perform the seventh method embodiment will now be described with reference to FIG. 20. This apparatus is identical with the one illustrated in FIG. 17, except for the structure of the meshpoint unit 204. Therefore, the meshpoint unit 204 only will be explained, with reference to FIG. 20.

The old values $\phi_p^0(M,N)$, $\phi_n^0(M,N)$, and $\psi^0(M,N)$ of basic variable quantities $\phi_p(M,N)$, $\phi_n(M,N)$, and $\psi(M,N)$ for a specified meshpoint (M,N) are supplied to the three input terminals 310, 312 and 314 of the meshpoint unit 204. These values $\phi_p^0(M,N)$, $\phi_n^0(M,N)$, and $\psi^0(M,N)$ are input to blocks 322, 324, 326, 316, 318, and 320 for calculating corresponding functions $f_p/[\theta p(M,N)]$, $f_n/[\theta n(M,N)]$ and $f_\psi$, and also sensitivity coefficients $-\lambda_p$, $\lambda_n$ and $\lambda_\psi$. More specifically, the value $\phi_p^0(M,N)$ related to the continuity equation of holes is supplied to the input terminals of the blocks 316 and 322 for calculating $-\lambda/_p$ and $f_p/[\theta p(M,N)]$. At the same time, the values $p^0(K,L)$, which represent the hole density at the neighboring meshpoints, are also supplied to the blocks 316 and 322 by means of the address unit 202.

The continuity equation of holes is applied to determine hole density. The two other variable quantities $\phi_n(M,N)$ and $\psi(M,N)$, and the variable quantities n(K,L) and $\psi(K,L)$ for the neighboring meshpoints are supplied to blocks 316 and 322 by means of the address unit 202, in order to calculate $f_p(M,N)$ and $\lambda_p(M,N)$.

After the functions and sensitivity coefficients for the three variable quantities have been calculated, they are input to multipliers 328, 330, and 332. The outputs of the multipliers 328 and 332 are added by an adder 334, and the outputs of the multipliers 330 and 332 are added by an adder 336. Further, the output of the adder 334 and the corresponding old value are input to an adder 338; the output of the adder 336 and the corresponding old value are input to an adder 340; and the output of the multiplier 332 and the corresponding old value are input to an adder 342. The adders 338, 340 and 342 output updated or new values, which are supplied to the output terminals 344, 346 and 348 of the meshpoint unit 204.

The meshpoint unit 204 can be either a digital data-processing unit or an analog data-processing unit, or a hybrid unit which can process both digital data and analog data.

An eighth method embodiment according to the invention will be described which is designed to analyze the operation of a semiconductor device.

If simultaneous equations (70-1), (70-2) and (70-3) are solved by means of time integration, thus obtaining steady solutions, the time differential terms of the equation will be eliminated. Hence, $f_p(M,N)=0$, $f_n(M,N)=0$, $f_\psi(M,N)=0$. These three equations are nothing else but the steady-state equations of the semiconductor device. Conversely, if these steady-state equations are satisfied, the following equations (72-1) and (72-2) formed by deleting the second terms from the right sides of equations (70-1) and (70-2), and equation (70-3) can be time-integrated to obtain steady solutions:

$$d\phi_p(M,N)/dt = -\lambda_p(M,N)f_p(M,N)/[\theta p(M,N)] \quad (72\text{-}1)$$

$$d\phi_n(M,N)/dt = -\lambda_n(M,N)f_n(M,N)/[\theta n(M,N)] \quad (72\text{-}2)$$

Further, if steady solutions are obtained from equations (72-1), (72-2) and (70-3), we will have: $f_p(M,N)=0$, $f_n(M,N)=0$, $f_{\psi(M,N)}=0$, just as when we time-integrate equations (70-1), (70-2) and (70-3). The eighth method embodiment of the present invention starts with time-integrating equations (72-1), (72-2), and (70-3).

Figure 21:
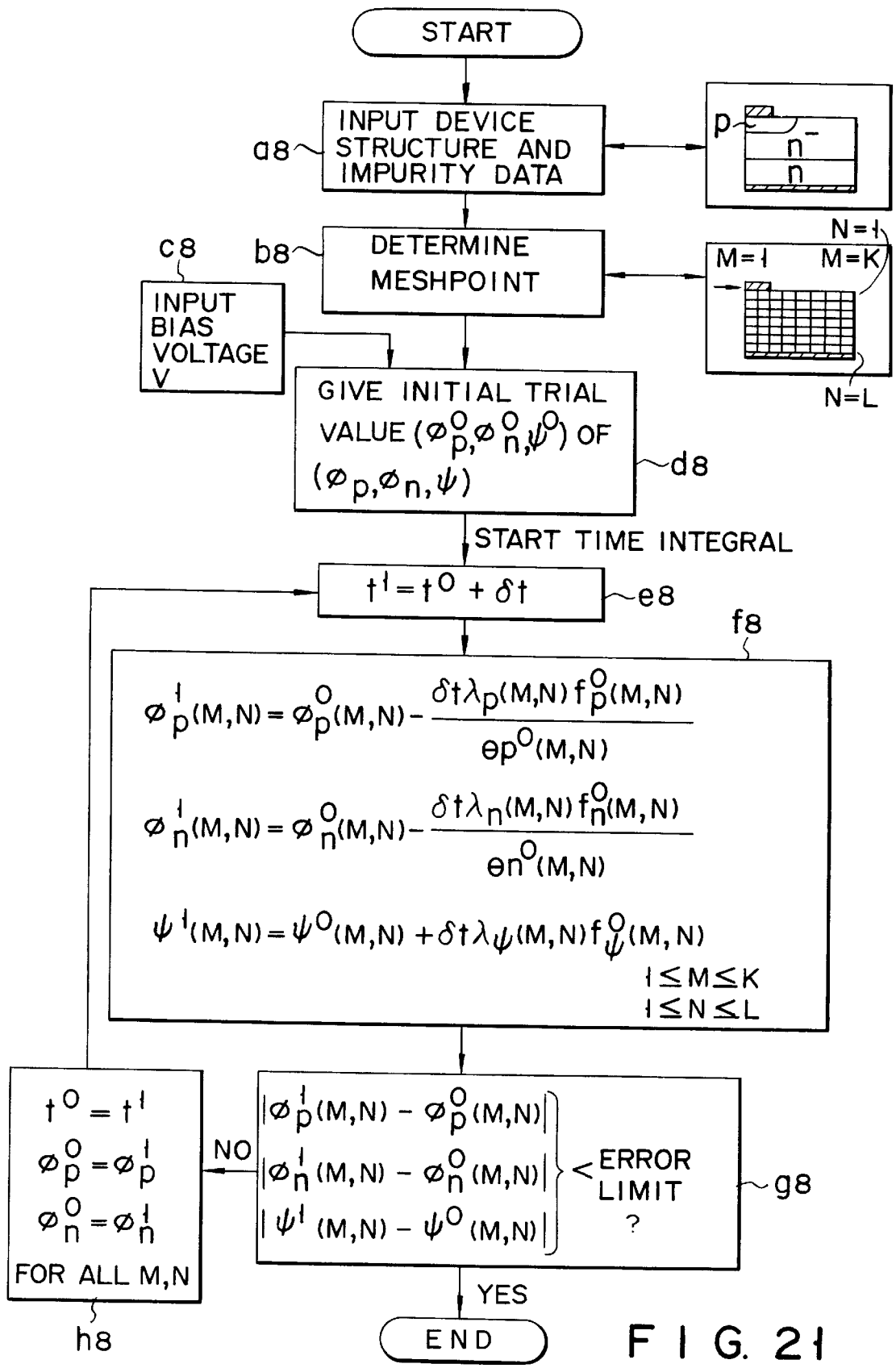
FIG. 21 is a flow chart explaining a method of analyzing the operation of a semiconductor device, according to an eighth embodiment of the invention.

The eighth method embodiment will now be explained, in detail, with reference to the flow chart of FIG. 21. First, in step a8 the data items representing the structure and impurity concentrations of the semiconductor device are input to the memory of a computer. Next, in step b8 the positions of meshpoints of the device are determined. In step c8, the data showing a bias voltage V is input to the memory of the computer. The flow goes to step d8 in which initial trial values $\phi_p^0(M,N)$, $\phi_n^0(M,N)$, $\psi^0(M,N)$ for basic variables quantities $\phi_p(M,N)$, $\phi_n(M,N)$, and $\psi(M,N)$ are applied. Further, in step e8, an integration-starting time $t^1$ is set.

Next, in step f8, the values of the right sides of the following equations (73-1), (73-2), and (73-3) are obtained for all meshpoints $1 \leq M \leq K$, $1 \leq N \leq L$. The values thus obtained are considered equal to $\phi_p^1(M,N)$, $\phi_n^1(M,N)$, $\psi^1(M,N)$; $1 \leq M \leq K$, $1 \leq N \leq L$. Hence, the integration advances one step forward on the time axis.

$$\phi_p^1(M,N) = \phi_p^0(M,N) - \delta t \lambda_p(M,N) f_p^0(M,N)/[\theta^0(M,N)] \quad (73\text{-}1)$$

$$\phi_n^1(M,N) = \phi_n^0(M,N) - \delta t \lambda_n(M,N) f_n^0(M,N)/[\theta n^0(M,N)] \quad (73\text{-}2)$$

$$\psi^1(M,N) = \psi^0(M,N) + \delta t \lambda_\psi(M,N) f_\psi^0(M,N) \quad (73\text{-}3)$$

In step g8, the absolute values of the changes in the variable quantities, $|\phi_p^1(M,N)-\phi_p^3(M,N)|$, $|\phi_n^1(M,N)-\phi_n^0(M,N)|$, $|\psi^1(M,N)-\psi^0(M,N)|$, are obtained for all meshpoints. Also in step g8, it is determined whether or not the absolute values of these changes for all meshpoints fall within predetermined error limits.

If NO in step g8, the flow goes to step h8, in which the corrected values $\phi_p^1(M,N)$, $\phi_n^1(M,N)$, $\psi^1(M,N)$ are used as new trial values, and hence are regarded as equal to $\phi_p^0(M,N)$, $\phi_n^0(M,N)$, and $\psi^0(M,N)$. Then, the time $t^1$ is set to $t^0$, and integration is performed on the time axis in the same way as in the seventh method embodiment.

Conversely, if YES in step g8, it is assumed that steady solutions have been obtained. These solutions are of such type that the time differential terms on the left sides of equations (72-1), (72-2) and (72-3) become zero, that is, $f_p(M,N)=0$, $f_n(M,N)=0$, $f_\psi(M,N)=0$; $1 \leq M \leq K$, $1 \leq N \leq L$. This means that the solutions of equations (8-1), (8-2) and (9) have been obtained.

An apparatus designed to perform the eighth method embodiment will now be described with reference to FIG. 22. This apparatus is identical with the one illustrated in FIG. 17, except for the structure of the meshpoint unit 204 which is the main component of the apparatus. Hence, the meshpoint unit 204 only will be explained, with reference to FIG. 22.

The old values $\phi_p^0(M,N)$, $\phi_n^0(M,N)$, and $\psi^0(M,N)$ of basic variable quantities $\phi_p(M,N)$, $\phi_n(M,N)$, and $\psi(M,N)$ for a specified meshpoint (M,N) are supplied to the three input terminals 410, 412 and 414 of the meshpoint unit 204. These values $\phi_p^0(M,N)$, $\phi_n^0(M,N)$, and $\psi^0(M,N)$ are input to blocks 422, 424, 426, 416, 418, and 420 for calculating corresponding functions $f_p/[\theta p(M,N)]$, $f_n/[\theta n(M,N)]$ and $f_\psi$, and also sensitivity coefficients $-\lambda_p$, $\lambda_n$ and $\lambda_\psi$. More specifically, the value $\phi_p^0(M,N)$ related to the continuity equation of holes is supplied to the input terminals of the blocks 416 and 422 for calculating $-\lambda_p$ and $f_p/[\theta p(M,N)]$. At the same time, the values $p^0(K,L)$, which represent the hole density at the neighboring meshpoints, are also supplied to the blocks 416 and 422 by means of the address unit 202 shown in FIG. 17.

The continuity equation of holes is applied to determine hole density. The two other variable quantities $\phi_n(M,N)$ and $\psi(M,N)$, and the variable quantities $n(K,L)$ and $\psi(K,L)$ for the neighboring meshpoints are supplied to blocks 416 and 422 by means of the address unit 202, in order to calculate $f_p(M,N)$ and $\lambda_p(M,N)$.

After the functions and sensitivity coefficients for the three variable quantities have been calculated, they are input to multipliers 428, 430, and 432. The outputs of the multipliers 428, 430 and 432 are input to adders 434, 436 and 438, and are added to the corresponding old values of the variable quantities, thus providing updated or new values thereof. The output of the adders 434, 436 and 438, i.e., the new values, are supplied to the output terminals 440, 442 and 444 of the meshpoint unit 204.

The meshpoint unit 204 can be either a digital data-processing unit or an analog data-processing unit, or a hybrid unit which can process both digital data and analog data.

A ninth method embodiment according to the invention will be described which is designed to analyze the operation of a semiconductor device.

As has been pointed out, no matter whether simultaneous equations (70-1), (70-2) and (70-3), or simultaneous equations (72-1), (72-2) and (70-3) are time-integrated, the results are steady and the same. Hence, in the ninth method embodiment, both sets of simultaneous equations are solved, thereby to achieve a convergence of the steady solution at higher speed than in the seventh and eighth method embodiments.

The ninth method embodiment will now be explained, in detail, with reference to the flow chart of FIG. 23. First, in step a9 the data items representing the structure and impurity concentrations of the semiconductor device are input to the memory of a computer. Next, in step b9 the positions of meshpoints of the device are determined. In step c9, the data showing a bias voltage V is input to the memory of the computer. The flow goes to step d9 in which initial trial values $\phi_p^0(M,N)$, $\phi_n^0(M,N)$, $\psi^0(M,N)$ for basic variables quantities $\phi_p(M,N)$, $\phi_n(M,N)$, and $\psi(M,N)$ are applied. Further, in step e9, an integration-starting time $t^1$ is set.

Next, in step f9, it is determined whether $I_{POIS}$ is 1 or 0. If $I_{POIS}$ is 1, the flow goes to step g9 which corresponds to step f7 of the seventh method embodiment. If $I_{POIS}$ is 0, the flow goes to step h9 which corresponds to step f8 of the eighth method embodiment.

In step g9 or h9, the values of the right sides of the equations (71-1), (71-2), and (71-3) or equations (73-1), (73-2) and (73-3) are obtained for all mesh-points $1 \leq M \leq K$, $1 \leq N \leq L$. The values thus obtained are considered equal to $\phi_p^1(M,N)$, $\phi_n^1(M,N)$, $\psi^1(M,N)$; $1 \leq M \leq K$, $1 \leq N \leq L$. Hence, the integration advances one step forward on the time axis.

In step i9, the absolute values of the changes in the variable quantities, $|\phi_p^1(M,N)-\phi_p^0(M,N)|$, $|\phi_n^1(M,N)-\phi_n^0(M,N)|$, $|\psi^1(M,N)-\psi^0(M,N)|$ are obtained for all meshpoints. Also in step i9, it is determined whether or not the absolute values of these changes for all meshpoints fall within predetermined error limits.

If NO in step i9, the flow goes to step j9, in which the corrected values $\phi_p^1(M,N)$, $\phi_n^1(M,N)$, $\psi^1(M,N)$ are used as new trial values, and hence are regarded as equal to $\phi_p^0(M,N)$, $\phi_n^0(M,N)$, and $\psi^0(M,N)$. Then, the time $t^1$ is set to $t^0$, and integration is performed on the time axis in the same way as in the seventh and eighth method embodiments.

Conversely, if YES in step i9, it is assumed that steady solutions have been obtained. These solutions are of such type that the time differential terms on the left sides of equations (70-1), (70-2) and (70-3) or equations (72-1), (72-2) and (72-3) become zero, that is, $f_p(M,N)=0$, $f_n(M,N)=0$, $f_\psi(M,N)=0$; $1 \leq M \leq K$, $1 \leq N \leq L$. This means that the solutions of equations (8-1), (8-2) and (9) have been obtained.

An apparatus designed to perform the ninth method embodiment will now be described with reference to FIG. 24. This apparatus is identical with the one illustrated in FIG. 17, except for the structure of the meshpoint unit 204 which is the main component. The unit 204 is the same as those shown in FIGS. 20 and 22, except for the provision of switches SW1, SW2, SW3, SW4, SW5, and SW6. When the movable contacts of these switches are connected to stationary contacts A, the meshpoint unit 204 operates in the same way as that shown in FIG. 20. When the movable contacts are connected to stationary contacts B, the unit 204 operates in the same way as that illustrated in FIG. 22.

A tenth method embodiment of the invention will be described which is also designed to analyze the operation of a semiconductor device. This method is characterized in that the sensitivity coefficients $\lambda_p$, $\lambda_n$, and $\lambda_\psi$ are determined in a specific way, by rewriting basic variable quantities $\phi_p$, $\phi_n$ and $\psi$. These basic variable quantities can ultimately be rewritten to:

$$\lambda_p(M,N)\delta t = \qquad (35\text{-}1)$$

$$2\omega_p \theta \Bigg/ \Bigg\{ \Bigg[ \sum_{K,L} |\partial/\partial \phi_p(K,L)(f_p(M,N)/p(M,N))| \Bigg] +$$

$$\partial/\partial \phi_p(M,N)(f_p(M,N)/p(M,N)) \Bigg\}$$

$$\lambda_n(M,N)\delta t = 2\omega_n \theta \Bigg/ \Bigg\{ \Bigg[ \sum_{K,L} |\partial/\partial \phi_n(K,L)(f_n(M,N)/n(M,N))| \Bigg] + \qquad (35\text{-}2)$$

$$\partial/\partial \phi_n(M,N)(f_n(M,N)/n(M,N)) \Bigg\}$$

$$\lambda_\psi(M,N)\delta t = \qquad (35\text{-}3)$$

$$2\omega_\psi \Bigg/ \Bigg\{ \Bigg( \sum_{K,L} |\partial f_\psi(M,N)/\partial \psi(K,L)| \Bigg) - \partial f_\psi(M,N)/\partial \psi(M,N) \Bigg\}$$

As in the sixth method embodiment, $\omega_p$, $\omega_n$ and $\omega_\psi$ are constants ranging between 0 and 1. The tenth method embodiment is identical to the seventh and ninth method embodiments, except that the sensitivity coefficients $\lambda_p$, $\lambda_n$, and $\lambda_\psi$ defined by equations (35-1), (35-2) and (35-3) are designated after step e7 or step e9.

A specific example of numerical analysis, which the seventh to tenth method embodiments can perform, will now be described. The basic variable quantities applied in this example are: $\phi_p$, $\phi_n$ and $\psi$. Equations (35-1), (35-2) and (35-3) are applied to determine the sensitivity coefficients $\lambda_p$, $\lambda_n$, and $\lambda_\psi$.

Figure 25A:
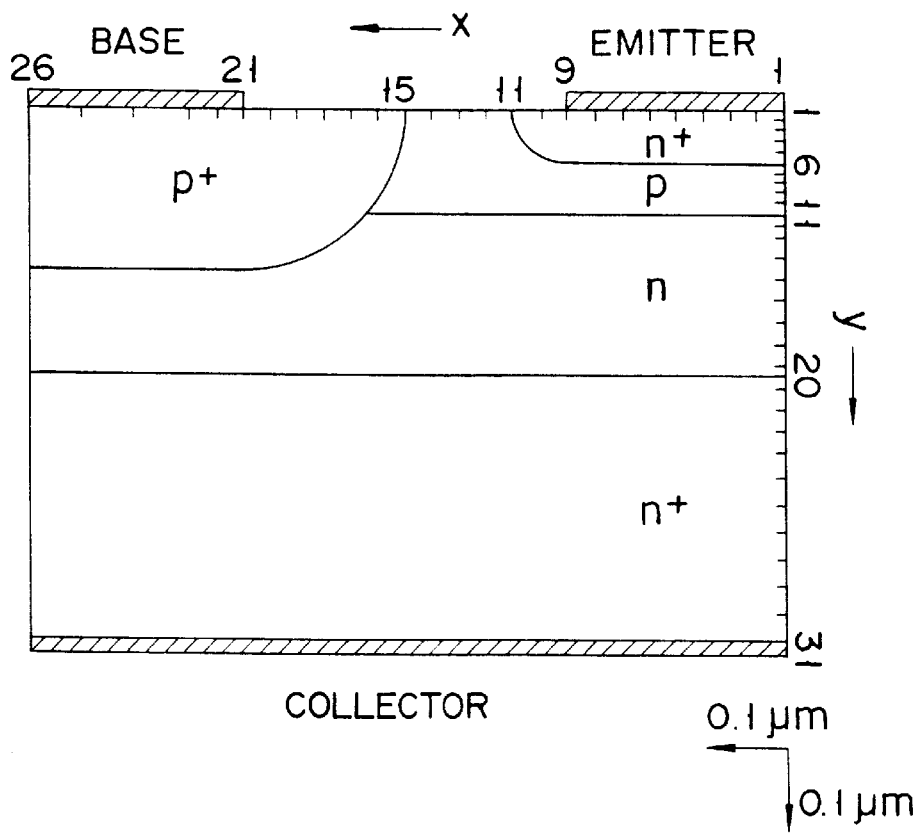
FIG. 25A is a sectional view of the semiconductor device models analyzed by the seventh to ninth methods of the invention.
Figure 25B:
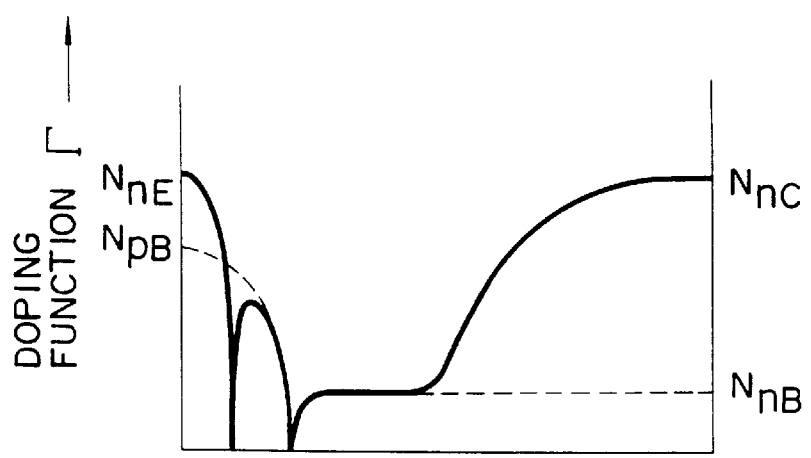
FIG. 25B is a diagram representing the impurity distributions in the device models shown in FIG. 25A.

First, data A representing the cross-sectional structure of a silicon bipolar transistor, shown in FIG. 25A, and data B representing the impurity profile of the transistor, shown in FIG. 25B, are input to the computer employed to perform the analysis. Based on these data items A and B, two-dimensional space modeling will be carried out. Hence, the cross-sectional view (FIG. 25A) of the transistor is divided into 806 meshpoints forming a 26 (x-axis)×31 (y-axis) mesh matrix. Also input to the computer are impurity concentrations $N_{nE}=10^{20}\text{cm}^{-3}$, $N_{pB}=10^{18}\text{cm}^{-3}$, $N_{nB}=10^{17}\text{cm}^{-3}$, $N_{nC}=10^{20}\text{cm}^{-3}$, and $N_{px,ext}=10^{19}\text{cm}^{-3}$. $N_{px,ext}$ is the surface impurity concentration of the external base diffusion layer.

Table 5 shows the results which the numerical analysis yields as the base-emitter voltage $V_{BE}$ is increased from 0v to 1v, while maintaining the base-collector voltage $V_{BC}$ at a constant value of 0v. The voltage $V_{BE}$ is shown in the first column of Table 5. Shown in the second column is the constant $\omega$ in which $\psi_p=\psi_n=\psi_\omega$ is satisfied and which ranges from 0 to 1 as has been described. Specified in the third column is the maximum absolute value $|\delta|_{max}$ of the changes in $\phi_n$, $\phi_p$ and $\psi$. When this value $|\delta|_{max}$ decreases below predetermined value, for example, $10^{-9}$ (or "1.E-9" in Table 5), it is assumed that steady solution of equations (8-1), (8-2) and (9) have been obtained.

Shown in the fourth column of Table 5 is $I_{POIS}$ which is either 0 or 1. When $I_{POIS}=0$, equations (72-1) and (72-2), not containing the term $\lambda_\psi f_\psi$, will be applied. When $I_{POIS}=1$, equations (70-1) and (70-2), containing the term $\lambda_\psi f_\psi$, will be applied. Specified in the fifth column of Table 5 is $N_{it}$ which is the interation number, i.e., the number of steps on the time axis.

The collector current is shown in the sixth column, whereas the difference between the emitter current and the base current is shown in the seventh column. The fact that the collector current and the difference between the emitter and base currents are equal is shown that the law of current conservation is completely valid. Hence, the greater the similarities of the collector current and said current difference, the more accurate the numerical solution obtained by the analysis. The error specified in the eighth column of Table 5 represents $|I_c/(I_E-I_B)-1|$ in percentage. Shown in the last column, i.e., the ninth column, is starting $V_{BE}$ which is the initial value set for calculating the corresponding row of Table 5. In the case of the sixth row in which $V_{BE}$ is 0.7V, a final calculation result in $V_{BE}$ of 0.65 volts is applied to the calculation of the case in $V_{BE}=0.7$ volts as an initial values.

The results of the numerical analysis will be more closely examined. When the base-emitter voltage $V_{BE}$ is relatively low, ranging from 0V to 0.6V, while $I_{POIS}=0$, the solution can be obtained at a practically reasonable number of iteration. When the numerical analysis was performed by a super computer, it took about 8 ms to complete one step of operation. As is shown in Table 5, the solution of $V_{BE}=0.4V$ is obtained by performing 3557 steps of operation. Therefore, a period of about 29 seconds is required, which is sufficiently short in practice. In view of this, the third case shown in Table 5, where $I_{POIS}=0$, is an effective method in relatively low $V_{BE}$.

This invention is not limited to the above embodiments. The technical scope disclosed in one embodiment can be combined with the technical scope disclosed in the other embodiments.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for modeling a semiconductor device by analyzing simultaneous equations consisting of electron- and hole-transport equations and Poisson's equation by means of a computer, said method comprising the steps of:

obtaining a representation of at least a structure and impurity concentrations of the semiconductor device;

rewriting the simultaneous equations to the following equations (a), (b), (c) containing time differential terms dp/dt, dn/dt, d$\psi$/dt and sensitivity coefficients $\lambda_p$, $\lambda_n$, and $\lambda_\psi$:

$$dp/dt = -\lambda_p f_p \tag{a}$$

$$dn/dt = \lambda_n f_n \tag{b}$$

$$d\psi/dt = \lambda_\psi f_\psi \tag{c}$$

determining meshpoints (M,N) having spatial position dependency corresponding to the at least a structure and impurity concentrations of the semiconductor device;

transforming equations (a), (b) and (c) to the following equations (d), (e) and (f):

TABLE 5

| $V_{BE}$ (Volt) | $\omega$ | $|\delta|_{max}$ | $I_{Pois}$ | $N_{it}$ | $I_C$ (A/cm) | $I_E-I_B$ (A/cm) | Error (%) | Starting $V_{BE}$ (Volt) |
|---|---|---|---|---|---|---|---|---|
| 0. | 0.9 | 1.E − 12 | 0 | 558 | −1.84E − 13 | 1.01E − 13 | — | — |
| 0.2 | 0.9 | 1.E − 12 | 0 | 2258 | 6.04163E − 9 | 5.79054E − 9 | 4.3 | 0. |
| 0.4 | 0.9 | 1.E − 12 | 0 | 3557 | 4.53709E − 7 | 4.52452E − 7 | 0.28 | 0.2 |
| 0.5 | 0.9 | 1.E − 9 | 0 | 1513 | 1.13919E − 5 | 1.09139E − 5 | 4.4 | 0.4 |
| 0.6 | 0.9 | 1.E − 9 | 0 | 2318 | 3.76834E − 4 | 3.76832E − 4 | 0.094 | 0.5 |
| 0.7 | 0.9 | 1.E − 9 | 0 & 1 | 378 & 1234 | 1.30685E − 2 | 1.30684E − 2 | 0.0008 | 0.65 |
| 0.8 | 0.9 | 1.E − 9 | 0 & 1 | 500 & 1488 | 3.43894E − 1 | 3.43893E − 1 | 0.0003 | 0.75 |
| 0.9 | 0.9 | 9.5E − 6 | 0 & 1 | 500 & 2000 | 4.01755E0 | 4.01819E0 | 0.016 | 0.85 |
| 1.0 | 0.85 & 0.9 | 1.E − 5 & 1.E − 6 | 0 & 1 | 1804 & 1411 | 1.30748E1 | 1.30710E1 | 0.029 | 0.95 |

The case where $V_{BE}=0.7V$ will be discussed, with reference to not only Table 5 but also FIG. 26. In FIG. 26, the solid-line curve indicates the results of the eighth analysis method embodiment wherein $I_{POIS}=0$, and the broken-line curve represents the results of the seventh analysis method embodiment wherein $I_{POIS}=1$. In the eighth method embodiment, wherein $I_{POIS}=0$, $|\delta|_{max}$ quickly decreases to $3\times10^{-7}$ cm$^{-3}$, but slowly converges thereafter. On the other hand, in the seventh method embodiment, wherein $I_{POIS}=1$, $|\delta|_{max}$ does not quickly decrease at first, but steadily decreases in the lower region of $|\delta|_{max}$. Hence, in the ninth method embodiment, the analysis is started with $I_{POIS}$ set to 0, and $I_{POIS}$ is set to 1 when $|\delta|_{max}$ decreases to $10^{-6}$, whereby the $|\delta|_{max}$ converges very fast as is indicated by the one-dot, one-dash curve shown in FIG. 26.

$$dp(M,N)/dt = -\lambda_p(M,N)f_p(M,N) \tag{d}$$

$$dn(M,N)/dt = \lambda_n(M,N)f_n(M,N) \tag{e}$$

$$d\psi(M,N)/dt = \lambda_\psi(M,N)f_\psi(M,N) \tag{f}$$

linearizing equations (d), (e) and (f), discreting the same with respect to time, and transforming the same to the following vector equation:

$$\begin{pmatrix} \delta p \\ \delta n \\ \delta \psi \end{pmatrix}_{t+dt} = A \begin{pmatrix} \delta p \\ \delta n \\ \delta \psi \end{pmatrix}_t \tag{g}$$

time-integrating equation (g) after obtaining such the sensitivity coefficients that an eigen value of an error propagation matrix A contained in equation (g) is less than 1, thereby solving the simultaneous equations; and producing a model of said semiconductor device having physical values (p,n) at the respective meshpoints (M,N) obtained by using the solved simultaneous equations.

2. A method of modeling a semiconductor device by analyzing simultaneous equations consisting of electron- and hole-transport equations and Poisson's equation by means of a computer, said method comprising the steps of:

obtaining a representation of at least a structure and impurity concentrations of the semiconductor device;

rewriting the simultaneous equations to the following equations (a-1), (a-2), (a-3) containing time differential terms dp/dt, dn/dt, dψ/dt and sensitivity coefficients $\lambda_p$, $\lambda_n$, and $\lambda_\psi$:

$$dp/dt = -\lambda_p f_p \quad (a\text{-}1)$$

$$dn/dt = \lambda_n f_n \quad (a\text{-}2)$$

$$d\psi/dt = \lambda_\psi f_\psi \quad (a\text{-}3)$$

where $$f_p = (1/q)\mathrm{div} J_p - (G-U) \quad (b\text{-}1)$$

$$f_n = (1/q)\mathrm{div} J_n + (G-U) \quad (b\text{-}2)$$

$$f_\psi = \mathrm{divgrad}\psi + (q/\epsilon)(\Gamma + p - n) \quad (b\text{-}3)$$

$$n = n_i \exp\{\theta(\psi - \phi_n)\} \quad (b\text{-}4)$$

$$p = n_i \exp\{\theta(\phi_p - \psi)\} \quad (b\text{-}5)$$

$$\theta = q/(KT) \quad (b\text{-}6)$$

applying equations (b-4) and (b-5), thus eliminating p and n in the left sides of equations (a-1) and (a-2) and rewriting equations (a-1) and (a-2) to the following equations (f-1) and (f-2):

$$d\phi_p/dt = -\lambda_p f_p/(\theta P) + \lambda_\psi f_\psi \quad (f\text{-}1)$$

$$d\phi_n/dt = -\lambda_n f_n/(\theta n) + \lambda_\psi f_\psi \quad (f\text{-}2)$$

determining meshpoints (M,N) having spatial position dependency corresponding to the at least a structure and impurity concentrations of the semiconductor device, to the sensitivity coefficients $\lambda_p$, $\lambda_n$, and $\lambda_\psi$;

transforming equations (f-1), (f-2) and (a-3) to the following equations (g-1), (g-2) and (g-3):

$$d\phi_p(M,N)/dt = -\lambda_p(M,N)f_p(M,N)/\{\theta p(M,N)\} + \lambda_\psi(M,N)f_\psi(M,N) \quad (g\text{-}1)$$

$$d\phi_n(M,N)/dt = -\lambda_n(M,N)f_n(M,N)/\{\theta n(M,N)\} + \lambda_\psi(M,N)f_\psi(M,N) \quad (g\text{-}2)$$

$$d\psi(M,N)/dt = \lambda_\psi(M,N)f_\psi(M,N) \quad (g\text{-}3)$$

linearizing equations (g-1), (g-2) and (g-3), discreting the same with respect to time, and transforming the same to the following vector equation:

$$\begin{pmatrix} \delta\phi_p \\ \delta\phi_n \\ \delta\psi \end{pmatrix}_{t+dt} = A \begin{pmatrix} \delta\phi_p \\ \delta\phi_n \\ \delta\psi \end{pmatrix}_t \quad (h)$$

time-integrating equation (h) after obtaining such the sensitivity coefficients that an eigen value of an error propagation matrix A contained in equation (h) is less than 1, thereby solving the simultaneous equations; and producing a model of said semiconductor device having physical values (p,n) at the respective meshpoints (M,N) obtained by using the solved simultaneous equations.

3. A method of modeling a semiconductor device by analyzing simultaneous equations consisting of electron- and hole-transport equations and Poisson's equation by means of a computer, said method comprising the steps of:

obtaining a representation of at least a structure and impurity concentrations of the semiconductor device;

rewriting the simultaneous equations to the following equations (a-1), (a-2), (a-3) containing time differential terms dp/dt, dn/dt, dψ/dt and sensitivity coefficients $\lambda_p$, $\lambda_n$, and $\lambda_\psi$:

$$dp/dt = -\lambda_p f_p \quad (a\text{-}1)$$

$$dn/dt = \lambda_n f_n \quad (a\text{-}2)$$

$$d\psi/dt = \lambda_\psi f_\psi \quad (a\text{-}3)$$

where $$f_p = (1/q)\mathrm{div} J_p - (G-U) \quad (b\text{-}1)$$

$$f_n = (1/q)\mathrm{div} J_n + (G-U) \quad (b\text{-}2)$$

$$f_\psi = \mathrm{divgrad}\psi + (q/\epsilon)(\Gamma + p - n) \quad (b\text{-}3)$$

$$n = n_i \exp\{\theta(\psi - \phi_n)\} \quad (b\text{-}4)$$

$$p = n_i \exp\{\theta(\phi_p - \psi)\} \quad (b\text{-}5)$$

$$\theta = q/(KT) \quad (b\text{-}6)$$

applying equations (b-4) and (b-5), thus eliminating p and n in the left sides of equations (a1) and (a-2) and rewriting equations (a-1) and (a-2) to the following equations (f-1) and (f-2):

$$d\phi_p/dt = -\lambda_p f_p/(\theta p) + \lambda_\psi f_\psi \quad (f\text{-}1)$$

$$d\phi_n/dt = -\lambda_n f_n/(\theta n) + \lambda_\psi f_\psi \quad (f\text{-}2)$$

eliminating the second term of equation (f-1), and also the second term of (f-2), thereby transforming equations (f-1) and (f-2) to the following equations (g-1) and (g-2):

$$d\phi_p/dt = -\lambda_p f_p/(\theta p) \quad (g\text{-}1)$$

$$d\phi_n/dt = -\lambda_n f_n/(\theta n) \quad (g\text{-}2)$$

determining meshpoints (M,N) having spatial position dependency corresponding to the at least a structure and impurity concentrations of the semiconductor device, to the sensitivity coefficients $\lambda_p$, $\lambda_n$, and $\lambda_\psi$;

transforming equations (g-1), (g-2) and (a-3) to the following equations (h-1), (h-2) and (h-3):

$$d\phi_p(M,N)/dt = -\lambda_p(M,N)f_p(M,N)/\{\theta_p(M,N)\} \quad (h\text{-}1)$$

$$d\phi_n(M,N)/dt = -\lambda_n(M,N)f_n(M,N)/\{\theta n(M,N)\} \quad (h\text{-}2)$$

$$d\psi(M,N)/dt = \lambda_\psi(M,N)f_\psi(M,N) \quad (h\text{-}3)$$

linearizing equations (h-1), (h-2) and (h-3), discreting the same with respect to time, and transforming the same to the following vector equation:

$$\begin{pmatrix} \delta\phi_p \\ \delta\phi_n \\ \delta\psi \end{pmatrix}_{t+dt} = A \begin{pmatrix} \delta\phi_p \\ \delta\phi_n \\ \delta\psi \end{pmatrix}_t \qquad (i)$$

time-integrating equation (i) after obtaining such the sensitivity coefficients that an eigen value of an error propagation matrix A contained in equation (i) is less than 1, thereby solving the simultaneous equations; and producing a model of said semiconductor device having physical values (p,n) at the respective meshpoints (M,N) obtained by using the solved simultaneous equations.

4. A method according to claim 2 or 3 wherein said sensitivity coefficients $\lambda_p$, $\lambda_n$, and $\lambda_\psi$ are defined by the following eguations (h-1), (h-2), (h-3):

$$\lambda_p(M,N)\delta t = 2\omega_p \theta \Big/ \left\{ \left( \sum_{K,L} |\partial/\partial \phi_p(K,L)(f_p(M,N)/p(M,N)|\right) + \right. \qquad (h\text{-}1)$$
$$\left. \partial/\partial \phi_p(M,N)(f_p(M,N)/p(M,N) \right\}$$

$$\lambda_n(M,N)\delta t = 2\omega_n \theta \Big/ \left\{ \left( \sum_{K,L} |\partial/\partial \phi_n(K,L)(f_n(M,N)/n(M,N)|\right) + \right. \qquad (h\text{-}2)$$
$$\left. \partial/\partial \phi_n(M,N)(f_n(M,N)/n(M,N) \right\}$$

$$\lambda_\psi(M,N)\delta t = \qquad (h\text{-}3)$$
$$2\omega_\psi \Big/ \left\{ \left( \sum_{K,L} |\partial f_\psi(M,N)/\partial \psi_n(K,L)|\right) - \partial f_\psi(M,N)/\partial \psi(M,N) \right\}$$

5. A method of modeling a semiconductor device by analyzing simultaneous equations consisting of electron- and hole-transport equations and Poisson's equation by means of a computer, said method comprising the steps of:

obtaining a representation of at least a structure and impurity concentrations of the semiconductor device;

rewriting the simultaneous equations to the following equations (a-1), (a-2), (a-3) containing time differential terms dp/dt, dn/dt, dψ/dt and sensitivity coefficients $\lambda_p$, $\lambda_n$, and $\lambda_\psi$:

$$dp/dt = -\lambda_p f_p \qquad (a\text{-}1)$$
$$dn/dt = \lambda_n f_n \qquad (a\text{-}2)$$
$$d\psi/dt = \lambda_\psi f_\psi \qquad (a\text{-}3)$$

where $$f_p = (1/q)divJ_p - (G-U) \qquad (b\text{-}1)$$
$$f_n = (1/q)diVJ_n + (G-U) \qquad (b\text{-}2)$$
$$f_\psi = divgrad\psi + (q/\Gamma)(\epsilon + p - n) \qquad (b\text{-}3)$$
$$n = n_i \exp\{\theta(\psi - \theta_n)\} \qquad (b\text{-}4)$$
$$p = n_i \exp\{\theta(\phi_p - \psi)\} \qquad (b\text{-}5)$$
$$\theta = q/(KT) \qquad (b\text{-}6)$$

determining meshpoints (M,N) having spatial position dependency corresponding to the at least a structure and impurity concentrations of the semiconductor device, to the sensitivity coefficients $\lambda_p$, $\lambda_n$, and $\lambda_\psi$;

transforming equations (a-1), (a-2) and (a-3) to the following equations (d-1), (d-2) and (d-3):

$$dp(M,N)/dt = -\lambda_p(M,N)f_p(M,N) \qquad (d\text{-}1)$$
$$dn(M,N)/dt = \lambda_n(M,N)f(M,N) \qquad (d\text{-}2)$$
$$d\psi(M,N)/dt = \lambda_\psi(M,N)f_\psi(M,N) \qquad (d\text{-}3)$$

determining the sensitivity coefficients $\lambda_p$, $\lambda_n$, $\lambda_\psi$ by the following equations (e-1), (e-2) and (e-3):

$$\lambda_p(M,N)\delta t = \qquad (e\text{-}1)$$
$$2\omega_p \Big/ \left\{ \left( \sum_{K,L} |\partial f_p(M,N)/\partial p(K,L)|\right) + \partial f_p(M,N)/\partial p(M,N) \right\}$$

$$\lambda_n(M,N)\delta t = \qquad (e\text{-}2)$$
$$2\omega_n \Big/ \left\{ \left( \sum_{K,L} |\partial f_n(M,N)/\partial n(K,L)|\right) + \partial f_n(M,N)/\partial n(M,N) \right\}$$

$$\lambda_\psi(M,N)\delta t = \qquad (e\text{-}3)$$
$$2\omega_\psi \Big/ \left\{ \left( \sum_{K,L} |\partial f_\psi(M,N)/\partial \psi(K,L)|\right) + \partial f_\psi(M,N)/\partial \psi(M,N) \right\}$$

where δt is a discrete time interval on the time axis, (M,N) is a number of any discrete space meshpoint, and (K,L) is a number of a point neighboring to the space meshpoint (M,N);

time-integrating equations (d-1), (d-2) and (d-3) until these equations attain a steady state, thereby obtaining the solutions of the simultaneous equations; and producing a model of said semiconductor device having physical values (p,n) at the respective meshpoints (M,N) obtained by using the solved simultaneous equations.

6. An apparatus for modeling a semiconductor device by said apparatus comprising:

a plurality of logic cells;

m amplifiers having an adjustable amplification gain $\lambda_i$ or a multiplier equivalent to the m amplifiers, connected to said logic cells; and detector network means connected to said logic cells, for detecting that said logic cells attain a transient stability; and means for determining the amplification gain $\lambda_i$ such that an error propagation matrix has an eigen value of less than 1 at a specific time during a transient period.

7. An apparatus as recited in claim 6, said amplifiers being respectively connected to said logic cells;

wherein said detector network means comprises:
current sources respectively connected to said amplifiers;
resonant circuits respectively connected to nodes between each of said logic cells and a corresponding amplifier;
current detectors for respectively detecting input currents into said logic cells;
address means for addressing said current detectors;

convertor means for converting an input current detected by an addressed current detector into a digital signal; and means for converting said signal into measured data.

8. An apparatus for modeling a semiconductor device by analyzing simultaneous equations consisting of electron- and hole-transport equations and Poisson's equation by rewriting the simultaneous equations to differential equations $d\phi_p/dt = -\lambda_p f_p/(\theta p) + \lambda_\psi f_\psi$, $d\phi_n/dt = \lambda_n f_n/(\theta n) + \lambda_\psi f_\psi$, $d\psi/dt = \lambda_\psi f_\psi$ containing time differential terms and sensitivity coefficients, and then solving the differential equations, said apparatus comprising:

first means for designating addresses of meshpoints of the semiconductor device;

second means for performing integration in accordance with $\phi_p$, $\phi_n$, $\psi$, $\lambda_p$, $\lambda_n$ and $\lambda_\psi$, corresponding to any meshpoint whose address has been designated by said first means, thereby deriving $\phi_p$, $\phi_n$ and $\psi$ at the meshpoint;

third means for storing $\phi_p$, $\phi_n$ and $\psi$, thus derived by said second means; and fourth means for determining whether or not $\phi_p$, $\phi_n$ and $\psi$ derived by the second means fall within allowable error limits, for feeding $\phi_p$, $\phi_n$ and $\psi$ back to said second means so that said second means performs integration again, when $\phi_p$, $\phi_n$ and $\psi$ fall outside the allowable error limits, and for outputting $\phi_p$, $\phi_n$ and $\psi$ when $\phi_p$, $\phi_n$ and $\psi$ fall within the allowable error limits.

9. An apparatus as recited in claim 8, wherein said second means comprises:

means for determining first values of $\lambda_p$, $\phi_n$ and for $\psi$ for each meshpoint;

means for determining $\lambda_p$, $\lambda_n$ and $\lambda_\psi$, and $f_p/\theta_p$, $f_n/\theta_n$ and $f_\psi$ using said first values of $\phi_p$, $\phi_n$ and $\psi$;

multipliers for multiplying $\lambda_p$ and $f_p/\theta_p$, $\lambda_n$ and $f_n/\theta_n$, and $f_\psi$ and $\lambda_\psi$;

first adders for adding $\lambda_p f_p/\theta_p$ to $f_\psi \lambda_\psi$ and $\lambda_n f_n/\theta_n$ to $f_\psi \lambda_\psi$, and $f_\psi \lambda_\psi$ to said first values of $\psi$ to produce a second value of $\psi$; and second adders for adding $(\lambda_p f_p/\theta_p + f_\psi \lambda_\psi)$ to said first value of $\phi_p$ and $(\lambda_n f_n/\theta_n + f_\psi \lambda_\psi)$ to said first value of $\phi_n$ to produce second values of $\phi_p$ and $\phi_n$.

10. An apparatus for modeling a semiconductor device by analyzing simultaneous equations consisting of electron- and hole-transport equations and Poisson's equation by rewriting the simultaneous equations to either differential equations $d\phi_p/dt = -\lambda_p f_p/(\theta p) + \lambda_\psi f_\psi$, $d\phi_n/dt = \lambda_n f_n/(\theta n) + \lambda_\psi f_\psi$, $d\psi/dt = \lambda_\psi f_\psi$ containing time differential terms and sensitivity coefficients, or differential equations $d\phi_p/dt = -\lambda_p f_p/(\theta p)$, $d\phi_n/dt = \lambda_n f_n/(\theta n)$, $d\psi/dt = \lambda_\psi f_\psi$ containing time differential terms and sensitivity coefficients, and then solving the simultaneous equations, said apparatus comprising:

first means for designating addresses of meshpoints of the semiconductor device;

second means for performing integration in accordance with $\phi_p$, $\phi_n$, $\psi$, $\lambda_p$, $\lambda_n$, and $\lambda_\psi$ corresponding to any meshpoint whose address has been designated by said first means, by using a first method during a first period of integration, and by using a second method during a second period of integration, thereby deriving $\phi_p$, $\phi_n$ and $\psi$ at the meshpoint;

third means for storing $\phi_p$, $\phi_n$ and $\psi$, thus derived by said second means; and fourth means for determining whether or not $\phi_p$, $\phi_n$ and $\psi$ derived by the second means fall within allowable error limits, for feeding $\phi_p$, $\phi_n$ and $\psi$ back to said second means so that said second means performs integration again, when $\phi_p$, $\phi_n$ and $\psi$ fall outside the allowable error limits, and for outputting $\phi_p$, $\phi_n$ and $\psi$ when $\phi_p$, $\phi_n$ and $\psi$ fall within the allowable error limits.

11. A method of modeling a semiconductor device by analyzing a Poisson's equation representing the relationship between electrical potential and space charge, by means of a computer, said method comprising the steps of:

obtaining a representation of at least a structure and impurity concentrations of the semiconductor device;

rewriting the Poisson's equation to the following equation (a) containing time differential terms $\partial \psi/\partial t$ and a sensitivity coefficient $\lambda$, $$\partial \psi/\partial nt = \lambda_\psi f_\psi \qquad (a)$$

determining meshpoints (M,N) having spatial position dependency corresponding to the at least a structure and impurity concentrations of the semiconductor device, thereby transforming equation (a) to the following equation (b):

$$\partial \psi(M,N)/\partial t = \lambda(M,N) f_\psi(M,N) \qquad (b)$$

linearizing equation (b), discreting the same with respect to time, and transforming the same to the following vector equation:

$$\delta \psi_{i+dt} = A \delta \psi_i \qquad (c)$$

time-integrating equation (c) after obtaining such the sensitivity coefficients that an eigen value of an error propagation matrix A contained in equation (c) is less than 1, thereby solving the Poisson's equation; and producing a model of said semiconductor device using the solved simultaneous equations.

12. A method of modeling a semiconductor device by analyzing a Poisson's equation representing the relationship between electrical potential and space charge, by means of a computer, said method comprising the steps of:

obtaining a representation of at least a structure and impurity concentrations of the semiconductor device;

rewriting the Poisson's equation to the following equation (a) containing time differential terms $\partial \psi/\partial t$ and a sensitivity coefficient $\lambda$, $$\partial \psi/\partial t = \lambda_\psi f_\psi \qquad (a)$$

determining meshpoints (M,N) having spatial position dependency corresponding to the at least a structure and impurity concentrations of the semiconductor device, thereby transforming equation (a) to the following equation (b):

$$\partial \psi(M,N)/\partial t = \lambda(M,N) f_\psi(M,N) \qquad (b)$$

determining sensitivity coefficients $\lambda(M,N)$ by the following equation (c):

$$\lambda(M,N) \delta t \leq 2/(2H+\alpha) \qquad (c)$$

where $\delta t$ is a discrete time interval on the time axis, and (M,N) is the number of any discrete space meshpoint;

time-integrating equations (b) until these equations attain a steady state, thereby obtaining the solutions of the Poisson's equation; and producing a model of said semiconductor device having Physical values (p,n) at the respective meshpoints (M,N) obtained by using the solved simultaneous equations.

13. An apparatus for modeling a semiconductor device, comprising:

a plurality of logic cells;

m amplifiers having an adjustable amplification gain $\lambda_i$ or a multiplier equivalent to the m amplifiers, connected to said logic cells;

detector network means connected to the logic cells, for detecting that said logic cells attain a transient stability; and means for determining the amplification gain $\lambda_i$ such that an error propagation matrix has an eigen value of less than 1 at a specific time during a transient period.

14. An apparatus for modeling a semiconductor device by analyzing a Poisson's equation by rewriting the Poisson's equation to a differential equations $\partial \psi/\partial t = \lambda_\psi f_\psi$, containing time differential term and sensitivity coefficient, and then solving the differential equation, said apparatus comprising:

first means for designating addresses of meshpoints of the semiconductor device;

second means for performing integration in accordance with $\psi$ and $\lambda_\psi$ corresponding to any meshpoint whose address has been designated by said first means, thereby deriving $\psi$ at the meshpoint;

third means for storing $\psi$ derived by said second means; and fourth means for determining whether or not $\psi$ derived by said second means falls within allowable error limit, for feeding $\psi$ back to said second means so that said second means performs integration again, when $\psi$ falls outside the allowable error limit, and for outputting $\psi$ when $\psi$ falls within the allowable error limit.

15. An apparatus for determining equivalent-circuit constants of a semiconductor device comprising:

a plurality of logic cells;

m amplifiers having an adjustable amplification gain $\lambda_i$ or a multiplier equivalent to the m amplifiers, connected to said logic cells; and detector network means connected to said logic cells, for detecting that said logic cells attain a transient stability.

16. A method of analyzing an operation of a semiconductor device, said method comprising the steps of:

using, during a first period of time integration, one of first and second methods of modeling said semiconductor device by analyzing simultaneous equations consisting of electron- and hole-transport equations and Poisson's equation by means of a computer; and using the other of the first and second methods during a second period of time integration;

said first method comprising the steps of:
(a) obtaining a representation of at least a structure and impurity concentrations of the semiconductor device,
(b) rewriting the simultaneous equations to the following equations (a-1), (a-2), (a-3) containing time differential terms dp/dt, dn/dt, d$\psi$/dt and sensitivity coefficients $\lambda_p$, $\lambda_n$, and $\lambda_\psi$:

$$dp/dt = -\lambda_p f_p \quad \text{(a-1)}$$

$$dn/dt = \lambda_n f_n \quad \text{(a-2)}$$

$$d\psi/dt = \lambda_\psi f_\psi \quad \text{(a-3)}$$

where $$f_p = (1/g)\text{div} J_p - (G-U) \quad \text{(b-1)}$$

$$f_n = (1/g)\text{div} J_n + (G-U) \quad \text{(b-2)}$$

$$f_\psi = \text{div grad}\psi + (g/\epsilon)(\Gamma + p - n) \quad \text{(b-3)}$$

$$n = n_i \exp\{\theta(\psi - \phi_n)\} \quad \text{(b-4)}$$

$$p = n_i \exp\{\theta(\phi_p - \psi)\} \quad \text{(b-5)}$$

$$\theta = g/(KT) \quad \text{(b-6)}$$

(c) applying equations (b-4) and (b-5), thus eliminating p and n in the left sides of equations (a-1) and (a-2) and rewriting equations (a-1) and (a-2) to the following equations (f-1) and (f-2):

$$d\phi_p/dt = -\lambda_p f_p/(\theta p) + \lambda_\psi f_\psi \quad \text{(f-1)}$$

$$d\phi_n/dt = -\lambda_n f_n/(\theta n) + \lambda_\psi f_\psi \quad \text{(f-2)}$$

(d) determining meshpoints (M,N) having spatial position dependency corresponding to the at least a structure and impurity concentrations of the semiconductor device, to the sensitivity coefficients $\lambda_p$, $\lambda_n$, and $\lambda_\psi$, and $\lambda_\psi$, (e) transforming equations (f-1), (f-2) and (a-3) to the following equations (g-1), (g-2) and (g-3):

$$d\phi_p(M,N)/dt = -\lambda_p(M,N)f_p(M,N)/\{\theta p(M,N)\} + \lambda_\psi(M,N)f_\psi(M,N) \quad \text{(g-1)}$$

$$d\phi_n(M,N)/dt = -\lambda_n(M,N)f_n(M,N)/\{\theta n(M,N)\}\lambda_\psi(d\psi(M,N)/dt = \lambda_\psi(M,N)f_\psi(M,N) \quad \text{(g-3)}$$

(f) linearizing equations (g-1), (g-2) and (g-3), discreting the same with respect to time, and transforming the same to the following vector equation:

$$\begin{pmatrix} \delta\phi_p \\ \delta\phi_n \\ \delta\psi \end{pmatrix}_{t+dt} = A \begin{pmatrix} \delta\phi_p \\ \delta\phi_n \\ \delta\psi \end{pmatrix}_t \quad \text{(h-1)}$$

(g) time-integrating equation (h-1) after obtaining such the sensitivity coefficients that an eigen value of an error propagation matrix A contained in equation (h-1) is less than 1, thereby solving the simultaneous equations, and (h) producing a model of said semiconductor device having physical values (p,n) at the respective meshpoints (M,N) obtained by using the solved simultaneous equations; and said second method comprising steps (a)–(d), (g) and (h) of said first method and the steps of:
eliminating the second term of equation (f-1), and also the second term of (f-2), thereby transforming equations (f-1) and (f-2) to the following equations (i-1) and (i-2):

$$d\phi_p/dt = -\lambda_p f_p/(\theta p) \quad \text{(i-1)}$$

$$d\phi_n/dt = -\lambda_n f_n/(\theta n) \quad \text{(i-2)}$$

transforming equations (i-1), (i-2) and (a-3) to the following equations (j-1), (i-2) and (i-3):

$$d\phi/_p(M,N)/dt=-\lambda_p(M,N)f_p(M,N)/\{\theta p(M,N)\} \quad (j\text{-}1)$$

$$d\phi_n(M,N)/dt=-\lambda_n(M,N)f_n(M,N)/\{\theta n(M,N)\} \quad (j\text{-}2)$$

$$d\psi(M,N)/dt=\lambda_4(M,N)f(M,N) \quad (j\text{-}3)$$

and linearizing equations (j-1), (j-2) and (j-3), discreting the same with respect to time, and transforming the same to vector equation (h-1).

17. A method of modeling a semiconductor device using simultaneous equations describing electron- and hole-transport in said semiconductor device and Poisson's equation, by means of a computer, said method comprising the steps of:

obtaining a representation of a physical structure of said semiconductor device having at least regions with predetermined impurity concentrations;

determining the electron- and hole-transport in said semiconductor device using the following equations (a), (b) and (c) containing time differential terms dp/dt, dn/dt, dψ/dt and sensitivity coefficients $\lambda_p$, $\lambda_n$, and $\lambda_\psi$:

$$dp/dt=-\lambda_p f_p \quad (a)$$

$$dn/dt=\lambda_n f_n \quad (b)$$

$$d\psi/dt=\lambda_\psi f_\psi \quad (c)$$

determining meshpoints (M,N) corresponding to the physical structure of said semiconductor device having regions of predetermined impurity concentrations;

determining the bias voltage of said semiconductor device;

determining the electron- and hole-transport in said semiconductor device using said meshpoints, said bias voltage and said equations (a), (b) and (c):

$$dp(M,N)/dt=-\lambda_p(M,N)f_p(M,N) \quad (d)$$

$$dn(M,N)/dt=\lambda_n(M,N)f_n(M,N) \quad (e)$$

$$d\psi(M,N)/dt=\lambda_\psi(M,N)f_\psi(M,N) \quad (f)$$

determining the sensitivity coefficients corresponding to said meshpoints using equations (d), (e) and (f):

$$\begin{pmatrix} \delta p \\ \delta n \\ \delta \psi \end{pmatrix}_{t+dt} = A \begin{pmatrix} \delta p \\ \delta n \\ \delta \psi \end{pmatrix}_t \quad (g)$$

such that an eigen value of an error propagation matrix A of equation (g) is less than a predetermined value; and producing a model of said semiconductor device having physical values (p,n) at the respective meshpoints obtained using the determined electron- and hole-transport.

18. A method of modeling a semiconductor device, comprising:

determining a number of meshpoints corresponding to a physical structure of said semiconductor device;

inputting respective currents into a matrix network containing said number of network elements, each of said network elements having a logic cell, a multiplier with a variable amplification gain λ connected to said logic cell, and a current detector connected to said multiplier and said logic cell;

detecting whether said input currents reach respective transient stabilities;

determining respective variable amplification gains λ for each of said multipliers at said transient stability;

modeling said semiconductor device using said respective variable amplification gains λ at said transient stability.

* * * * *